United States Patent
Kubo et al.

(10) Patent No.: US 8,175,449 B2
(45) Date of Patent: May 8, 2012

(54) DRIVING DEVICE, DRIVING MECHANISM, AND IMAGE SENSING APPARATUS

(75) Inventors: Naoki Kubo, Takarazuka (JP); Junichi Tanii, Izumi (JP); Shigeru Wada, Kishiwada (JP)

(73) Assignee: Konica Minolta Opto, Inc., Tokyo (JP)

( * ) Notice: Subject to any disclaimer, the term of this patent is extended or adjusted under 35 U.S.C. 154(b) by 870 days.

(21) Appl. No.: 11/807,529

(22) Filed: May 29, 2007

(65) Prior Publication Data

US 2007/0280668 A1    Dec. 6, 2007

(30) Foreign Application Priority Data

May 30, 2006 (JP) ................................. 2006-149935
Jul. 14, 2006 (JP) ................................. 2006-194199
Jul. 14, 2006 (JP) ................................. 2006-194200
Mar. 13, 2007 (JP) ................................. 2007-063684

(51) Int. Cl.
 *G03B 13/18* (2006.01)
(52) U.S. Cl. ............................. 396/89; 396/85; 396/435
(58) Field of Classification Search .................... 396/85, 396/89, 133, 435; 359/696; 60/519; 354/94
See application file for complete search history.

(56) References Cited

U.S. PATENT DOCUMENTS 5,412,443 A * 5/1995 Suzuka .......................... 396/435
6,246,834 B1 * 6/2001 Onda ............................... 396/85
7,295,389 B2 11/2007 Ohtsuka et al. ................ 359/819
2007/0047938 A1 * 3/2007 Suzuki et al. .................... 396/89

FOREIGN PATENT DOCUMENTS

| JP | 9-127398 A | 5/1997 |
| JP | 2002-130114 A | 5/2002 |
| JP | 2005-156892 A | 6/2005 |
| JP | 2005-195998 A | 7/2005 |
| JP | 2006-106053 A | 4/2006 |
| WO | WO 2006/054535 A1 | 5/2006 |

OTHER PUBLICATIONS

Japanese Notice of Reasons for Rejection dated Jun. 7, 2011, for counterpart Japanese Application No. 2007-063684, together with an English translation thereof.

* cited by examiner

*Primary Examiner* — Lam S Nguyen
(74) *Attorney, Agent, or Firm* — Cozen O'Connor

(57) ABSTRACT

A driving device is adapted to drive a driven member, and includes a driving member, and a linear shape memory alloy (SMA) actuator. The driving member has a displacement output portion which is movable in a first axis direction, and a displacement input portion for moving the displacement output portion in the first axis direction in response to an application of a moving force in a second axis direction orthogonal to the first axis direction. The driving member is engaged with the driven member at the displacement output portion. The SMA actuator is disposed in contact with the driving member at least at the displacement input portion to apply the moving force to the displacement input portion.

35 Claims, 32 Drawing Sheets

DRIVING DEVICE, DRIVING MECHANISM, AND IMAGE SENSING APPARATUS

This application claims priority on Japanese Patent Application Nos. 2006-149935, 2006-194199, 2006-194200, and 2007-063684 filed on May 30, 2006, Jul. 14, 2006, Jul. 14, 2006, and Mar. 13, 2007, respectively, the contents of which are hereby incorporated by reference.

BACKGROUND OF THE INVENTION

1. Field of the Invention

The present invention relates to a driving device for driving a lens unit constituting an imaging optical system of an image sensing apparatus such as a camera phone for zoom control or focus control, as well as a driving mechanism, and an image sensing apparatus incorporated with the driving device.

2. Description of the Background Art

In recent years, a high-quality camera phone or a like device has been developed. For instance, the number of pixels of an image sensor to be loaded in a camera phone has been spectacularly increased. As the high-quality camera phone has been developed, a high-performance lens unit constituting an imaging optical system has also been demanded. Specifically, a fixed focal length system is replaced by an auto-focus system. Concerning a zoom function, an optical zoom function has been demanded in place of or in addition to a digital zoom function. A lens driving mechanism for moving a lens element in an optical axis direction is necessary both in the auto-focus system and the optical zoom system.

Heretofore, a moving coil system has been widely used in the lens driving mechanism. The lens driving mechanism using the moving coil system is constructed by mounting a pair of a coil and a magnet onto a lens frame member for fixedly holding a lens element and a fixed frame member for holding the lens frame member, respectively, to drive the lens frame member in an optical axis direction, utilizing a magnetic repulsion force depending on an energization amount to the coil. In the lens driving mechanism using the moving coil system, use of the coil and the magnet, whose miniaturization is difficult, is indispensable. This does not follow a recent trend of seeking for reduction of a device in size and weight. Also, it is necessary to mount the coil of a relatively heavy weight on the lens frame member. This may increase an inertia moment of the lens frame member when an impact is applied thereto, thereby lowering the impact resistance.

A lens driving mechanism using a shape memory alloy (hereinafter, also called as "SMA") actuator is known in place of the lens driving mechanism using the moving coil system. In use of the lens driving mechanism with the SMA actuator, a contraction force is generated by energizing and heating the SMA actuator, and the contraction force is used as a lens driving force. Generally, it is easy to reduce the size and the weight of the lens driving mechanism with the SMA actuator. Further, the lens driving mechanism with the SMA actuator is advantageous in obtaining a relatively large magnitude of force.

Several patent documents (D1 through D4) disclose known structures concerning a lens driving mechanism with an SMA actuator. Japanese Unexamined Patent Publication No. 9-127398 (D1) discloses an arrangement, wherein an SMA spring and a bias spring are arranged resiliently against each other with respect to a moving lens element. Japanese Unexamined Patent Publication No. 2005-195998 (D2) discloses an arrangement, wherein an SMA wire is spirally wound around an outer circumference of a cam cylinder for guiding a lens element in an optical axis direction to pivotally move the cam cylinder by a contraction force of the SMA wire. Japanese Unexamined Patent Publication No. 2002-130114 (D3) discloses an arrangement, wherein an SMA wire is wound over a lens frame member and a fixed portion to move the lens frame member by a contraction force of the SMA wire. Also, Japanese Unexamined Patent Publication No. 2005-156892 (D4) discloses a lens driving mechanism including an arrangement of increasing a contraction force of an SMA wire by a gear mechanism.

Generally, a contraction displacement amount obtained by energizing and heating an SMA wire is no more than about several % with respect to the entire length of the SMA wire. Considering durability of the SMA actuator, it is necessary to contract the SMA actuator within a displacement range of not more than about 3%. In view of this, in the arrangements of directly driving a lens element i.e. a lens frame member by the SMA actuator, as disclosed in D1 through D3, the amount capable of moving the lens element is relatively small, and an intended lens moving amount required for high-performance auto-focus or optical zoom control cannot be obtained. Use of the arrangement of D4 may be advantageous in increasing a displacement amount. However, since the gear mechanism is mounted, the arrangement may hinder reduction of the lens driving mechanism in size and weight.

SUMMARY OF THE INVENTION

In view of the above problems residing in the prior art, it is an object of the invention to provide a driving device with an SMA actuator, which enables to obtain a large displacement amount, while reducing the size and the weight of the driving device, as well as a driving mechanism, and an image sensing apparatus incorporated with the driving device.

A driving device according to an aspect of the invention is a driving device for driving a driven member. The driving device includes a driving member having a displacement output portion which is movable in a first axis direction, and a displacement input portion for moving the displacement output portion in the first axis direction in response to an application of a moving force in a second axis direction orthogonal to the first axis direction, the driving member being engaged with the driven member at the displacement output portion; and a linear shape memory alloy (SMA) actuator, disposed in contact with the driving member at least at the displacement input portion, for applying the moving force to the displacement input portion.

A driving mechanism according to another aspect of the invention includes a driven member; and a driving device for moving the driven member in a first axis direction, wherein the driving device has the aforementioned arrangement.

Preferably, the driving device is a lens unit.

An image sensing apparatus according to yet another aspect of the invention includes a lens unit, a driving device for moving the lens unit in a direction of an optical axis thereof, an image sensor arranged on an imaging side of the lens unit, and a controller for controlling an operation of the driving device, wherein the driving device has the aforementioned arrangement.

These and other objects, features and advantages of the present invention will become more apparent upon reading the following detailed description along with the accompanying drawing.

BRIEF DESCRIPTION OF THE DRAWINGS

FIGS. 8A and 8B are diagrams showing a driving member and the SMA actuator, wherein FIG. 8A is a top plan view, and FIG. 8B is a side view.

FIGS. 17A and 17B are diagrams showing a positional relation between a driving member and an SMA actuator, as a modification 1-1 of the first embodiment, wherein FIG. 17A is a plan view and FIG. 17B is a side view.

FIGS. 18A and 18B are diagrams showing a positional relation between a driving member and an SMA actuator, as a modification 1-2 of the first embodiment, wherein FIG. 18A is a plan view and FIG. 18B is a side view.

FIGS. 19A and 19B are diagrams showing a positional relation between a driving member and an SMA actuator, as an alteration of the modification 1-2 of the first embodiment, wherein FIG. 19A is a plan view and FIG. 19B is a side view.

FIGS. 20A and 20B are diagrams showing a positional relation between a driving member and an SMA actuator, as a modification 1-3 of the first embodiment, wherein FIG. 20A is a plan view and FIG. 20B is a side view.

FIGS. 22A and 22B are diagrams showing a positional relation between a driving member and an SMA actuator, as a modification 1-5 of the first embodiment, wherein FIG. 22A is a plan view and FIG. 22B is a side view.

FIGS. 28A through 28C are diagrams showing a positional relation between a driving member and an SMA actuator as a modification 1-9 of the first embodiment, wherein FIG. 28A is a plan view, FIG. 28B is a partially cutaway side view, and FIG. 28C is a cross-sectional view showing an operation of the driving member and the SMA actuator.

FIGS. 34A and 34B are diagrams showing a lens driving module, as a modification 2-1 of the second embodiment, to which the lens driving mechanism of the second embodiment is applied, wherein FIG. 34A is a plan view, and FIG. 34B is a side view viewed from the direction of the arrow R in FIG. 34A.

FIGS. 36A and 36B are diagrams showing a lens driving module as a modification 2-3 of the second embodiment, wherein FIG. 36A is a plan view, and FIG. 36B is a partially exploded perspective view of FIG. 36A.

DETAILED DESCRIPTION OF THE PREFERRED EMBODIMENTS

Figure 1:
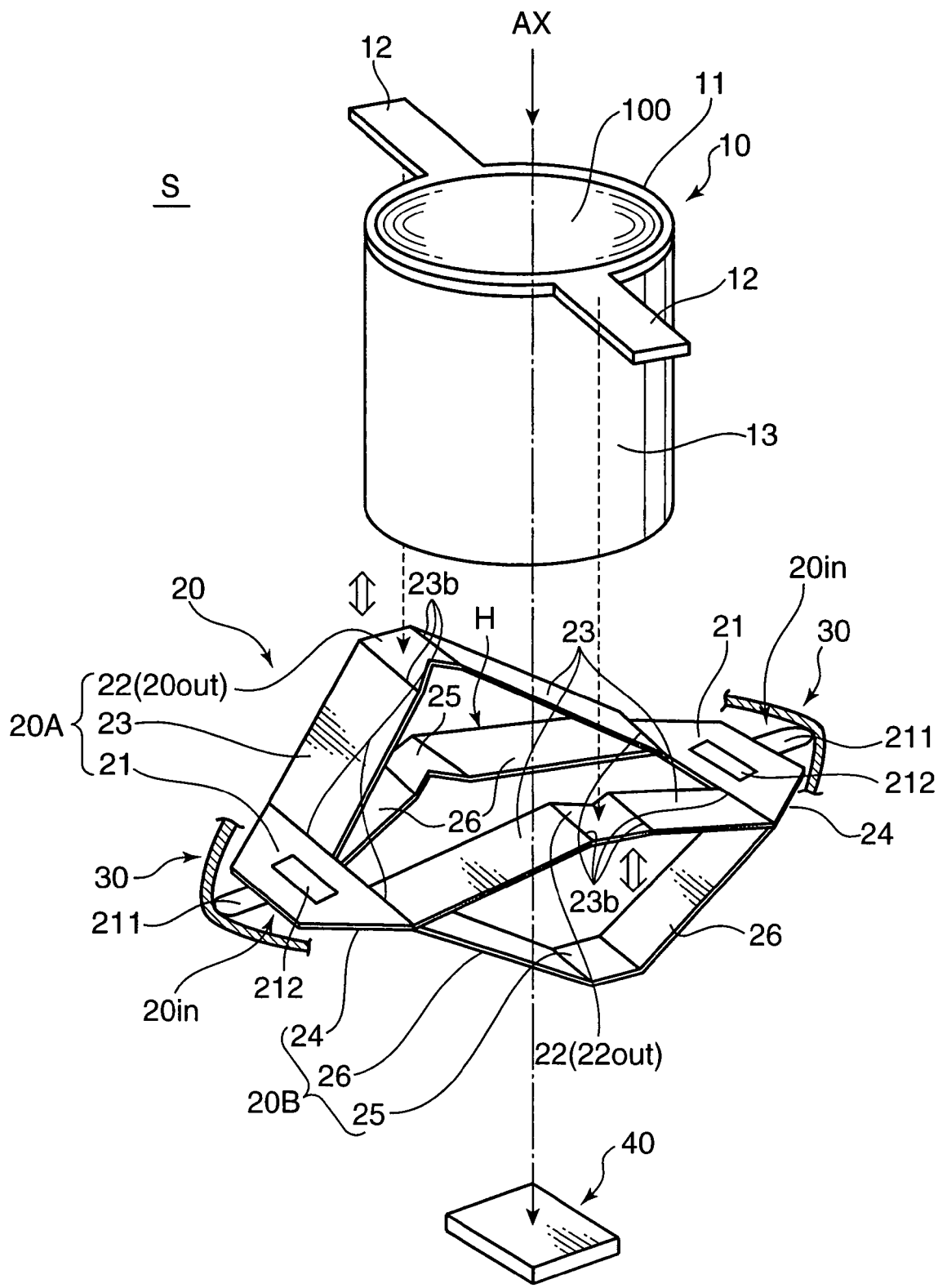
FIG. 1 is an exploded perspective view showing primary components of a lens driving module i.e. an image sensing apparatus including a lens driving mechanism as a first embodiment of the invention.

In the following, embodiments of the invention are described referring to the drawings.

First Embodiment

FIG. 1 is an exploded perspective view showing primary components of a lens driving module S i.e. an image sensing apparatus including a lens driving mechanism as a first embodiment. The lens driving module S primarily include a lens unit 10 as a driven member, a driving member 20 for moving the lens unit 10 in an optical axis AX direction i.e. a first axis direction, and an SMA actuator 30. An image sensor 40 for photoelectrically converting a subject light image into electrical signals is provided on the imaging side of the lens unit 10.

The lens unit 10 has a cylindrical shape, and includes a taking lens portion 100, a lens driving frame 11 for holding the taking lens portion 100, and a lens barrel 13 for housing the lens driving frame 11. The taking lens portion 100 has an objective lens, a focus lens, and a zoom lens, and constitutes an imaging optical system for imaging a subject image by the image sensor 40. The lens driving frame 11 is a so-called lens frame member, and is moved in the optical axis AX direction together with the lens barrel 13. A pair of supports 12 are projected from an outer circumferential wall on an object-side end of the lens driving frame 11, and are circumferentially displaced from each other by 180 degrees in phase. The lens unit 10 is engageably supported on the driving member 20 at the supports 12.

The driving member 20 includes displacement input portions 20in to which a moving force in a direction orthogonal to the optical axis AX i.e. a second axis direction is applied, and displacement output portions 20out which are moved in the optical axis AX direction in response to the application of the moving force to the displacement input portions 20in. The supports 12 of the lens unit 10 are fixedly attached to the displacement output portions 20out. The driving member 20 includes a first driving piece 20A constructed by linking four tilt arms to each other into a rectangular shape, with a hollow portion H being defined for encasing the lens unit 10 therein; and a second driving piece 20B having a rectangular link structure identical to the first driving piece 20A.

The first driving piece 20A is a thin sheet-like member having a certain strength in its entirety i.e. a strength capable of driving the lens unit 10. The first driving piece 20A includes four flat surfaces located at apex portions of the rectangle i.e. first flat surfaces 21 and second flat surfaces 22, and the four arms 23 for linking the first and the second flat surfaces. Likewise, the second driving piece 20B is a thin sheet-like member, and includes four flat surfaces located at apex portions of the rectangle i.e. third flat surfaces 24 and fourth flat surfaces 25, and four arms 26 for linking the third and the fourth flat surfaces.

Now, let it be assumed that among the four flat surfaces of the first driving piece 20A, two opposing apex portions each of which has a trapezoidal shape in top plan view (see FIG. 2) and a relatively large area are defined as the first flat surfaces 21; and other two opposing apex portions each of which has a substantially rectangular shape in top plan view and a relatively small area are defined as the second flat surfaces 22. The second flat surfaces 22 are distanced forwardly i.e. on the object side in the optical axis AX direction relative to the first flat surfaces 21. The four arms 23 connecting the first-flat surfaces 21 and the second flat surfaces 22 are tilted upwardly viewed from the first flat surfaces 21 due to the displaced positional relation between the first flat surfaces 21 and the second flat surfaces 22. Actually, the first flat surfaces 21, the second flat surfaces 22, and the arms 23 are integrally formed into a one-piece unit. The first flat surfaces 21 and the second flat surfaces 22 are divided one from the other by bent portions 23b, formed near the apices of the rectangle, respectively.

Similarly to the first driving piece 20A, the second driving piece 20B includes two opposing apex portions each of which has a trapezoidal shape in top plan view (see FIG. 2) and a relatively large area, as the third flat surfaces 24; and other two opposing apex portions each of which has a substantially rectangular shape in top plan view and a relatively small area, as the fourth flat surfaces 25. The fourth flat surfaces 25 are distanced rearwardly i.e. on the imaging side in the optical axis AX direction relative to the third flat surfaces 24. The four arms 26 connecting the third flat surfaces 24 and the fourth flat surfaces 25 are tilted downwardly viewed from the third flat surfaces 24 due to the displaced positional relation between the third flat surfaces 24 and the fourth flat surfaces 25. Similarly to the first driving piece 20A, actually, the third flat surfaces 24, the fourth flat surfaces 25, and the arms 26 are integrally formed into a one-piece unit. The third flat surfaces 24 and the fourth flat surfaces 25 are divided one from the other by bent portions (reference numeral is not attached) formed near the apices of the rectangle, respectively.

The first driving piece 20A and the second driving piece 20B are disposed as opposed to each other in the optical axis AX direction in such a way that the corresponding one of the first flat surfaces 21 and the corresponding one of the third flat surfaces 24 are firmly contacted. The corresponding one of the first flat surfaces 21 and the corresponding one of the third flat surfaces 24 are integrally jointed by a rivet 212. The jointing may be performed by adhesion using spot welding or an adhesive agent. As a result of the jointing, the second flat surfaces 22 of the first driving piece 20A and the fourth flat surfaces 24 of the second driving piece 20B are disposed as opposed to each other in the optical axis AX direction. Thereby, the driving member 20 has a pantograph-like stereoscopic configuration.

A material for composing the first driving piece 20A and the second driving piece 20B is not specifically limited. As far as the material has a sufficient strength capable of transmitting a driving force, and functions as joints by elastic deformation of the bent portions 23b, a material such as a metal sheet or a resin sheet may be used. Particularly, it is desirable to use a resin material which has a small flexural modulus to suppress loss of force resulting from elastic deformation of the bent portions 23b, a large flexure strength to resist against fracture resulting from elastic deformation, and a superior heat resistance. Examples of the resin material are polycarbonate and ethyleneterephthalate.

The driving member 20 has the displacement input portions 20in corresponding to the two apex portions of the rectangle defined by jointing the first flat surfaces 21 and the third flat surfaces 24. Also, the driving member 20 has the displacement output portions 20out corresponding to the other two apex portions of the rectangle corresponding to the second flat surfaces 22 of the first driving piece 20A. In this arrangement, the supports 12 of the lens unit 10 are engaged with the second flat surfaces 22. Also, the fourth flat surfaces 25 of the second driving piece 20B serve as fixed portions where the driving member 20 is fixed to an unmoved base member 51 (see FIGS. 2 through 4). Guide pieces 211 i.e. winding portions are projected diagonally from outer peripheries of the displacement input portions 20in to which an inwardly acting moving force toward the optical axis i.e. a moving force in a direction orthogonal to the optical axis is applied from the SMA actuator 30.

In this embodiment, the SMA actuator 30 is a linear actuator, which is a shape memory alloy (SMA) wire made of e.g. Ni—Ti alloy. The SMA actuator 30 has a property that it expands when a predetermined tension force is applied thereto in a condition of a low temperature and a low elastic modulus i.e. in a martensite phase; causes phase transformation into a condition of a high elastic modulus i.e. an austenite phase or a mother phase when heat is applied thereto in the expanded condition; and then, has its length returned to the length in the original condition before expansion, i.e. recovers its shape.

In this embodiment, the aforementioned phase transformation is caused by energizing and heating the SMA actuator 30. Specifically, the SMA actuator 30 is a conductive member having a predetermined resistance value. Accordingly, by energizing the SMA actuator 30, a Joule heat is generated, and phase transformation from the martensite phase to the austenite phase occurs by self heat generation of the SMA actuator 30 by the Joule heat. Considering the property of the SMA actuator 30, a first electrode 31a and a second electrode 31b (see FIGS. 2 and 3) for energizing and heating the SMA actuator 30 are fixedly attached to both ends of the SMA actuator 30. As will be described later in detail, the SMA actuator 30 is wound over the guide pieces 211 of the displacement input portions 20in to apply a moving force resulting from shape recovery of the SMA actuator 30 by heating to the displacement input portions 20in.

The image sensor 40 photoelectrically converts a subject light image formed by the lens unit 10 into image signals of respective color components of R, G, and B in accordance with the amount of the subject light image for outputting the image signals. For instance, the image sensor 40 is a one-chip color area sensor of a so-called "Bayer matrix", in which patches of color filters each in red (R), green (G), and blue (B) are attached in a checkered pattern on respective surfaces of CCDs (charge coupled devices) arrayed in two dimensions. Examples of the image sensor 40 are a CMOS image sensor, and a VMIS image sensor in addition to the CCD image sensor.

Figure 2:
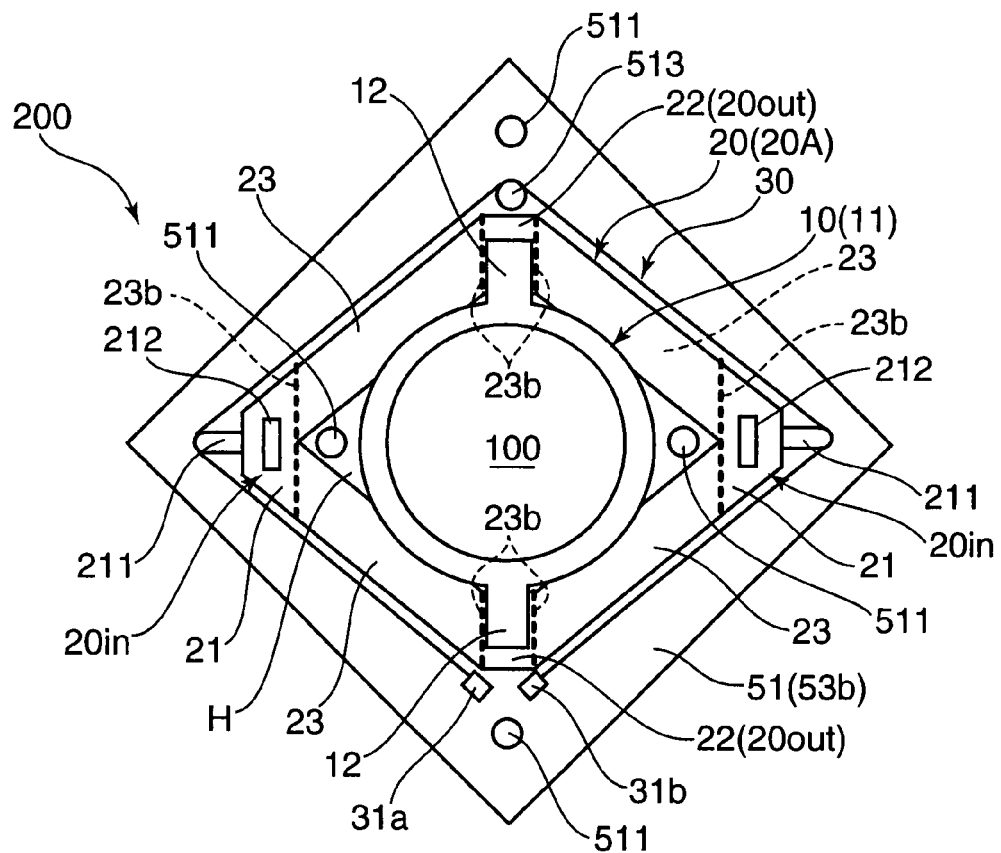
FIG. 2 is a top plan view of the lens driving mechanism as the first embodiment.
Figure 3:
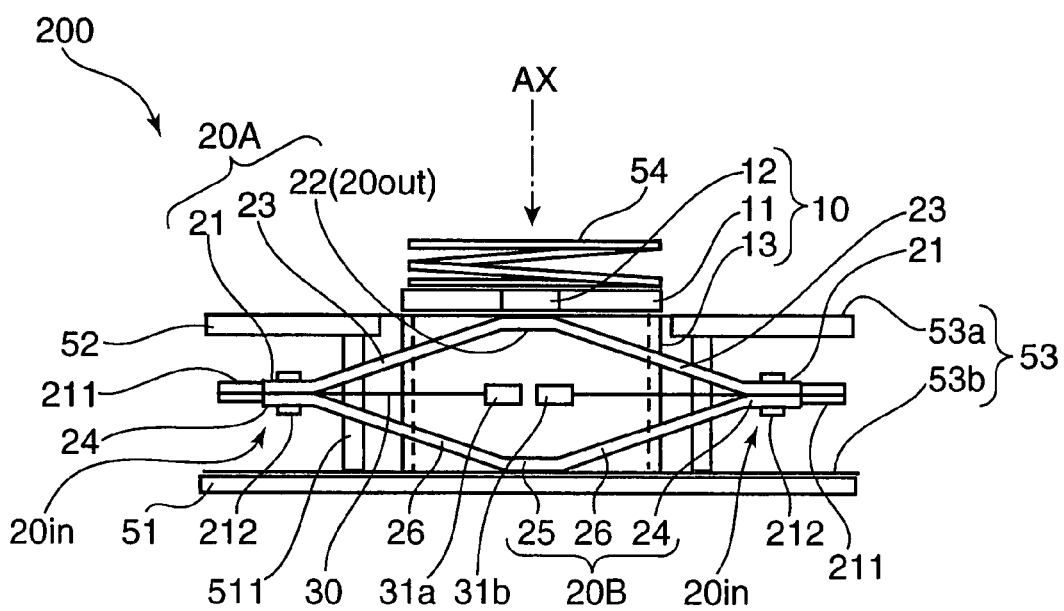
FIG. 3 is a side view of the lens driving mechanism shown in FIG. 2.

Next, an entire structure of the lens driving mechanism is described. FIG. 2 is a top plan view of the lens driving mechanism 200 according to the first embodiment i.e. a plan view with a top plate 52 being omitted. FIG. 3 is a side view of the lens driving mechanism 200. The lens driving mechanism 200 includes the base member 51, the top plate 52, a parallel plate spring 53, and a bias spring 54, in addition to the lens unit 10, the driving member 20, and the SMA actuator 30. The lens driving mechanism 200 is assembled in such a manner that the driving member 20 for encasing the lens unit 10 is vertically sandwiched between the base member 51, and the top plate 52 and the parallel plate spring 53, and that the bias spring 54 is disposed on the object side of the lens unit 10. The SMA actuator 30 is wound around the rectangular driving member 20 in top plan view.

Figure 4:
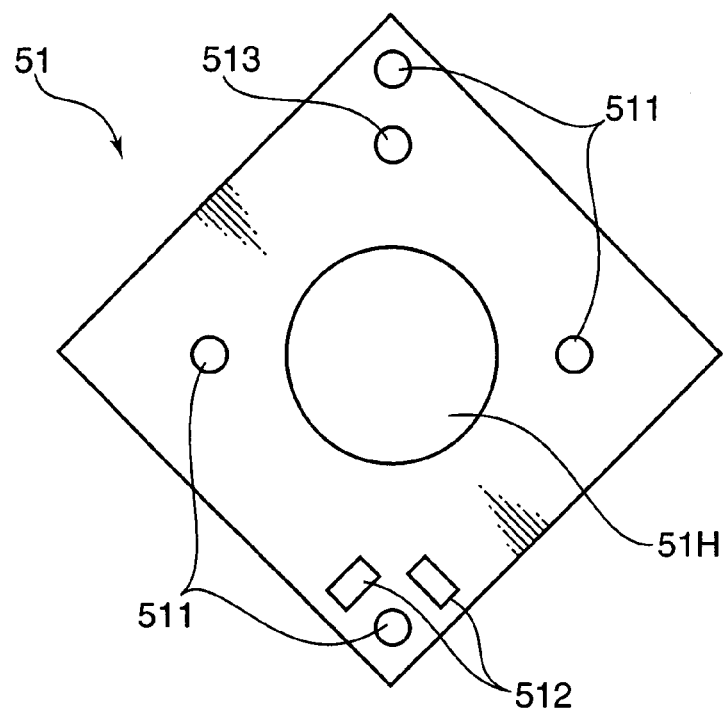
FIG. 4 is a top plan view showing a shape of a base member.

The base member 51 is a member on which the lens driving mechanism 200 is fixedly mounted e.g. a frame or a mount substrate for a camera phone. The base member 51 is an unmoved member constituting a bottom portion of the lens driving mechanism 200. FIG. 4 is a top plan view showing a shape of the base member 51. The base member 51 is a square plate member made of a resin i.e. an insulating material, and includes a through-hole 51H, supports 511, electrode fixing portions 512, and a tension guide 513.

The through-hole 51H is adapted to pass a light image from the lens unit 10 to the image sensor 40, and is formed substantially in the middle of the base member 51. The supports 511 are adapted to support the top plate 52, and are diagonally arranged in pair each along a diagonal of the base member 51, i.e. four supports in total. One of the support pairs 511 are formed upright at positions relatively close to the through-hole 51H to extend through the hollow portion H of the driving member 20, and the other of the support pairs 511 are formed upright at positions close to corner portions of the base member 51.

The electrode fixing portions 512 are adapted to support the first electrode 31a and the second electrode 31b of the SMA actuator 30, respectively. The two electrode fixing portions 512 are formed upright substantially in proximity to one of the corner portions of the base member 51. The height of the electrode fixing portion 512 is set to about a half of the support 511, whereby the first electrode 31a and the second electrode 31b are supported at a substantially intermediate position between the base member 51 and the top plate 52. In FIGS. 2 and 3, the electrode fixing portions 512 are not illustrated for sake of simplifying the illustration.

The tension guide 513 is adapted to wind the SMA actuator 30 along the rectangular shape of the driving member 20. The tension guide 513 is formed upright at a position diagonally opposite to the electrode fixing portions 512. The height of the tension guide 513 is substantially the same as the support 511. However, since the tension guide 513 does not have to support the top plate 52, the height of the tension guide 513 may be set slightly higher than the electrode fixing portion 512. Preferably, the tension guide 513 may be formed with a curved recess or a like portion at a site where the SMA actuator 30 is wound.

The SMA actuator 30 is, as shown in FIG. 2, wound over the electrode fixing portions 512, the tension guide 513, and the guide pieces 211 of the two displacement input portions 20in. The SMA actuator 30 is wound around the driving member 20 in this way. Specifically, the SMA actuator 30 is first wound over one of the electrode fixing portions 512 which is provided near one of the displacement output portions 20out of the driving member 20, wound over the guide piece 211 of one of the displacement input portions 20in, the tension guide 513 located near the other of the displacement output portions 20out, and the guide piece 211 of the other of the displacement input portions 20in, and then, is wound over the other of the electrode fixing portions 512 which is provided near the one of the displacement output portions 20out to make one turn.

With the thus-wound SMA actuator 30, the SMA actuator 30 and the driving member 20 are contacted with each other substantially exclusively at the two guide pieces 211. Thus, the frictional contact potion of the linear SMA actuator 30 with the driving member 20 is restricted to the contact portions with the guide pieces 211 i.e. the displacement input portions 20in. This allows for application of a driving force of the SMA actuator 30 to the driving member 20 with high efficiency. Preferably, the guide pieces 211 each may be formed with a curved recess or a like portion at a site where the SMA actuator 30 is wound.

As mentioned above, preferably, the driving member 20 and the SMA actuator 30 are substantially point-contacted with each other. Alternatively, the driving member 20 and the SMA actuator 30 may be linearly contacted with each other by a certain length at least including the displacement input portions. In the modification, it is desirable to satisfy the formula:

$$C \leq L/2$$

where L represents the entire length of the SMA actuator 30, and C represents the length of the SMA actuator 30 in contact with the driving member 20. In the modification, since the frictional contact portion of the SMA actuator 30 with the driving member 20 has a length equal to or smaller than L/2, the driving force of the SMA actuator 30 can be efficiently supplied to the driving member 20. Also, the modification is advantageous in efficiently heating and cooling the SMA actuator, thereby improving responsiveness.

Figure 5:
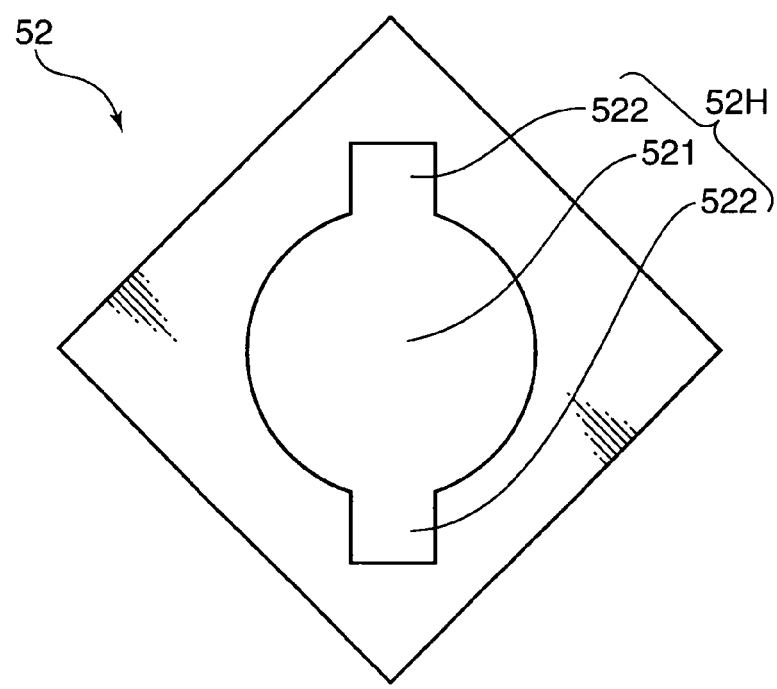
FIG. 5 is a plan view showing a shape of a top plate.

The top plate 52 functions as a cover member for protecting the driving member 20, and also functions as a holder for holding an upper plate spring 53a of the parallel plate spring 53. FIG. 5 is a plan view showing a shape of the top plate 52. The top plate 52 is a square plate member made of a metal or a resin, and is formed with a through-hole 52H near a center thereof. As mentioned above, the top plate 52 is fixedly supported by the four upright supports 511 on the base member 51 in parallel with the base member 51.

The through-hole 52H includes a center hole 521 for guiding light from a subject to the lens unit 10, and a pair of extensions 522 each extending in a diagonal direction of the base member 52 from the center hole 521. The center hole 521 has an inner diameter sufficiently large for accommodating the lens unit 10. The extensions 522 are formed at positions corresponding to the supports 12 of the lens unit 10. The extensions 522 each has a shape slightly larger than the support 12. In mounting the lens unit 10, the lens unit 10 having a length larger than the support 511 in the optical axis AX direction is mounted on the base member 51 through the through-hole 52H, followed by mounting the top plate 52 onto the supports 511.

Figure 6:
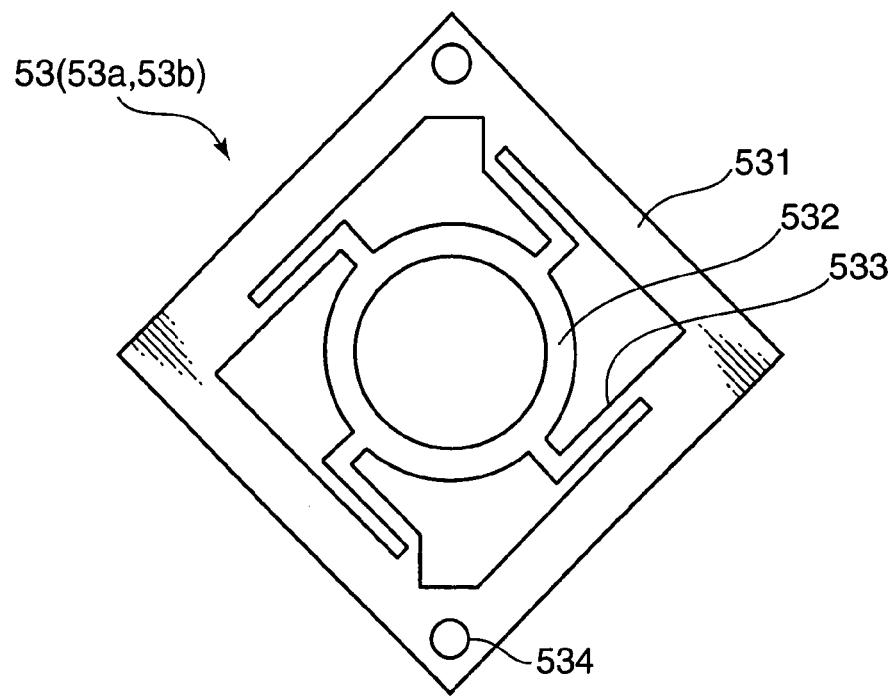
FIG. 6 is a plan view showing a shape of a parallel plate spring i.e. an upper plate spring and a lower plate spring.

The parallel plate spring 53 functions as a restrainer for restricting a displacement of the lens unit 10 in a direction other than the optical axis AX direction. The parallel plate spring 53 includes the upper plate spring 53a and a lower plate spring 53b disposed parallel to each other. FIG. 6 is a plan view showing a shape of the parallel plate spring 53 i.e. the upper plate spring 53a and the lower plate spring 53b. The parallel plate spring 53 has an outer frame portion 531, a ring portion 532, beam portions 533, and support holes 534. The upper plate spring 53a is attached to the top plate 52, and the lower plate spring 53b is attached to the base member 51, respectively.

The outer frame portion 531 of the upper plate spring 53a is fixed to the top plate 52, and the outer frame portion 531 of the lower plate spring 53b is fixed to the base member 51. The ring portions 532 of the upper plate spring 53a and the lower plate spring 53b are fixed to the lens unit 10, respectively. Specifically, the ring portion 532 of the upper plate spring 53a is mounted at an upper end of the lens unit 10, more specifically, between a lower surface of an upper end flange of the lens driving frame 11, and an upper end of the lens barrel 13. The ring portion 532 of the lower plate spring 53b is mounted at a lower end of the lens unit 10. The ring portion 532 has a ring-like shape to pass the light from the subject.

The beam portions 533 are provided to connect the outer frame portion 531 with the ring portion 532, and are not fixed to the top plate 52 and to the base member 51. The beam portions 533 protrude outwardly from an outer perimeter of the ring portion 532 at an interval of 90 degrees into a substantially L shape so that the lens unit 10 is movable in one direction along the optical axis AX, and is continued to the outer frame portion 531. Vertically accommodating the lens unit 10 through the ring portions 532 each supported by the four beam portions 533 provides the lens unit 10 with one-way latitude along the optical axis AX.

The lens driving mechanism 200 of the first embodiment inherently has a function of moving the lens unit 10 in the optical axis AX direction. However, it is likely that the lens unit 10 may be tiltingly moved with respect to the optical axis AX due to a slight positional displacement or a like balance failure, which may occur in assembling. In view of the likelihood, the parallel plate spring 53 is provided to suppress such a tilting movement, thereby enabling the lens unit 10 to move along the optical axis AX with high precision.

The support holes 534 are formed in pair in one of the diagonal directions of the outer frame portion 531. The support holes 534 are formed to receive one of the diagonally-located support pairs 511 on the displacement output portions 20out. In view of this, the support holes 534 are formed merely in the lower plate spring 53b. The other of the diagonally-located support pairs 511 on the displacement input portions 20in extend through a clearance between the outer frame portion 531 and the ring portions 532.

The bias spring 54 as a bias member biases the lens unit 10 in the optical axis direction in a direction opposite to the direction along which the displacement output portions 20out are moved in response to an operation i.e. a contraction of the SMA actuator 30. The bias spring 54 is a compression coil spring having a diameter substantially identical to the perimeter size of the lens driving frame 11, and has one end thereof i.e. a lower end thereof abutted against a top surface of the lens driving frame 11. The other end i.e. an upper end of the bias spring 54 is contacted with an inner wall of a housing of e.g. a camera phone.

The magnitude of force of the bias spring 54 is set smaller than the moving force at the displacement output portions 20out. Specifically, when the SMA actuator 30 is not operated, the lens unit 10 is pressed toward the base member 51 i.e. downwardly in FIG. 3. When the SMA actuator 30 is operated, the lens unit 10 is moved in the opposite direction i.e. upwardly in FIG. 3 against a pressing force of the bias spring 54. In other words, the bias spring 54 applies a bias force to return the lens unit 10 to its home position after the operation of the SMA actuator 30 is terminated. Mounting the bias spring 54 having the above operation enables to constantly apply the bias force to the lens unit 10. Thus, the lens unit 10 can be returned to the home position by controlling an energization amount to the SMA actuator 30, thereby facilitating driving control of the lens unit 10.

Figure 7:
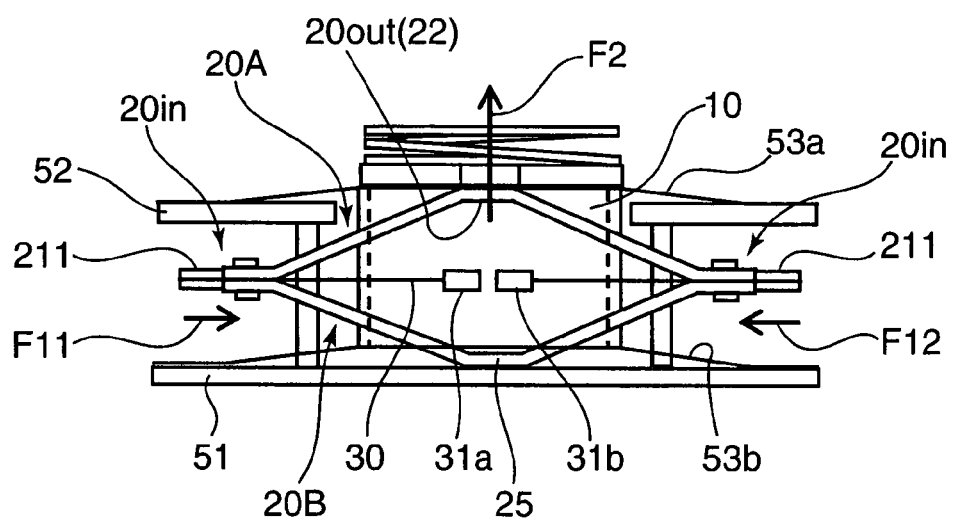
FIG. 7 is a side view showing a state that an SMA actuator is contracted by energizing and heating.
Figure 8A:
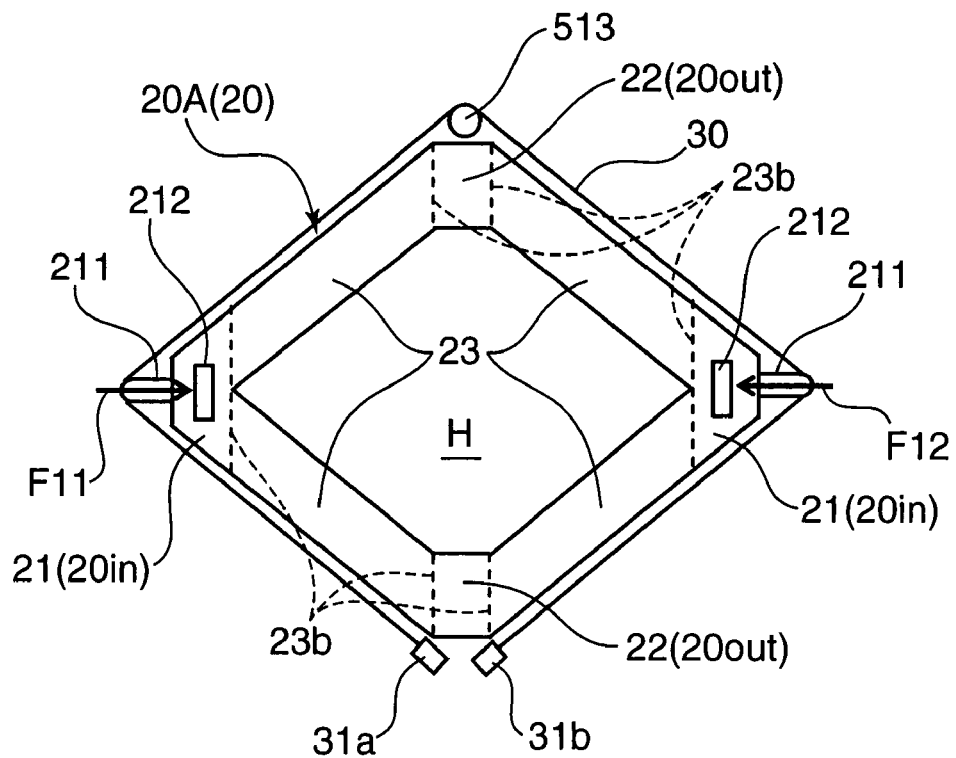
Figure 8B:
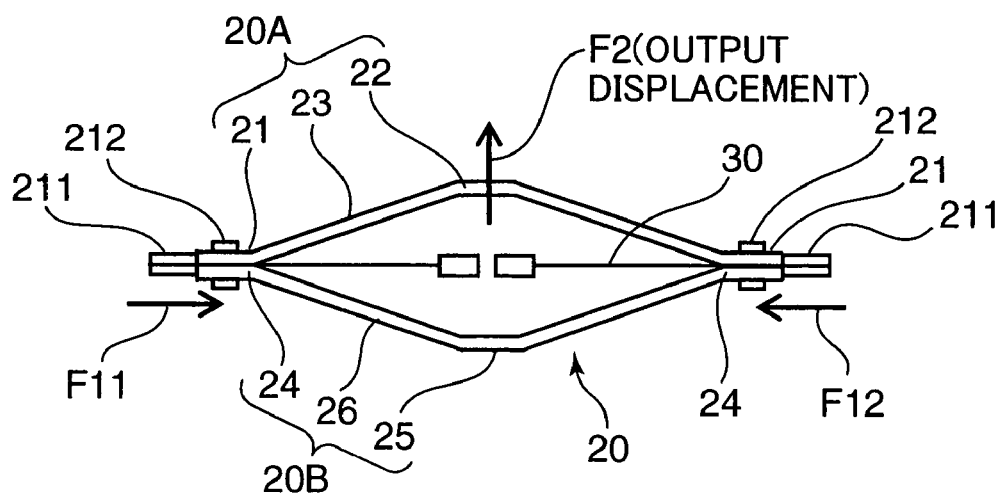

Next, a mechanical operation of the lens driving mechanism 200 having the above arrangement is described. FIG. 7 is a side view showing a state that the SMA actuator 30 is contracted by energizing and heating, whereas FIG. 3 is a side view showing a state that the SMA actuator 30 is not operated. FIGS. 8A and 8B are diagrams showing the driving member 20 and the SMA actuator 30, wherein FIG. 8A is a top plan view, and FIG. 8B is a side view.

When a predetermined voltage is applied between the first electrode 31a and the second electrode 31b of the SMA actuator 30, and the SMA actuator 30 is energized and heated to form an austenite phase, the SMA actuator 30 generates a contraction force. The contraction force is applied to the two guide pieces 211 extending outwardly from the displacement input portions 20in of the driving member 20 around which the SMA actuator 30 is wound. Specifically, inwardly acting moving forces F11 and F12 toward the optical axis AX are applied to the displacement input portions 20in at positions displaced from each other by 180 degrees.

In response to application of the moving forces F11 and F12, the driving member 20 is deformed in such a manner that a height thereof is extended in the optical axis AX direction. Specifically, the bent portions 23b shown by the dotted lines in FIG. 8A are bent by the moving force F11 and F12, respectively. Thus, the bent portions 23b function as joints. Thereby, the driving member 20 is deformed in such a manner that a gap defined by the second flat surfaces 22 of the first driving piece 20A and the fourth flat surfaces 25 of the second driving piece 20B is increased. Since the fourth flat surfaces 25 are fixed to the base member 51, a moving force F2 toward the object side along the optical axis AX is generated exclusively to the second flat surfaces 22 of the first driving piece 20A constituting the displacement output portions 20out.

The moving force F2 is transmitted from the second flat surfaces 22 to the lens unit 10 via the supports 12. Thereby, the lens unit 10 is displaced in the optical axis AX direction. In the displacement, the beam portions 533 of the upper plate spring 53a and the lower plate spring 53b are flexed upwardly i.e. toward the object side, and the bias spring 54 is brought to a compressed state.

When the energization to the SMA actuator 30 is suspended or the applied voltage is lowered to a predetermined value, the SMA actuator 30 is cooled, and the austenite phase is transformed into a martensite phase. Then, the moving forces F11 and F12 applied to the displacement input portions 20in are gone, and the lens unit 10 is returned to the home position along the optical axis AX direction by the bias force of the bias spring 54, i.e. returned to the state shown in FIG. 3. Thus, controlling on/off of the energization to the SMA actuator 30 enables to displace the lens unit 10 along the optical axis AX direction. Also, regulating the magnitudes of the moving forces F11 and F12 while controlling an energization current to the SMA actuator 30 enables to adjust the displacement amount of the lens unit 10.

In this embodiment, the SMA actuator 30 is wound around the outer perimeter of the driving member 20 into a rectangular shape, using the electrode fixing portions 512 for the first electrode 31a and the second electrode 31b, as base points i.e. the start point and the end point, and via the two guide pieces 211, and the tension guide 513 arranged at the intermediate point of the guide pieces 211. With this arrangement, an intermediate point of the entire length of the SMA actuator 30 is supported by the tension guide 513; and the guide pieces 211 are located at an intermediate point of the tension guide 513 and the electrode fixing portion 512 for the first electrode 31a, and at an intermediate point of the tension guide 513 and the electrode fixing portion 512 for the second electrode 31b, respectively.

In the above arrangement, the SMA actuator 30 expands and contracts by the same displacement amount at two segments defined by the tension guide 513 and the electrode fixing portion 512 for the first electrode 31a, and by the tension guide 513 and the electrode fixing portion 512 for the second electrode 31b, respectively. Accordingly, there is no likelihood that the SMA actuator 30 may cause friction or a like drawback at a support portion by the tension guide 513 i.e. a contact portion with the tension guide 513. Similarly, the SMA actuator 30 expands and contracts by the same displacement amount at two sub-segments divided by the corresponding guide piece 211 with respect to each of the aforementioned two segments of the SMA actuator 30. Accordingly, there is no likelihood that the SMA actuator 30 may cause friction or a like drawback at the support portions by the guide pieces 211. This enables to minimize loss of a magnitude of force resulting from friction, and to prevent damage of the SMA actuator 30 by the friction. Also, this arrangement eliminates the need of providing a sliding part or a gear meshing part, which enables to reduce the number of parts, and to avoid positional displacement including backlash. Thus, the lens unit 10 can be smoothly driven with superior responsiveness and superior output efficiency.

In the lens driving mechanism 200 of the embodiment, the displacement by contraction of the SMA actuator 30 is increased in two steps, and the thus-increased displacement is transmitted to the displacement output portions 20out. Specifically, by assembling the driving member 20 and the SMA actuator 30 in the aforementioned manner, a displacement larger than an actual contraction amount of the SMA actuator 30 can be inputted to the driving member 20, which corresponds to a first step of a displacement increasing function, and the displacement can be further increased by the link mechanism of the driving member 20, which corresponds to a second step of the displacement increasing function. With this arrangement, a large displacement can be applied to the lens unit 10, despite that the contraction amount of the SMA actuator 30 is no more than several % with respect to the entire length of the SMA actuator 30. In the following, the two-step displacement increasing function is described in detail.

<1> First Step of Displacement Increasing Function

Figure 9A:
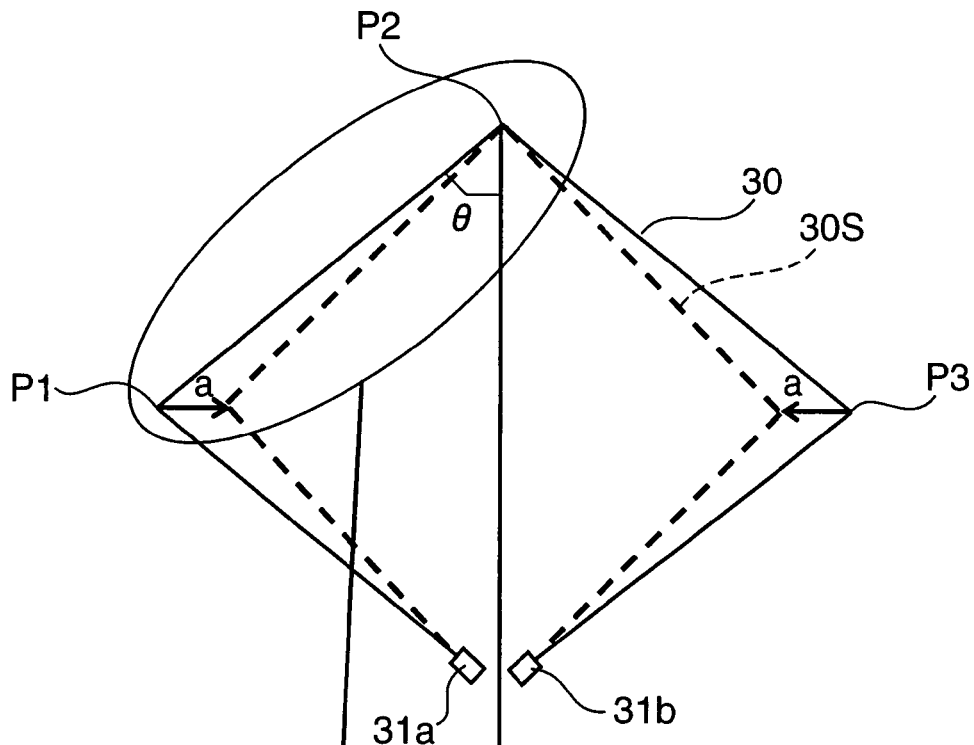
FIGS. 9A and 9B are diagrams showing a relation between a contraction displacement amount of the SMA actuator, and a displacement of the driving member.
Figure 9B:
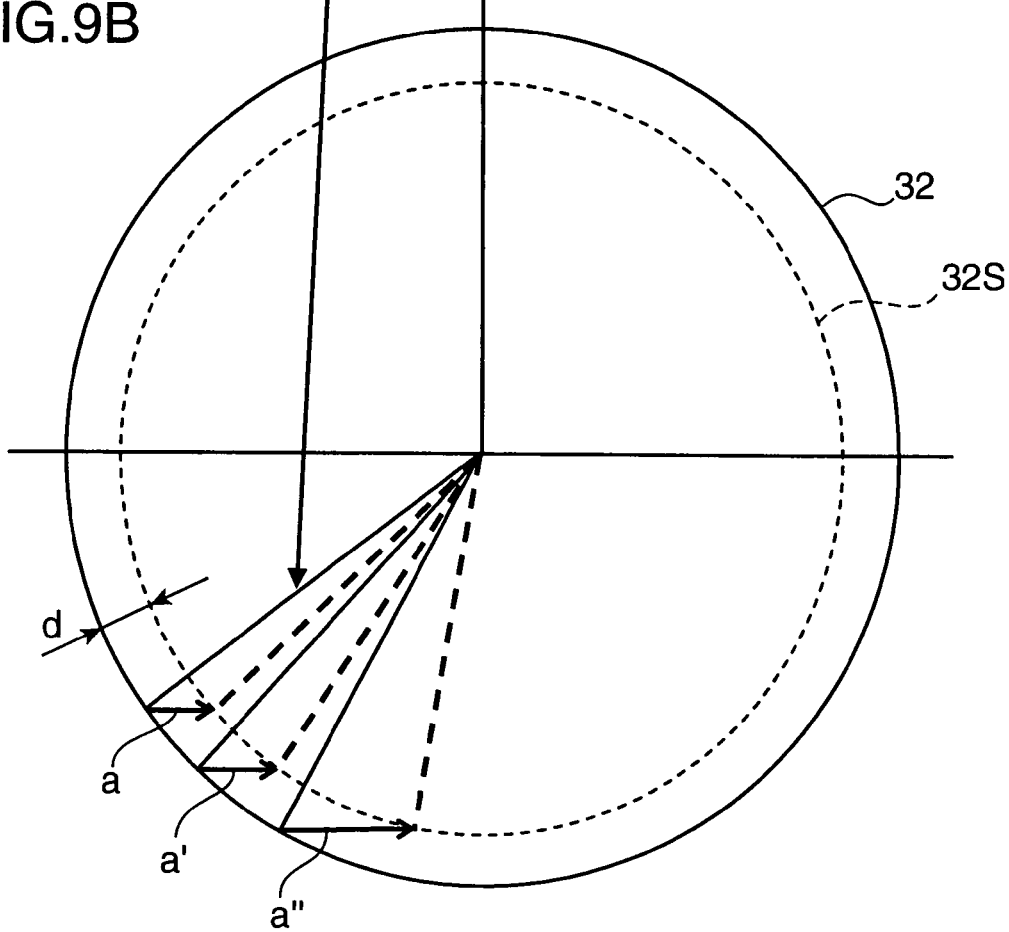

FIGS. 9A and 9B are diagrams showing a relation between a contractive displacement of the SMA actuator 30, and a displacement of the driving member 20. As shown in FIG. 9A, in an initial state that the SMA actuator 30 is not energized via the first electrode 31a and the second electrode 31b, the SMA actuator 30 is in a condition shown by the solid line in FIG. 9A. On the other hand, if the SMA actuator 30 is energized and heated, the SMA actuator 30S is brought to a condition shown by the dotted line in FIG. 9A. The symbols P1 and P3 in FIG. 9A indicate sites where the guide pieces 211 are provided, respectively, and the symbol P2 indicates a site where the tension guide 513 is provided. In this arrangement, whereas the SMA actuator 30 is fixed at the point P2, a displacement can be applied to the SMA actuator 30 by a distance "a", with respect to each of the two segments of the SMA actuator 30 at the points P1 and P3, respectively.

The circles in FIG. 9B each is a circle having the point P2 as a center, and a distance from the point P2 to the point P1 corresponding to one of the displacement input portions as a radius. The solid-line circle 32 shows a state that the SMA actuator 30 is not contracted, and the dotted-line circle 32S shows a state that the SMA actuator 30 is contracted, respectively. In this arrangement, an actual contraction amount of the SMA actuator 30 corresponds to a distance "d" in the radial direction i.e. a difference in radius between the solid-line circle 32 and the dotted-line circle 32S. However, the moving distance "a" of the SMA actuator 30 at the point P1 is larger than the distance "d". In other words, the above shows that a displacement larger than the actual contraction amount of the SMA actuator 30 can be applied at the points P1 and P3.

This is because the contraction force of the SMA actuator 30 is not acted in the winding direction of the SMA actuator 30 but is acted toward a center of a bent angle of the SMA actuator 30 i.e. in a direction inwardly toward the optical axis AX, since the SMA actuator 30 is bent at the point P1, which is the intermediate point between the first electrode 31a and the point P2. Also, the illustration of FIG. 9B shows that as a tension angle θ of the SMA actuator 30 is decreased, an input amount for displacement is increased, as indicated by the moving distances "a'", "a''".

<2> Second Step of Displacement Increasing Function

Figure 10:
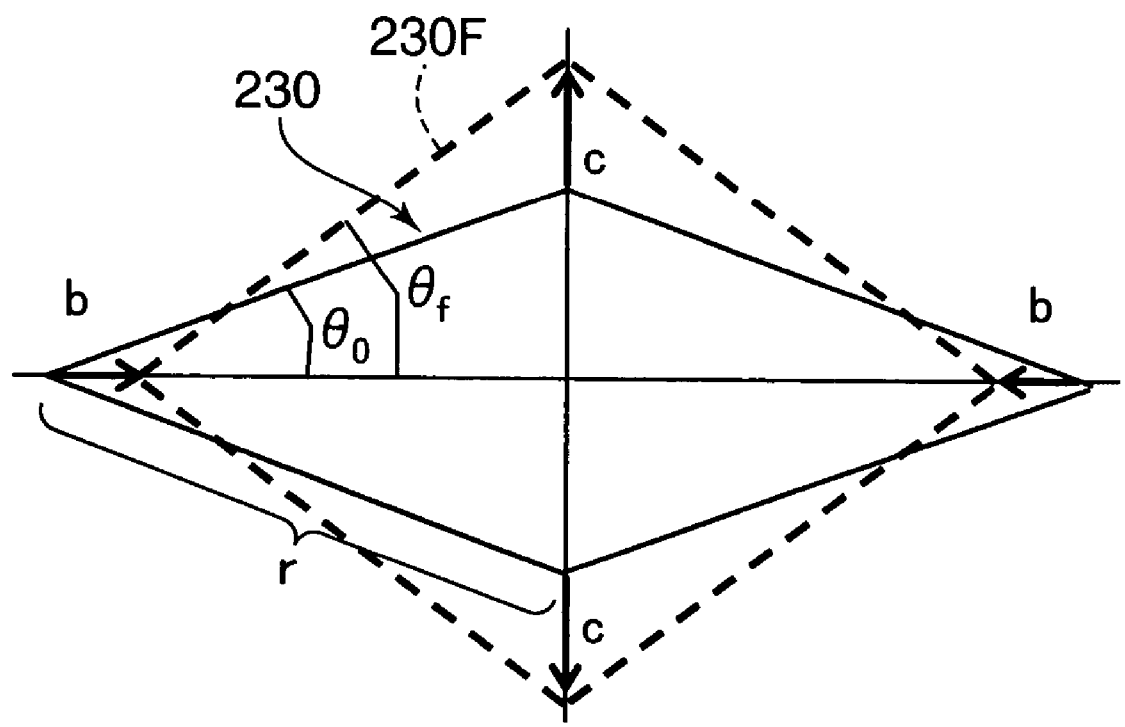
FIG. 10 is a diagram for describing a link mechanism of the driving member.

A link mechanism of the driving member 20 shown in FIG. 8B can be regarded as a four-joint link mechanism having four arms 230 with identical lengths "r", as shown in FIG. 10. As shown by the solid line in FIG. 10, when inwardly acting input displacements "b" are applied at sites corresponding to left and right joints i.e. the displacement input portions 20in in a state that the tilt angle θ of each arm 230 with respect to an imaginary line connecting the two displacement input portions 20in is $θ_0$, the arms 230 are tilted as shown by the dotted lines 230F, whereby the titled angle is changed to $θ_f$, which is larger than $θ_0$. As a result, vertically outwardly acting output displacements "c" are generated at the upper and the lower joints.

Figure 11A:
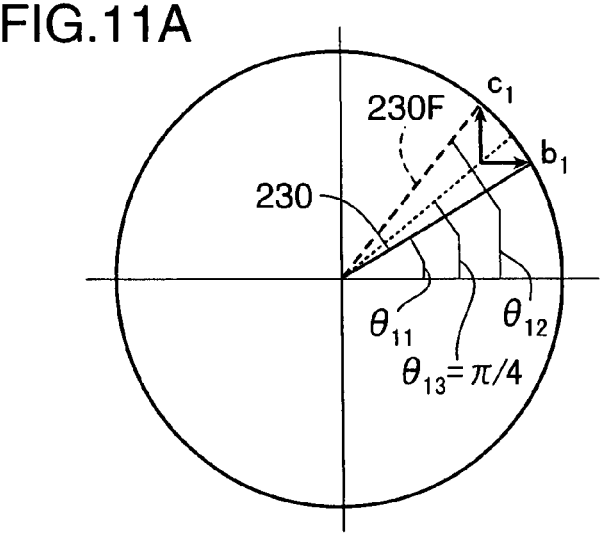
FIGS. 11A through 11C are diagrams each schematically showing a relation between an input displacement and an output displacement.
Figure 11B:
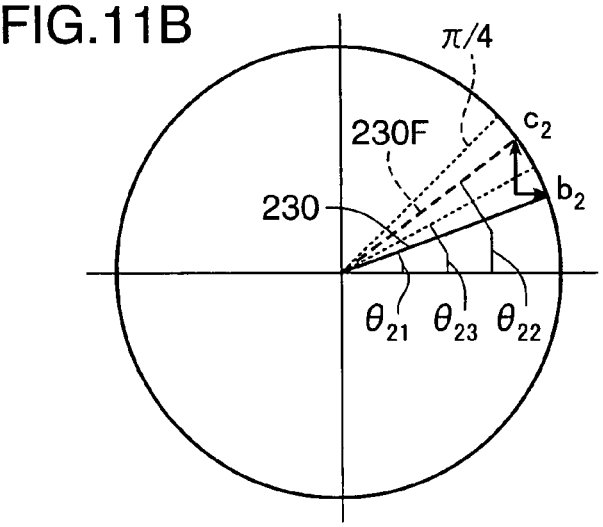
Figure 11C:
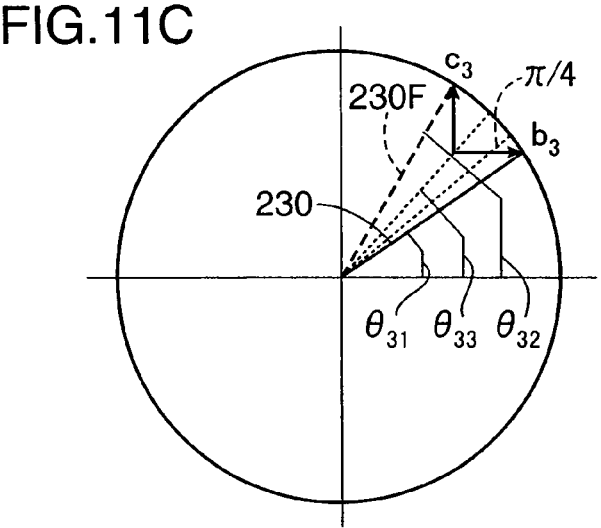

FIGS. 11A through 11C are diagrams each schematically showing a relation between the input displacement "b" and the output displacement "c". FIG. 11A shows a case that an intermediate tilt angle $θ_{13}$ between a tilt angle $θ_{11}$ in an initial state of the arm 230 indicated by the solid line, and a tilt angle $θ_{12}$ of the arm 230F shown by the dotted line after the displacement is π/4. In other words, the above relationship can be expressed by the following formula:

$$θ_{12} - θ_{13}(π/4) = θ_{13}(π/4) - θ_{11}$$

where $θ_{11}$ is the tilt angle of the arm 230 in the initial state, and $θ_{12}$ is the tilt angle of the arm 230F after the displacement, with the tilt angles $θ_{11}$ and $θ_{12}$ being symmetrical with each other with respect to π/4.

Thus, in the case where the intermediate tilt angle $θ_{13}$ is π/4, a ratio of a displacement of the upper and lower joints to a displacement of the left and right joints is 1:1. This means that an input displacement $b_1$ and an output displacement $c_1$ are equal. Accordingly, in this condition, the displacement increasing function cannot be obtained.

FIG. 11B shows a case that an intermediate tilt angle $\theta_{23}$ between a tilt angle $\theta_{21}$ in an initial state of the arm 230 indicated by the solid line, and a tilt angle $\theta_{22}$ of the arm 230F shown by the dotted line after the displacement is smaller than $\pi/4$. In this case, as shown in FIG. 11B, an output displacement $c_2$ is increased relative to an input displacement $b_2$. In other words, a relation: $b_2 < c_2$ is established.

FIG. 11C shows a case that an intermediate tilt angle $\theta_{33}$ between a tilt angle $\theta_{31}$ in an initial state of the arm 230 indicated by the solid line, and a tilt angle $\theta_{32}$ of the arm 230F shown by the dotted line after the displacement is larger than $\pi/4$. In this case, as shown in FIG. 11C, an output displacement $c_3$ is decreased relative to an input displacement $b_3$. In other words, a relation: $b_3 > c_3$ is established.

The above observation leads to a conclusion that the displacement increasing function can be obtained in the link mechanism by setting the tilt angle of the arm 230 of the link mechanism to satisfy the relation as shown in FIG. 11B. In an actual assembly, the displacement increasing function can be obtained by setting an intermediate tilt angle, between a tilt angle of the arm 230 (a tilt angle with respect to the imaginary line connecting the two displacement input portions 20in) in a condition that the lens unit 10 is in the home position and a tilt angle of the arm 230 when the lens unit 10 is moved to a farthest point, to $\pi/4$ or smaller, considering a stroke required in focus control or zoom control of the lens unit 10.

Although a further displacement increasing function can be obtained by decreasing the intermediate tilt angle, the magnitude of force to be outputted is decreased. In other words, the driving power of the lens unit 10 is decreased. In view of this, an unduly small intermediate tilt angle is not desirable. It is desirable to select the intermediate tilt angle in such a manner that the ratio of the input displacement b to the output displacement c is in the range from about 1:1.5 to 1:7, preferably from about 1:3 to 1:6, considering the driving power of the lens unit 10 and the displacement amount. In the case where the driving power is prioritized over the displacement increasing function, the intermediate tilt angle may be set to $\pi/4$, or to $\pi/4$ or more, as shown in FIG. 11A or 11C.

As mentioned above, the driving member 20 of the first embodiment has the two-step displacement increasing function. If a first displacement amount larger than a displacement of the SMA actuator 30 is inputted to the displacement input portions 20in, a second displacement amount larger than the first displacement amount can be outputted from the displacement output portions 20out. Thereby, a displacement larger than the actual displacement of the SMA actuator 30 by two steps can be applied to the lens unit 10. Accordingly, even if the displacement amount of the SMA actuator 30 is small, a lens moving amount required for auto-focus control or optical zoom control can be secured.

Figure 12:
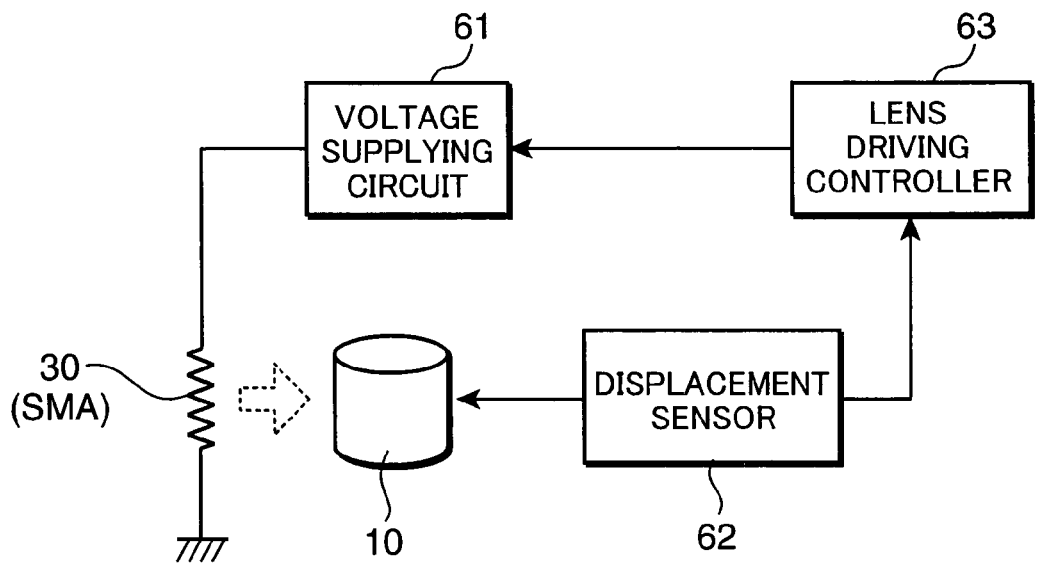
FIG. 12 is a block diagram showing a controller of the lens driving mechanism in the first embodiment.

Now, a control arrangement of the lens driving mechanism 200 of the first embodiment is described. FIG. 12 is a block diagram showing a controller 60 of the lens driving mechanism 200. The controller 60 includes a voltage supplying circuit 61, a displacement sensor 62, and a lens driving controller 63.

The voltage supplying circuit 61 is a driver for driving the SMA actuator 30, and applies a predetermined driving voltage to the SMA actuator 30 to energize and heat the SMA actuator 30 for generating a driving force. The voltage supplying circuit 61, and the first electrode 31a and the second electrode 31b of the SMA actuator 30 are electrically connected by a lead wire to apply the driving voltage generated in the voltage supplying circuit 61 to the SMA actuator 30 via the lead wire.

The displacement sensor 62 includes an optical position detecting sensor such as a photo-reflective sensor or a photo-interrupter, or a magnetic position detecting sensor using a hall element or an equivalent device. The displacement sensor 62 detects position information concerning the lens unit 10. The position information detected by the displacement sensor 62 is outputted to the lens driving controller 63. The displacement sensor 62 is provided at an appropriate position near the lens unit 10.

The lens driving controller 63 includes a microcomputer, and controls the driving voltage supplied from the voltage supplying circuit 61 to the SMA actuator 30. Specifically, the lens driving controller 63 generates a control signal for driving the SMA actuator 30 in accordance with a moving target value of the lens unit 10, which is obtained based on a position control signal for e.g. auto-focus control or optical zoom control, and current position information detected by the displacement sensor 62. The control signal is supplied to the voltage supplying circuit 61, which, in turn, generates a driving voltage in accordance with the moving target value. With use of the controller 60, positioning of the lens unit 10 on the optical axis AX can be performed.

Figure 13:
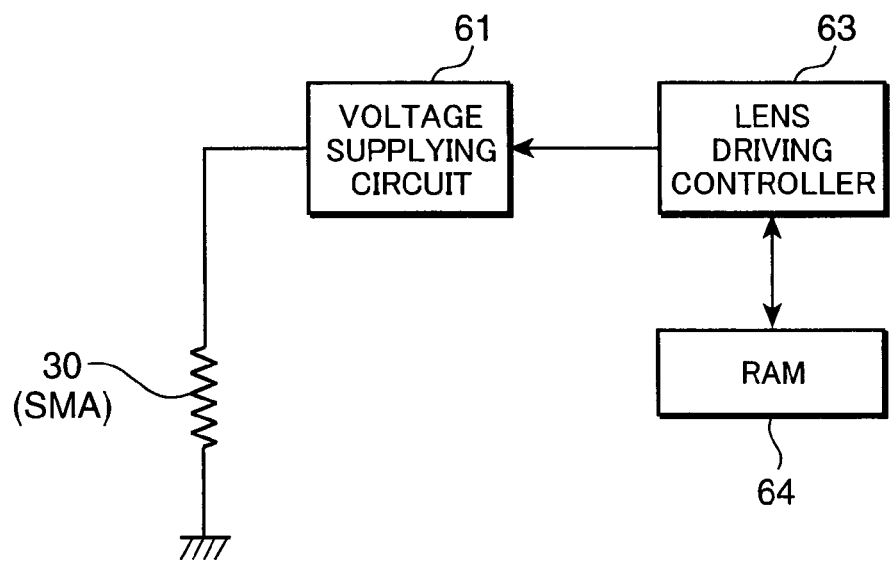
FIG. 13 is a block diagram showing a modified controller of the lens driving mechanism.

FIG. 13 is a block diagram showing a controller 60' of the lens driving mechanism 200, as a modified embodiment. Similarly to the controller 60, the controller 60' includes a voltage supplying circuit 61, a lens driving controller 63, and an RAM (Random Access Memory) 64 for storing control information concerning the lens unit 10.

Figure 14A:
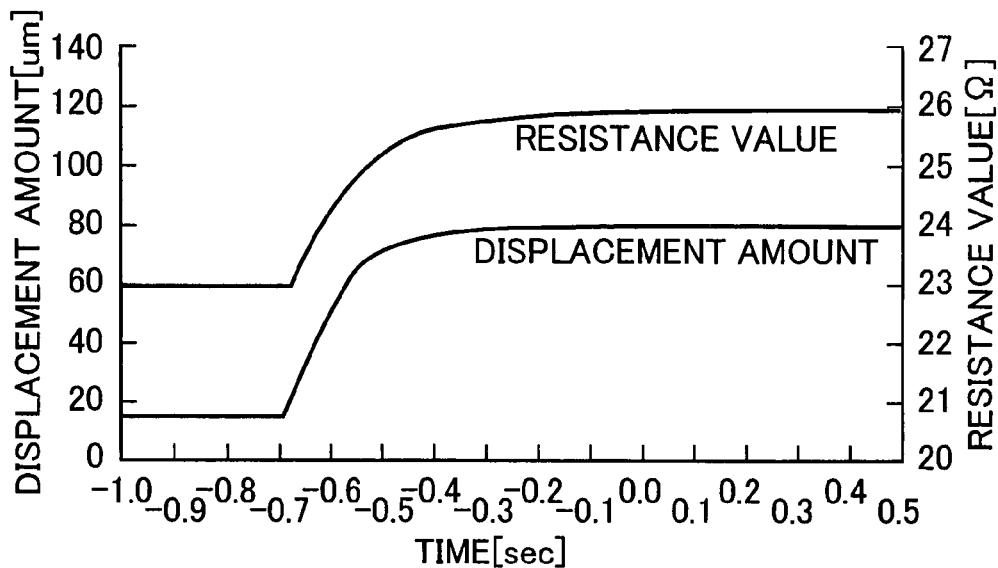
FIGS. 14A and 14B are graphs each showing a relation between a displacement amount and a resistance value by phase transformation.
Figure 14B:
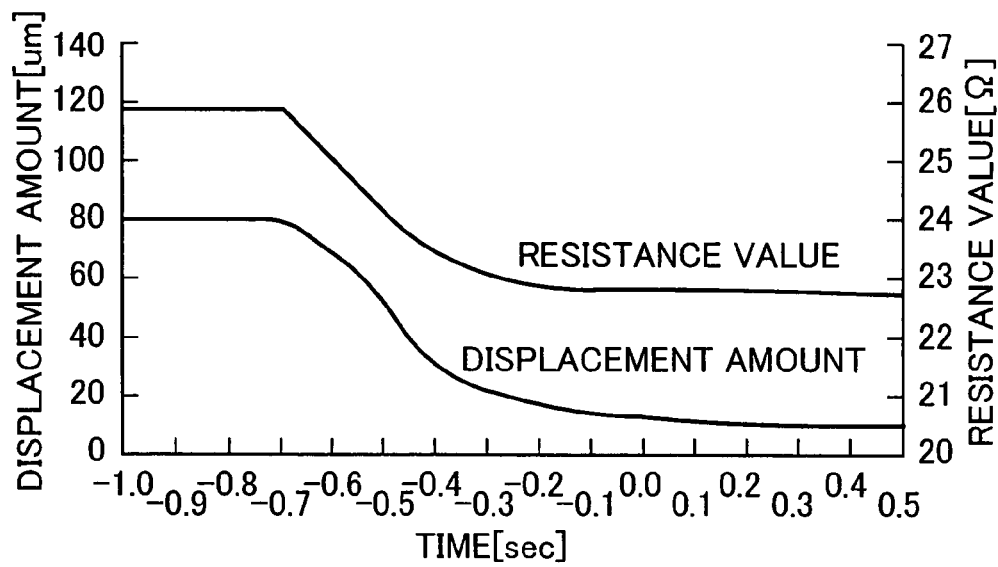

The shape memory alloy (SMA) has a property that a resistance value thereof is changed depending on phase transformation between a martensite phase and an austenite phase. FIGS. 14A and 14B are graphs each showing a relation between a displacement amount and a resistance value in association with phase transformation. FIG. 14A shows a relation between a displacement amount and a resistance value when SMA is heated, and FIG. 14B shows a relation between a displacement amount and a resistance value when SMA is cooled, respectively.

The RAM 64 stores therein data representing a relation between displacement amounts and resistance values in the form of a table, by obtaining the aforementioned property of the SMA actuator 30 to be used in the lens driving mechanism 200 in advance. The lens driving controller 63 retrieves a driving voltage from the table data stored in the RAM 64, based on the position control signal concerning the lens unit 10 and the current resistance value, while detecting the resistance value of the SMA actuator 30. Use of the controller 60' eliminates the need of additionally providing a displacement sensor, which enables to provide a compact and low-cost lens driving mechanism 200.

Figure 15A:
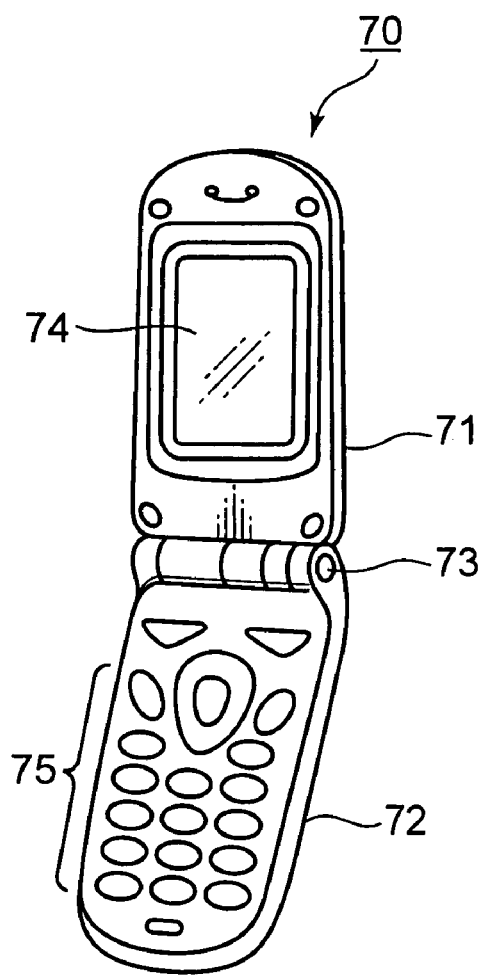
FIGS. 15A and 15B are external views of a camera phone, as an example of an image sensing apparatus.
Figure 15B:
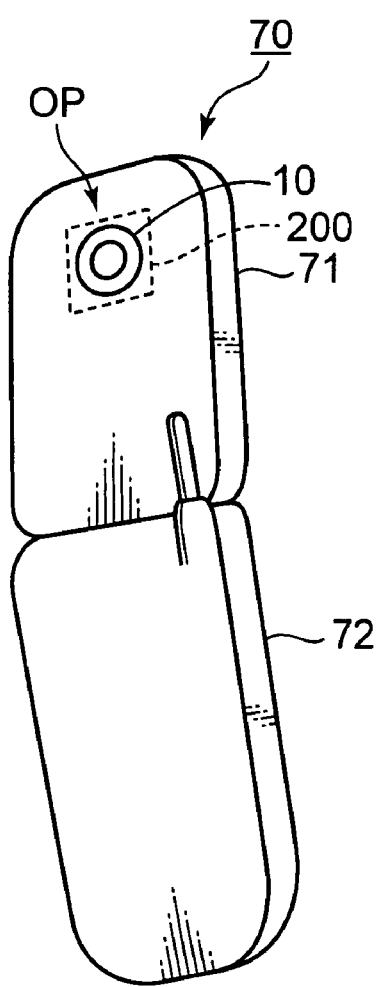

Next, an embodiment of incorporating the lens driving mechanism 200 of the embodiment in an image sensing apparatus is described. FIGS. 15A and 15B are external views of a camera phone, as an example of the image sensing apparatus. In this example, the lens driving mechanism 200 is incorporated in the lens unit 10 as a component of a camera unit OP to be built in the camera phone 70 to provide the lens unit 10 with an auto-focus function and an optical zoom function. The lens driving mechanism 200 of the embodiment may be applied to an image sensing apparatus such as a digital still camera, a digital video camera, or a personal digital assistant (PDA) each provided with a built-in taking lens unit, other than the camera phone 70.

FIG. 15A is a perspective view showing a front surface i.e. an operation surface of the camera phone 70, and FIG. 15B is a perspective view showing a rear surface thereof. As shown in FIG. 15A, the camera phone 70 has a collapsible structure constructed by linking a first casing member 71 and a second casing member 72 by hinges 73. An LCD (Liquid Crystal Display) 74 as a display section for displaying various information is provided on the front surface of the first casing member 71. A key input section 75 is provided on the front surface of the second casing member 72. As shown in FIG. 15B, the camera unit OP including the lens unit 10 is built in the rear surface of the first casing member 71, with an objective lens being exposed.

The key input section 75 includes a mode setting button for allowing a user to set a photographing mode and to switch over the photographing mode between still image photographing and moving image photographing, a magnification button for allowing the user to control an optical zoom operation i.e. a magnifying operation of the lens unit 10 in the camera unit OP, and a shutter button for allowing the user to execute a photographing operation, as well as various dial buttons for allowing the user to operate phone functions.

Figure 16:
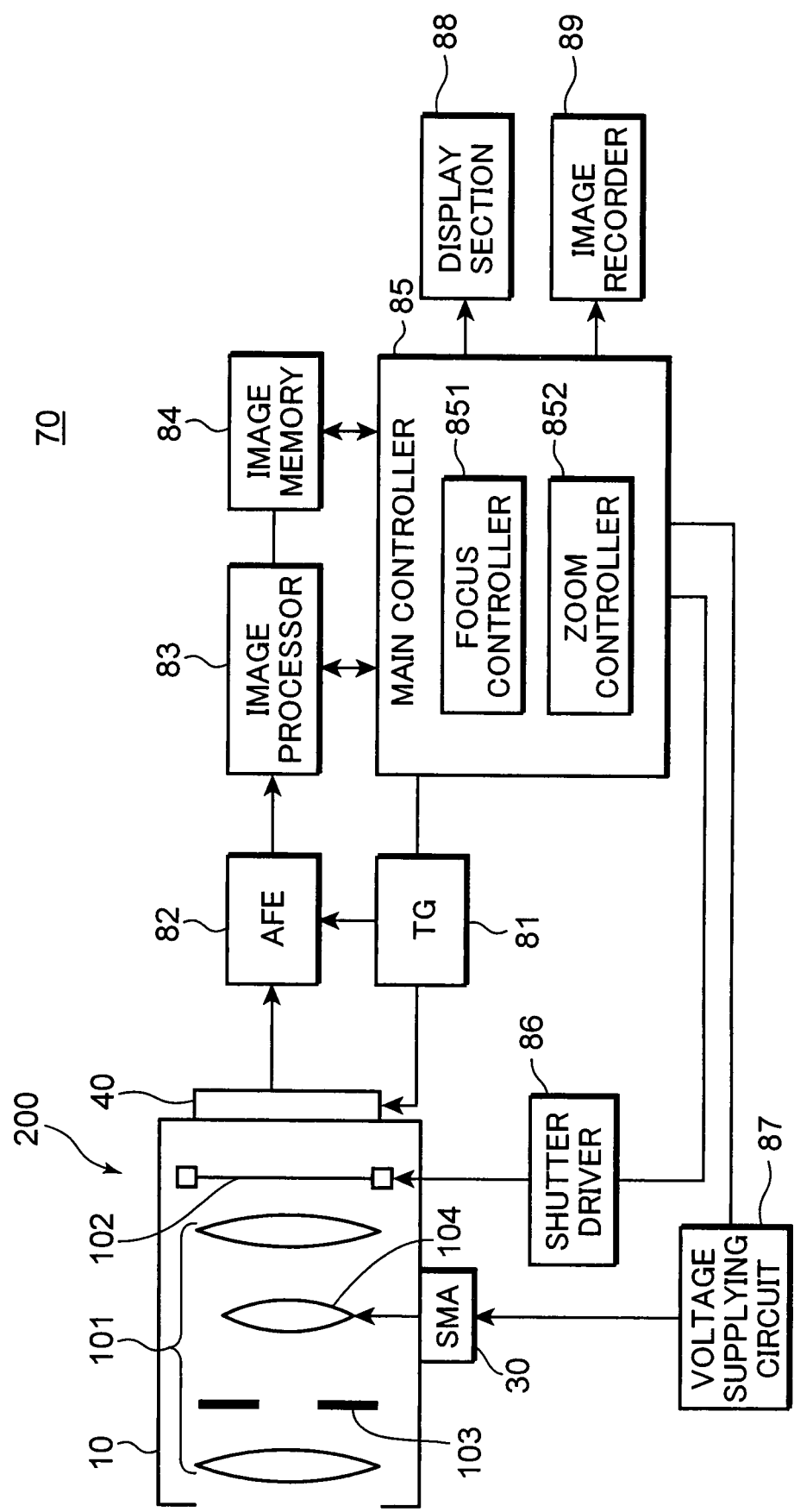
FIG. 16 is a block diagram briefly showing an electrical configuration of the camera phone.

FIG. 16 is a block diagram briefly showing an electrical configuration of the camera phone 70. The camera phone 70 includes, a timing generator (TG) 81, an analog front end (AFE) 82, an image processor 83, an image memory 84, a main controller 85, a shutter driver 86, a voltage supplying circuit 87, a display section 88, and an image recorder 89, in addition to the lens driving mechanism 200 equipped with the lens unit 10, and the image sensor 40.

The lens unit 10 constitutes an imaging optical system for imaging a light image of a subject to guide the subject light image to the image sensor 40 arranged on the imaging side of the lens unit 10. The lens unit 10 is internally provided with a lens group 102 for forming the subject light image, and a shutter 102 for blocking or passing an optical path of the imaging optical system. A diaphragm 103 is provided at an appropriate position of the lens group 102. The lens group 102 includes a moving lens 104 for focus/zoom control. The SMA actuator 30 is attached to the lens unit 10 to move the moving lens 104 in the optical axis direction.

The timing generator 81 controls an imaging operation of the image sensor 40 such as electric charge accumulation based on exposure, or readout of accumulated electric charge. The timing generator 81 generates a predetermined timing pulse such as a vertical transfer pulse, a horizontal transfer pulse, or a charge sweep pulse, based on a reference clock outputted from the main controller 85 to output the timing pulse to the image sensor 40 for controlling the imaging operation of the image sensor 40. Also, the timing generator 81 controls an A/D conversion operation by generating a predetermined timing pulse and outputting the timing pulse to the analog front end 82.

The analog front end 82 applies a predetermined signal processing to an image signal outputted from the image sensor 40 i.e. an analog signal group indicating light received on the pixels of the CCD area sensor, and converts the analog signals to digital signals for outputting the digital signals to the image processor 83. The analog front end 82 includes a correlation double sampling circuit for reducing a reset noise included in the voltage of the analog image signal, an auto gain control circuit for correcting the level of the analog image signal, a clamp circuit for fixing a potential corresponding to a black level of the image signal, and an A/D conversion circuit for converting the analog image signals of R, G, and B into digital signals of e.g. 14 bits.

The image processor 83 generates an image file by applying a predetermined signal processing to the image data outputted from the analog front end 82. The image processor 83 includes a black level correcting circuit, a white balance control circuit, a color interpolation circuit, and a gamma correction circuit. Image data inputted to the image processor 83 is temporarily written in the image memory 84 in synchronism with a readout operation of the image sensor 40. Thereafter, respective elements of the image processor 83 perform predetermined operations by accessing the image data written in the image memory 84.

The image memory 84 is a memory for temporarily storing image data outputted from the image processor 83 when the camera phone 70 is in the photographing mode, and is used as a working area when the main controller 85 performs a predetermined processing to the image data. The image memory 84 also temporarily stores image data read out from the image recorder 89 when the camera phone 70 is in an image reproduction mode.

The main controller 85 includes a CPU (Central Processing Unit), and centrally controls the respective parts of the camera phone 70, and also controls a photographing operation. Specifically, the main controller 85 controls the timing generator 81, the voltage supplying circuit 87, and the shutter driver 86 for a photographing operation, and controls output of image signals.

Further, the main controller 85 functionally includes a focus controller 851 and a zoom controller 852. The focus controller 851 and the zoom controller 852 correspond to the lens driving controller 63 described referring to FIG. 13. The focus controller 851 generates a focus control signal for moving the moving lens 104 to a focal position based on predetermined metering information. The zoom controller 852 generates a zoom control signal for moving the moving lens 104 for optical zooming. The focus control signal and the zoom control signal are supplied to the voltage supplying circuit 87.

The shutter driver 86 drives opening and closing of the shutter 102 in response to a shutter opening/closing control signal from the main controller 85 to open the shutter 102 for a predetermined time.

The voltage supplying circuit 87 corresponds to the voltage supplying circuit 61 described referring to FIG. 13, and generates a driving voltage for energizing and heating the SMA actuator 30 to drive the moving lens 104. Specifically, the voltage supplying circuit 87 generates a driving voltage for driving the moving lens 104 by the SMA actuator 30 in response to the focus control signal and/or the zoom control signal outputted from the focus controller 851 and/or the zoom controller 852.

The display section 88 corresponds to the LCD 74 shown in FIG. 15A, and is operative to display a sensed image obtained by an imaging operation or a live-view image before the imaging operation. The image recorder 89 includes a memory card, and stores image data processed by the image processor 83.

Since the lens driving mechanism 200 is loaded in the camera phone 70 having the above arrangement, a compact, lightweight, and impact resistant image sensing apparatus is provided because of use of the SMA actuator 30. Thus, provided is the image sensing apparatus that enables to secure a moving amount of a lens element required for auto-focus control or optical zoom control, and to obtain high precision in positioning without positional displacement including backlash or a like drawback, while accomplishing reduction of the number of parts and the production cost.

In the foregoing, the driving device as the first embodiment i.e. the lens driving mechanism 200 has been described. It is possible to apply the following modifications (1) through (10) as shown below, for instance, to the first embodiment.

(1) Modification 1-1: Half-Winding of SMA Actuator

In the embodiment, the SMA actuator 30 in the form of a wire is wound over the substantially entire perimeter of the driving member 20 having a rectangular shape in top plan view (see FIG. 8). Alternatively, various modifications are proposed concerning the winding manner of the SMA actuator 30 with respect to the driving member 20.

Figure 17A:
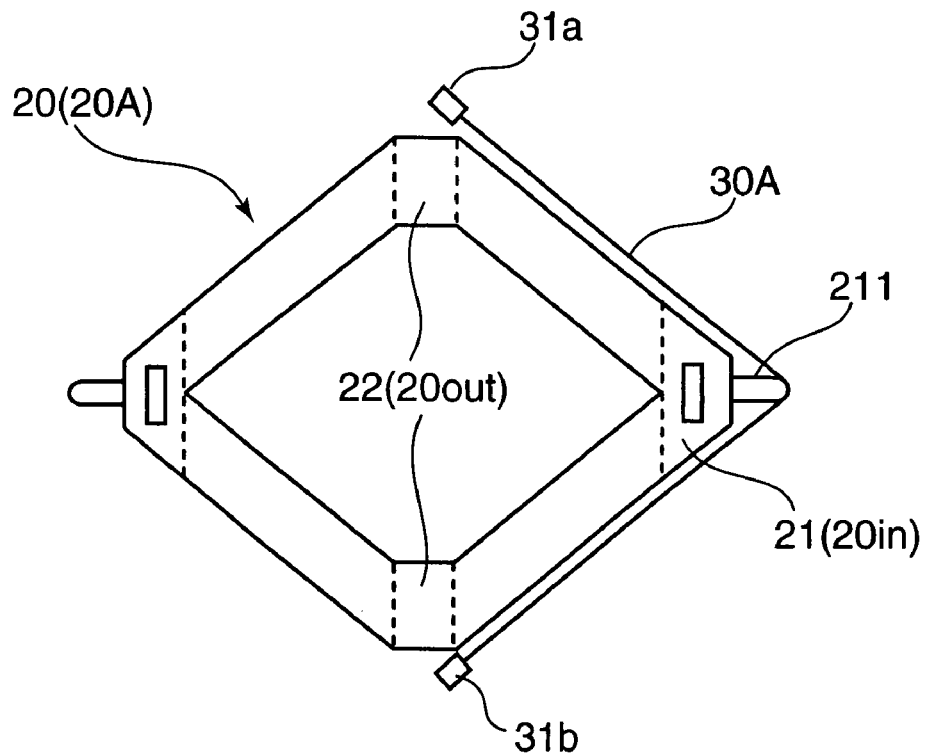
Figure 17B:
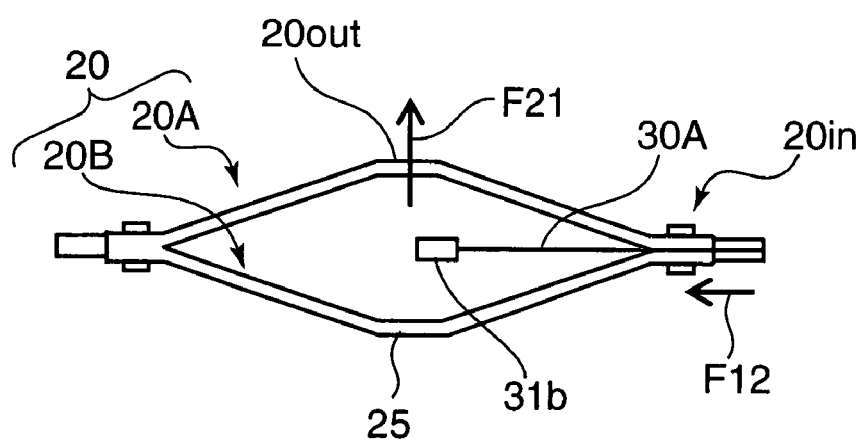

FIGS. 17A and 17B are diagrams showing a positional relation between a driving member 20 and an SMA actuator 30A as the modification 1-1. FIG. 17A is a plan view, and FIG. 17B is a side view, respectively. The elements with the same reference numerals in FIGS. 17A, 17B, and the below-mentioned drawings as those in FIGS. 8A and 8B indicate the same elements, and description thereof is omitted or simplified herein.

In the modification 1-1, the SMA actuator 30A is wound by the length about a half of the perimeter length of the driving member 20. Specifically, a first electrode 31a and a second electrode 31b of the SMA actuator 30A are arranged near a displacement output portion pair 20out, respectively, and the SMA actuator 30A is wound over merely one of displacement input portions 20in on the right side of the driving member 20.

In the arrangement of the modification 1-1, as shown in FIG. 17B, a moving force F12 is applied exclusively to the right-side displacement input portion 20in. Then, the driving member 20 is deformed in response to the application of the moving force F12, and a moving force F21 for extending the displacement output portions 20out in the optical axis direction is generated. This arrangement is advantageous in reducing the amount of the SMA wire to be used to about a half of the amount in the embodiment shown in FIGS. 8A and 8B, while securing the substantially same displacement amount of the displacement output portions 20out as in the embodiment shown in FIGS. 8A and 8B. However, since the input for displacement is applied merely to one side of the driving member 20, the magnitude of force for driving the lens driving mechanism may be lessened to about a half of the arrangement in FIGS. 8A and 8B. Further, since the optical axis may be tilted while the force is applied, a measure for preventing such a drawback may be necessary.

(2) Modification 1-2: Multiple Winding of SMA Actuator

Figure 18A:
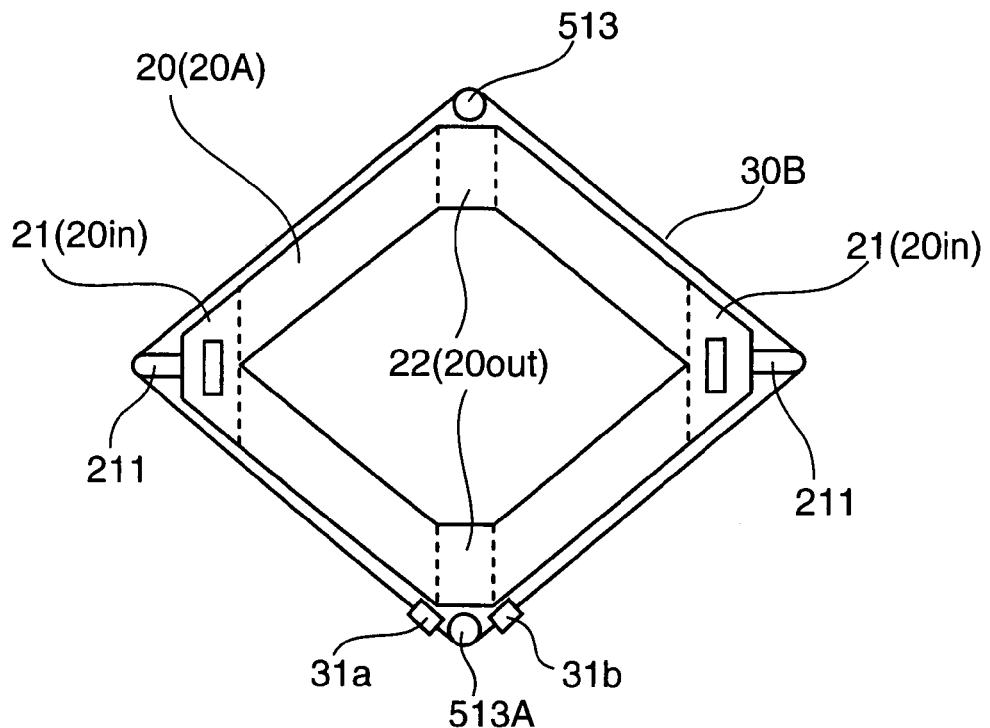
Figure 18B:
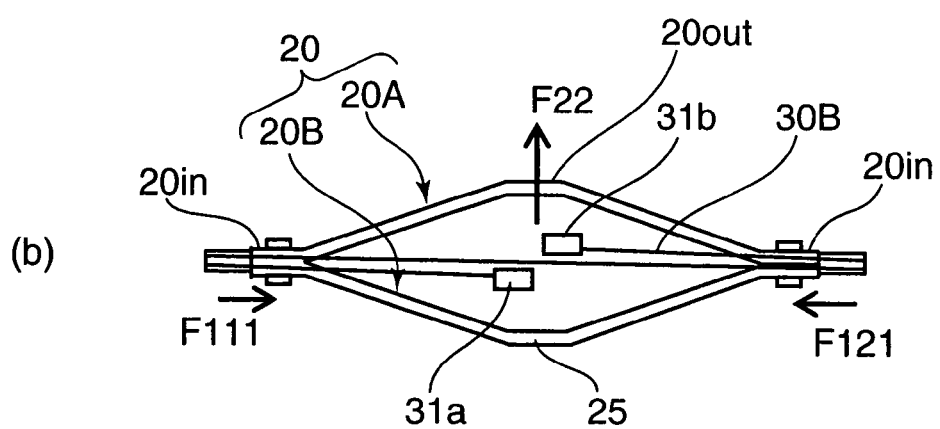

FIGS. 18A and 18B are diagrams showing a positional relation between a driving member 20 and an SMA actuator 30B as the modification 1-2. FIG. 18A is a plan view, and FIG. 18B is a side view, respectively. In the modification 1-2, the SMA actuator 30B is wound by the length about twice as long as the perimeter length of the driving member 20. Thus, the SMA actuator 30B is wound over the driving member 20 by two turns.

Specifically, a second tension guide 513A is provided upright between a first electrode 31a and a second electrode 31b arranged near one of displacement output portions 20out. The SMA actuator 30B is wound over the perimeter of the driving member 20 by about two turns, by using the second tension guide 513A, a tension guide 513 disposed diagonally opposed to the second tension guide 513A, and two guide pieces 211 of displacement input portions 20in, as four winding points. It is needless to say that the SMA actuator 30B may be wound by two turns or more.

In the modification 1-2, as shown in FIG. 18B, moving forces F111 and F121 are applied from the double-wound SMA actuator 30B to the displacement input portions 20in, respectively. Then, the driving member 20 is deformed in response to the application of the moving forces F111 and F121, and a moving force F22 for extending the displacement output portions 20out in the optical axis direction is generated. This arrangement is advantageous in increasing the magnitude of force to be applied to the displacement input portions 20in, because the SMA actuator 30B is double-wound.

Figure 19A:
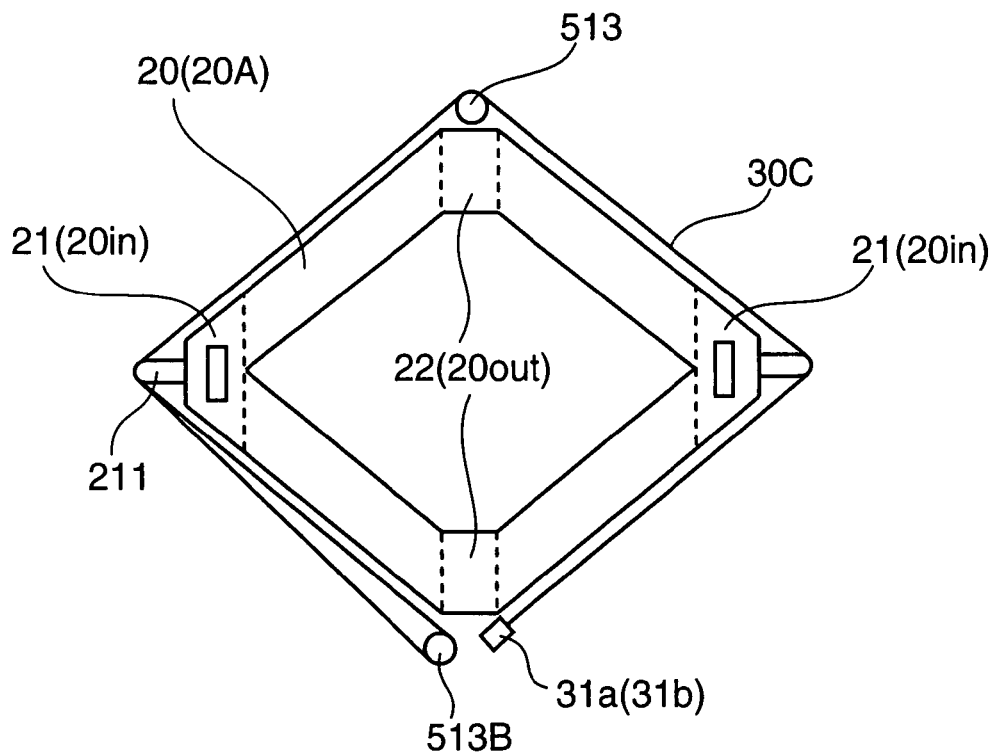
Figure 19B:
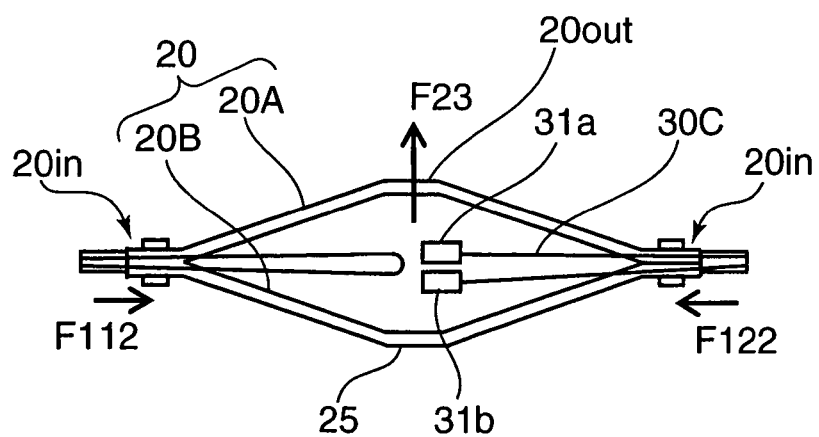

FIGS. 19A and 19B are diagrams showing a positional relation between a driving member 20 and an SMA actuator 30C as an alteration of the modification 1-2. FIG. 19A is a plan view, and FIG. 19B is a side view, respectively. Similarly to the modification 1-2, in the alteration, the SMA actuator 30C is wound by the length about twice as long as the perimeter length of the driving member 20. Also, a second tension guide 513B is provided upright near one of displacement output portions 20out.

The alteration shown in FIGS. 19A and 19B is different from the modification 1-2 shown in FIGS. 18A and 18B in the winding manner of the SMA actuator. Specifically, in the alteration, a first electrode 31a and a second electrode 31b are arranged vertically away from each other at the same position, and the SMA actuator 30C is first wound over the first electrode 31a, then, one of two guide pieces 211, a tension guide 513, the other of the two guide pieces 211, and up to the second tension guide 513B counterclockwise, then returned at the second tension guide 513B to be wound clockwise this time in the reverse manner over the other of the two guide pieces 211, the tension guide 513, and the one of the two guide pieces 211, and finally returned to the second electrode 31b.

In the alteration, as shown in FIG. 19B, moving forces F112 and F122 with a larger magnitude are applied from the double-wound SMA actuator 30C to the displacement input portions 20in, respectively. Then, the driving member 20 is deformed in response to the application of the moving forces F112 and F122, and a moving force F23 with a larger magnitude to extend the displacement output portions 20out in the optical axis direction can be generated.

(3) Modification 1-3: Segment Winding of SMA Actuator

Figure 20A:
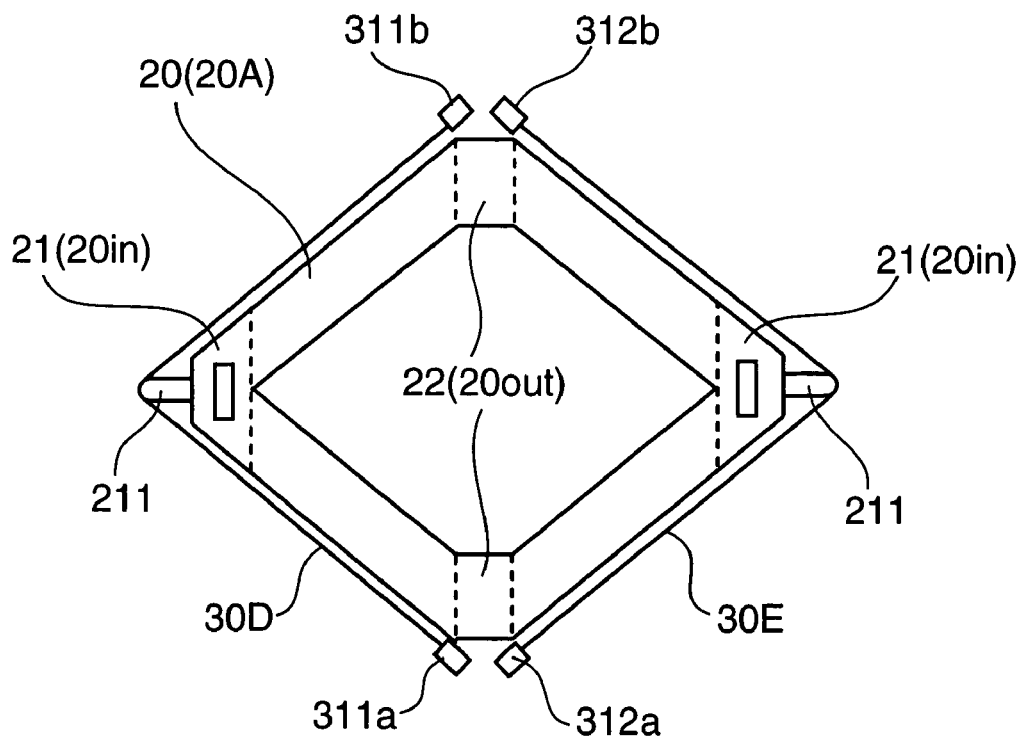
Figure 20B:
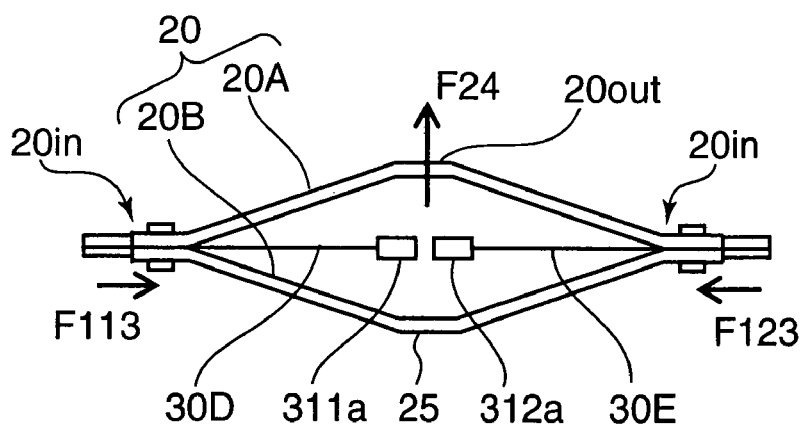

FIGS. 20A and 20B are diagrams showing a positional relation between a driving member 20 and two SMA actuators 30D and 30E as the modification 1-3. FIG. 20A is a plan view, and FIG. 20B is a side view, respectively. In the modification 1-3, the two SMA actuators 30D and 30E each having a length about a half of the perimeter length of the driving member 20 are used.

A first electrode 311a and a second electrode 311b of the SMA actuator 30D are arranged near a displacement output portion pair 20out, respectively, and the SMA actuator 30D is wound merely over one of displacement input portions 20in on the left side of the driving member 20. Likewise, a first electrode 312a and a second electrode 312b of the SMA actuator 30E are arranged near the displacement output portion pair 20out, respectively, and the SMA actuator 30E is wound merely over one of the displacement input portions 20in on the right side of the driving member 20.

In the arrangement of the modification 1-3, as shown in FIG. 20B, a moving force F113 is applied from the SMA actuator 30D to the left-side displacement input portion 20in, and a moving force F123 is applied from the SMA actuator 30E to the right-side displacement input portion 20in. Then, the driving member 20 is deformed in response to the application of the moving forces F113 and F123, and a moving force F24 for extending the displacement output portions 20out in the optical axis direction is generated. This arrangement is advantageous in increasing a current value in the case where the same voltage as in the embodiment is applied, because the relatively short two SMA actuators 30D and 30E are used, as compared with the arrangement of using a single SMA wire. This enables to increase displacement responsiveness.

(4) Modification 1-4: Changing Winding Route of SMA Actuator

Figure 21:
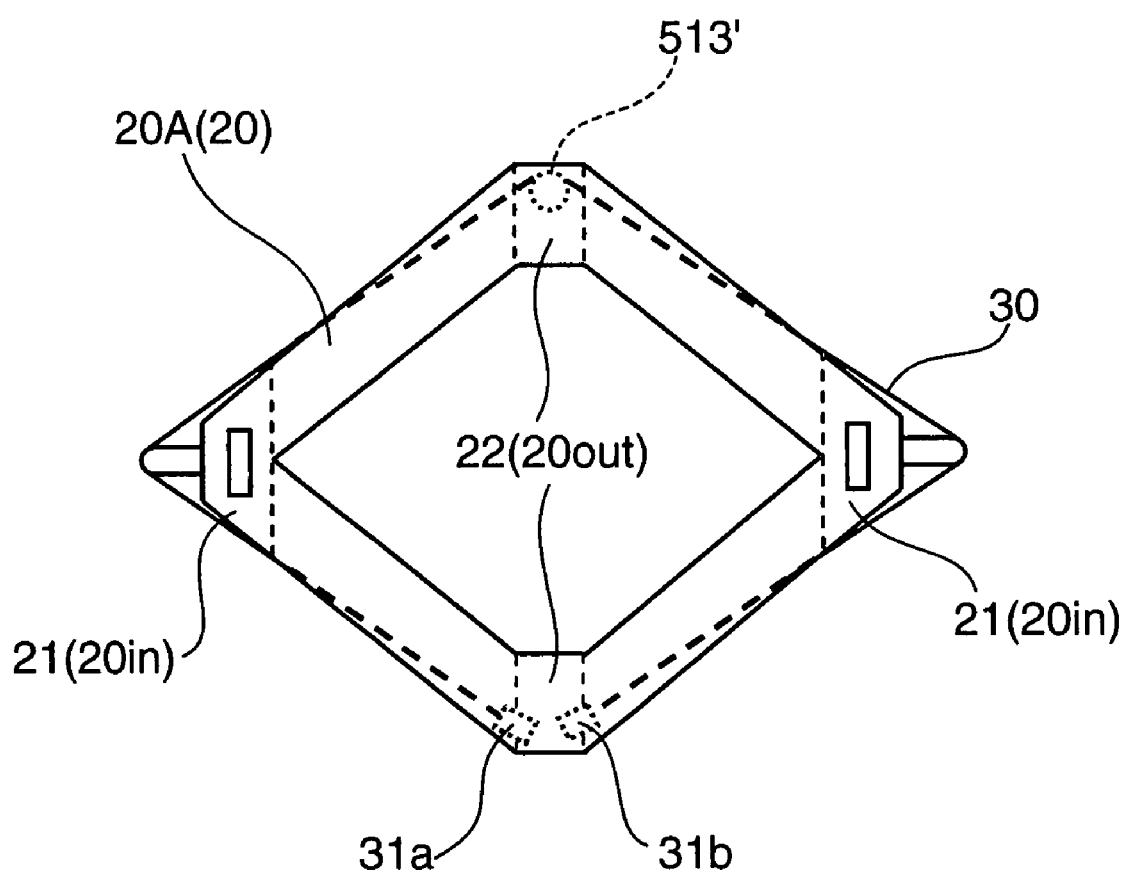
FIG. 21 is a plan view showing a positional relation between a driving member and an SMA actuator, as a modification 1-4 of the first embodiment.

FIG. 21 is a diagram showing a positional relation between a driving member 20 and an SMA actuator 30 as the modification 1-4. The modification 1-4 is substantially the same as the embodiment shown in FIGS. 8A and 8B, but is different in that a tension guide 513' is arranged at a different position and that a first electrode 31a and a second electrode 31b are fixedly disposed in a hollow space defined inside the driving member 20, in place of the periphery of the driving member 20 in top plan view. This arrangement is advantageous in reducing the size of the lens driving mechanism, because the winding route of the SMA actuator 30 is partially located inside the driving member 20.

(5) Modification 1-5: Decreasing Thickness of Driving Member

Figure 22A:
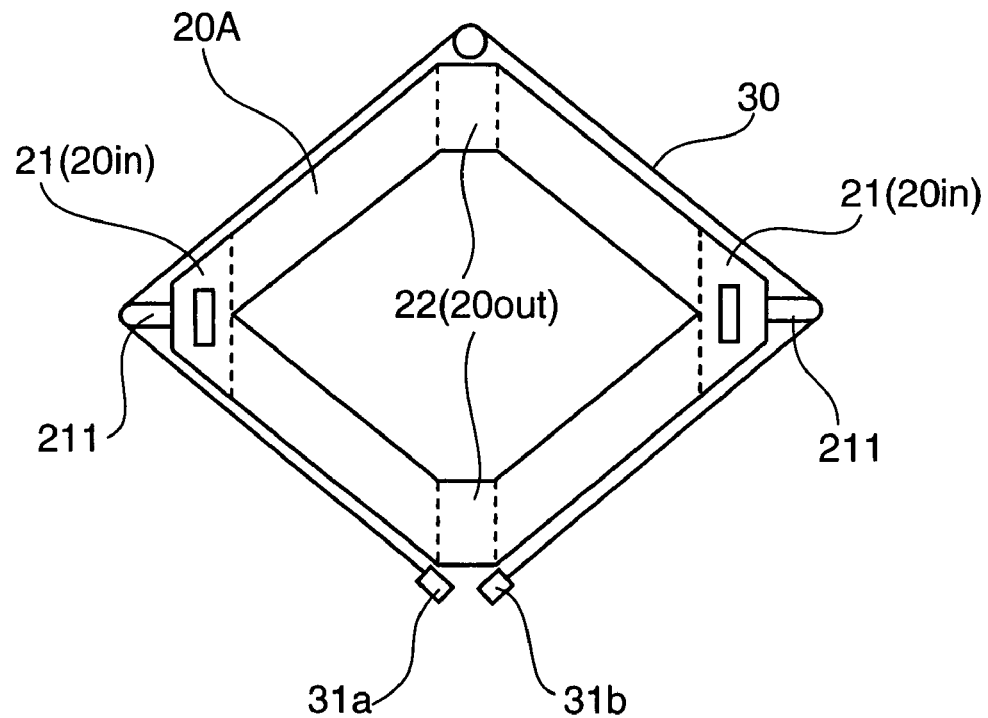
Figure 22B:
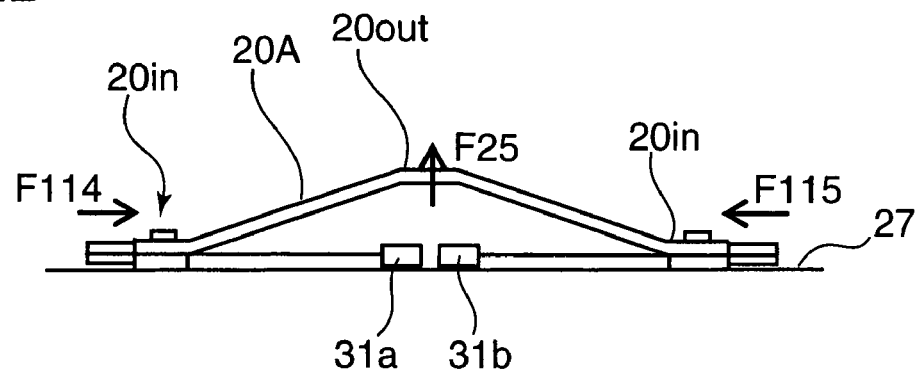

FIGS. 22A and 22B are diagrams showing a positional relation between a driving member i.e. a first driving piece 20A, and an SMA actuator 30 as the modification 1-5. FIG. 22A is a plan view, and FIG. 22B is a side view, respectively. In the modification 1-5, the upper half portion of the driving member 20 shown in FIG. 8B i.e. the link mechanism merely composed of the first driving piece 20A constitutes the driving member. Displacement input portions 20in of the first driving piece 20A are slidably disposed on a predetermined base member 27.

In the arrangement of the modification 1-5, as shown in FIG. 22B, moving forces F114 and F115 are applied from the SMA actuator 30 to the displacement input portions 20in, respectively. Then, the first driving piece 20A is deformed in response to the application of the moving forces F114 and F115, and a moving force F25 for extending displacement output portions 20out in the optical axis direction is generated. This arrangement is advantageous in reducing the thickness of the driving member in the optical axis direction by half, thereby contributing to production of a thin image sensing apparatus.

(6) Modification 1-6: Multiple Placement of Driving Members

Figure 23:
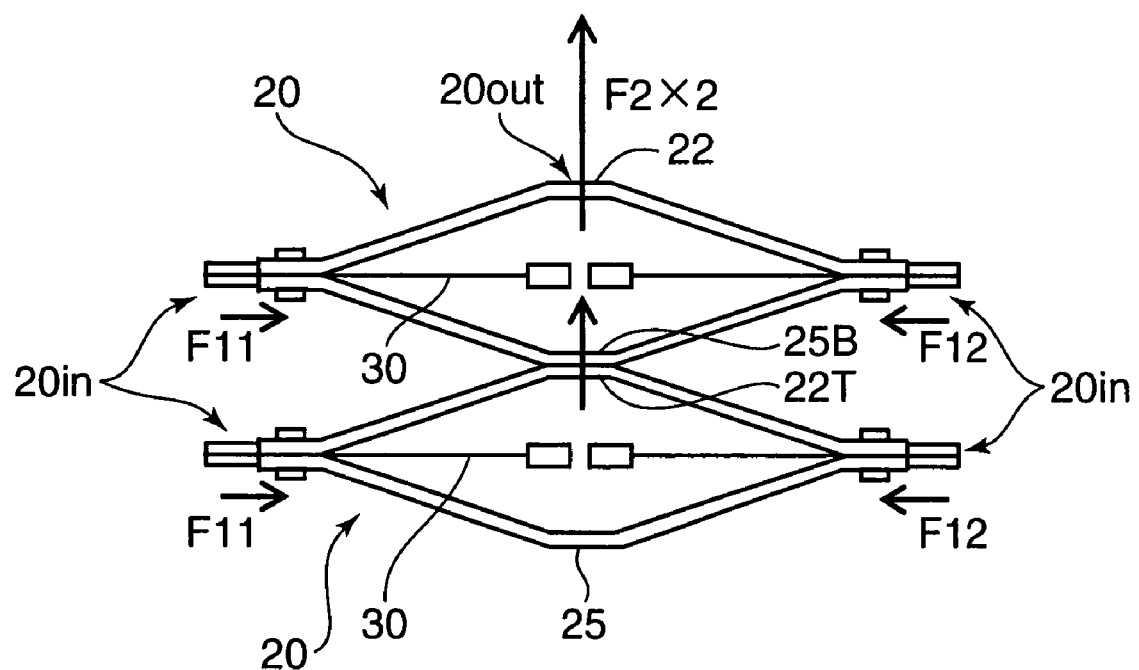
FIG. 23 is a side view showing a positional relation between a driving member and an SMA actuator, as a modification 1-6 of the first embodiment.

FIG. 23 is a side view showing a positional relation between driving members 20 and SMA actuators 30 in the modification 1-6. In the modification 1-6, the driving member is constructed by placing two driving member 20 shown in FIG. 8B one over the other in the optical axis direction. Alternatively, three or more driving members may be placed one over the other. Specifically, second flat surfaces 22T of the lower driving member 20 are firmly contacted with fourth flat surfaces 25B of the upper driving member 20, respectively. Fourth flat surfaces 25 of the lower driving member 20 serve as fixed portions, and second flat surfaces 22 of the upper driving member 20 serve as displacement output portions 20out.

In the arrangement of the modification 1-6, moving forces F11 and F12 are applied from the respective corresponding SMA actuators 30 to four displacement input portions 20in of the upper and the lower driving members 20. Then, the driving members 20 are deformed in response to the application of the moving forces F11 and F12. Thus, by the double deformation, a moving force F2×2, which is double of the moving force F2 for extending the displacement output portions 20out in the optical axis direction in the embodiment, is generated. This arrangement is advantageous in increasing the displacement amount of the lens unit 10 by double, as compared with the arrangement shown in FIG. 8B.

(7) Modification 1-7: Use of Joint Members

Figure 24:
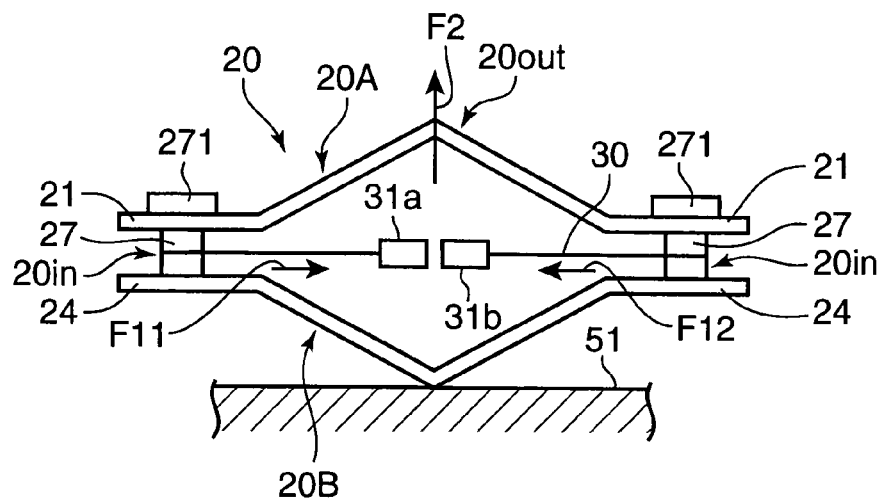
FIG. 24 is a side view showing a positional relation between a driving member and an SMA actuator, as a modification 1-7 of the first embodiment.

FIG. 24 is a side view showing a relation between a driving member 20 and an SMA actuator 30 in the modification 1-7. The modification 1-7 is different from the embodiment and the modifications 1-1 through 1-6 in that pins 27 as joint members are disposed at positions corresponding to joint portions of the first driving piece 20A and the second driving piece 20B of the driving member 20 shown in FIG. 8B.

The pins 27 each is a member for disposing a first driving piece 20A and a second driving piece 20B spaced away from each other. In FIG. 8B, the first driving piece 20A and the second driving piece 20B are jointed in such a manner that the respective corresponding first flat surfaces 21 and the respective corresponding third flat surfaces 24 are firmly contacted with each other. In the modification 1-7, respective corresponding first flat surfaces 21 and respective corresponding third flat surfaces 24 are arranged spaced away from each other.

Figure 25:
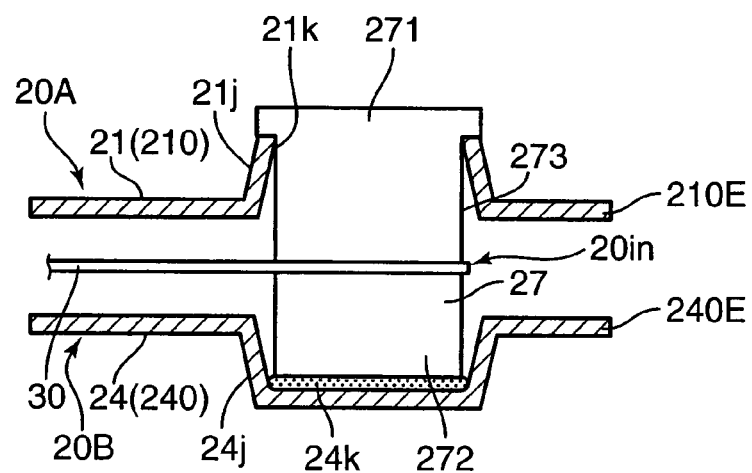
FIG. 25 is a cross-sectional view enlargedly showing a joint portion of a first driving piece and a second driving piece, and its vicinity in the modification 1-7 of the first embodiment.

FIG. 25 is a cross-sectional view enlargedly showing one of the joint portions of the first driving piece 20A and the second driving piece 20B, and its vicinity. In the illustration of FIG. 25, one of the joint portions is shown. The arrangement of the other of the joint portions is the same as the one of the joint portions. Referring to FIG. 25, a recess 21j is formed in a first linking piece 210 constituting the first flat surface 21 of the first driving piece 20A by a drawing process. A hole 21k is formed in a bottom portion of the recess 21j by a punching process. Likewise, a recess 24j is formed in a second linking piece 240 constituting the third flat surface 24 of the second driving piece 20B by a drawing process.

The pins 27 each is a cylindrical column-like member, and has a head 271 with a diameter larger than that of a stem 273. The pin 27 extends through the hole 21k in a state that the first linking piece 210 and the second linking piece 240 are positioned relative to each other. Thereafter, the head 271 and a peripheral end of the hole 21k are adhered or thermally fused by a laser, an ultrasonic device, a heater, or a like device, and a base end 272 of the pin 27 extending in the hole 21k is thermally adhered to a bottom portion 24k of the recess 24j. Thereby, the first driving piece 20A and the second driving piece 20B are assembled into a pantograph structure. In the assembling, the first linking piece 210 and the second linking piece 240 are disposed parallel to each other by a gap of e.g. 0.4 to 0.5 mm.

The SMA actuator 30 is wound over the perimeter of the stem 273 of each of the pins 27. Thus, in the modification 1-7, the two pins 27 serve as displacement input portions 20in. The pins 27 are arranged at inner positions with respect to an outer peripheral end 210E of the first linking piece 210, and an outer peripheral end 240E of the second linking piece 240 by a predetermined distance, respectively. Thereby, the displacement input portions 20in are located at inner positions, as compared with the arrangement shown in FIG. 8B.

In the modification 1-7, when a predetermined voltage is applied between a first electrode 31a and a second electrode 31b of the SMA actuator 30 to energize and heat the SMA actuator 30, transformation into an austenite phase is performed, and the SMA actuator 30 generates a contraction force. The contraction force is applied to the two pins 27 around which the SMA actuator 30 is wound.

As a result of the winding, as shown in FIG. 24, inwardly acting moving forces F11 and F12 toward the center of the driving member 20, displaced from each other by 180 degrees, are applied to the pins 27 as the displacement input portions 20in. In response to the application of the moving forces F11 and F12, the first driving piece 20A and the second driving piece 20B cause a displacement similar to a movement of a pantograph. Thereby, a moving force F2 for extending displacement output portions 20out in the optical axis direction is generated.

The modification 1-7 has the following advantages. In the case where the flat first linking piece 210 and the flat second linking piece 240 are adhered to each other with no interposing member in jointing the first driving piece 20A and the second driving piece 20B, and the SMA actuator 30 is wound over the perimeter of the thus-constructed driving member 20, the joint portions may be buckled by a tension force of the SMA actuator 30. Such a drawback may obstruct reliable conversion of the moving forces F11 and F12 into the moving force F2. Jointing the first linking piece 210 and the second linking piece 240 away from each other by the certain gap by way of the pins 27 which are disposed at inner positions with respect to the outer peripheral ends 210E and 240E by the predetermined distance is advantageous in suppressing the joint portions of the first linking piece 210 and the second linking piece 240 from bending. This enables to efficiently convert the driving force of the SMA actuator into the moving force in the optical axis direction. Also, the SMA actuator 30 is easily wound, because the first driving piece 20A and the second driving piece 20B are jointed to each other by the certain gap.

Also, since the first driving piece 20A and the second driving piece 20B are assembled in one direction by inserting the pins 27 through the holes 21k and the holes 24k, the above arrangement provides superior assembling performance. Also, use of the pins 27 made of an electrically insulating material allows for use of a conductive member as the first driving member 20A and the second driving piece 20B. Also, since the pins 27 can be positioned by the recesses 21j and 24j, the assembling can be facilitated.

Figure 26:
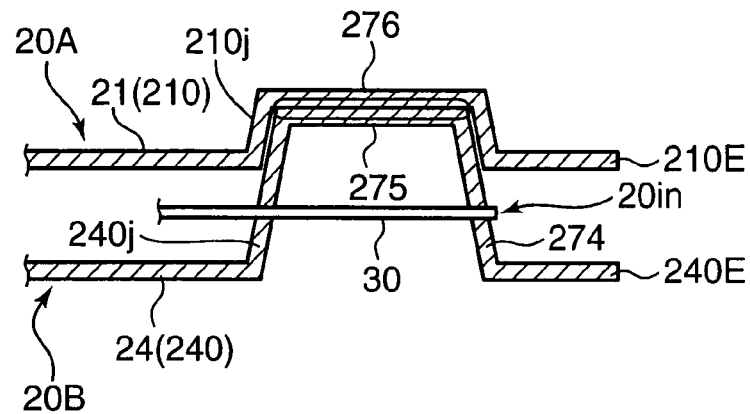
FIG. 26 is a cross-sectional view showing another example of the joint structure of the first driving member and the second driving member in the modification 1-7 of the first embodiment.

In the above arrangement, the first driving piece 20A and the second diving piece 20B are jointed by the pins 27. Alternatively, joint members other than the pins 27 may be used. FIG. 26 is a cross-sectional view showing an altered structure of jointing the first driving piece 20A and the second driving piece 20B. The alteration shows an example of using bosses 274 as the joint members. In FIG. 26, one of the bosses 274 is shown and described herein, because the structures of the bosses 274 are identical to each other. A recess 210j is formed in a first linking piece 210 of the first driving piece 20A by a drawing process. The boss 274 is formed upright on a second linking piece 240 of the second driving piece 20B by a drawing process. The recess 210j and the boss 274 are formed at inner positions with respect to outer peripheral ends 210E and 240E of the first and the second linking pieces 210 and 240 by a predetermined distance.

A head 275 of the boss 274 is engaged in the recess 210j. In the engaged state, a bottom portion 276 of the recess 210j and the head 275 of the boss 274 are integrally formed by thermal fusion using a laser, an ultrasonic device, a heater, or a like device. The SMA actuator 30 is wound over the bosses 274. This arrangement provides easy positioning and superior assembling performance. Also, the arrangement contributes to production cost reduction because there is no need of using additional parts as the joint members.

Each of the bosses 274 has a tapered shape. Since the bosses 274 have the tapered shape, even if the SMA actuator 30 is wound obliquely downwardly, there is no or less likelihood that the SMA actuator 30 may be slipped downwardly.

(8) Modification 1-8: Rhombus-shaped Link

Figure 27:
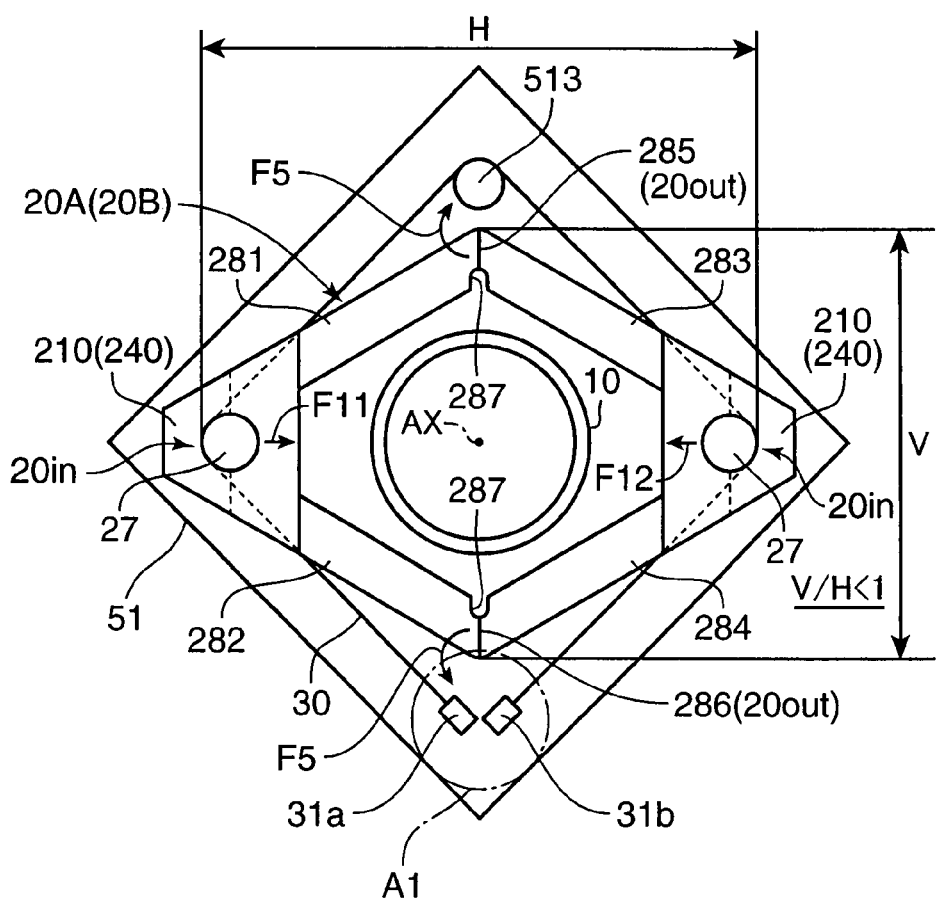
FIG. 27 is a plan view showing a positional relation between a driving member and an SMA actuator as a modification 1-8 of the first embodiment.

FIG. 27 is a plan view showing a positional relation between a driving member 20 and an SMA actuator 30 as the modification 1-8. In the modification 1-8, members each constructed by linking four arms into a rhombus shape having a longer size H and a shorter size V are used as a first driving piece 20A and a second driving piece 20B of the driving member 20.

The first driving piece 20A includes the four arms 281, 282, 283, and 284, wherein the four arms 281 through 284 are linked to each other into a rhombus shape. The second driving piece 20B has a link structure of a rhombus shape identical to that of the first driving piece 20A. The first driving piece 20A and the second driving piece 20B are jointed to each other at first linking portions 210 of the first driving piece 20A and second linking portions 240 of the second driving piece 20B. The first linking portions 210 are formed at opposing two apex portions of the rhombus-shaped first driving piece 20A in the longer size direction, and the second linking portions 240 are formed at opposing two apex portions of the rhombus-shaped second driving piece 20B in the longer size direction, respectively. The respective corresponding first linking portions 210 and the respective corresponding second linking portions 240 are jointed to each other by the pin 27 shown in the modification 1-7. FIG. 24 is a cross-sectional view taken along the direction of the longer size H in FIG. 27.

Similarly to the arrangement shown in FIG. 2, the SMA actuator 30 is wound over the driving member 20 via one of the two pins 27, a tension guide 513 provided upright on a base member 51, and the other of the two pins 27. Thereby, the two pins 27 serve as displacement input portions 20in. On the other hand, linking portions 285 and 286, which are formed at opposing two apex portions of the first driving piece 20A in the direction of the shorter size V, serve as displacement output portions 20out.

Each of the linking portions 285 and 286 is formed with a cutaway 287 in the direction of the shorter size V. Thus, the portion of the arm at the position where the cutaway 287 is formed has a narrower width than the other portion of the arm. The cutaways 287 are formed to easily collapse the arms at the linking portions 285 and 286. Forming the cutaways 287 to receive projections (not shown) to be formed on the lens unit 10 is advantageous in suppressing positional displacement of the lens unit 10. Also, it is preferable to form cutaways similar to the cutaways 287 in the second driving piece 20B for engagement with projections (not shown) to be formed on the base member 51 in the aspect of suppressing positional displacement of the driving member 20.

In the above arrangement, since the first driving piece 20A and the second driving piece 20B each is assembled into a rhombus-shaped link member, the longer size H and the shorter size V satisfy a relation: V/H<1. This enables to secure a space A1 in the direction of the shorter size V with respect to the rectangular base member 51. The space A1 may be utilized as a space for caulking ends of the SMA actuator 30 to connect the SMA actuator 30 with the first and the second electrodes 31a and 31b, for instance. Thereby, even if soldering is impossible in light of a fear that the memorized shape may disappear due to an increased temperature, or even if use of an adhesive agent may be infeasible, considering a large tension force despite a small diameter of the SMA wire, the ends of the SMA actuator 30 can be securely connected with the first and the second electrodes 31a and 31b.

Further, the pins 27 arranged at the apex portions of the driving piece in the direction of the longer size H serve as displacement input portions 20in, and the linking portions 285 and 286 of the driving piece in the direction of the shorter size V serve as displacement output portions 20out. This enables to increase a moving amount of the driving member 20 in the optical axis direction. Furthermore, the above arrangement enables to decrease an outwardly acting moment in the direction of the shorter size V with respect to the arms 281, 282, 283, and 284, i.e. an outwardly acting force as indicated by the reference numeral F5 in FIG. 27. This is advantageous in suppressing warpage of the arms, and suppressing a likelihood that the supports 12 (see FIG. 1) of the lens unit 10 may be disengaged from the linking portions 285 and 286.

In addition to the above advantages, since the cutaways 287 are formed in the linking portions 285 and 286, the first driving piece 20A and the second driving piece 20B are further easily flexed at the linking portions 285 and 286, which contributes to suppressing flexure of the arms 281, 282, 283, and 284.

(9) Modification 1-9: Other Link Mechanism

Figure 28A:
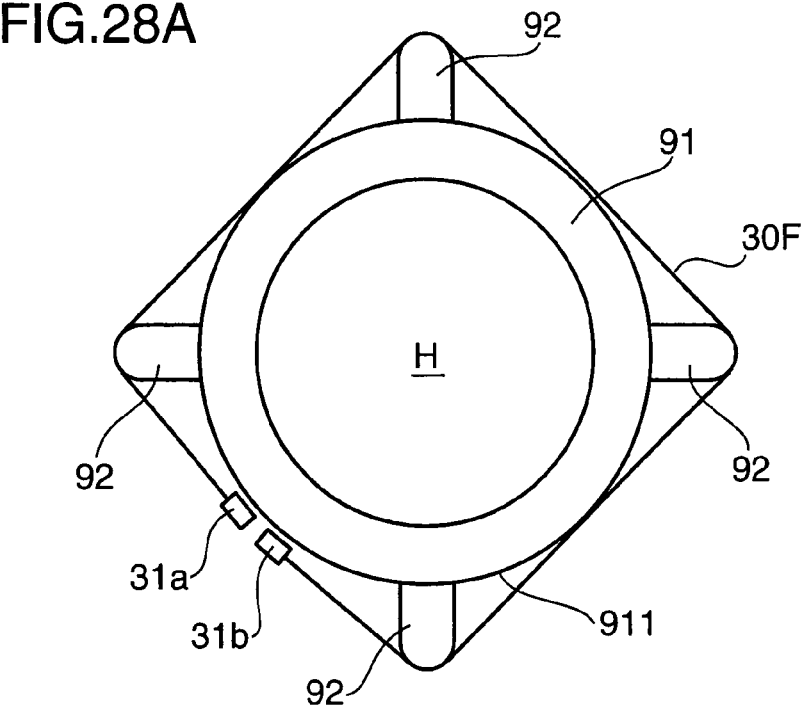
Figure 28B:
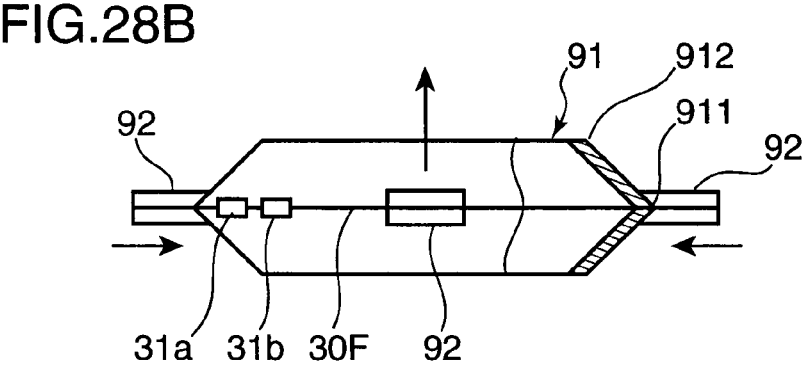
Figure 28C:
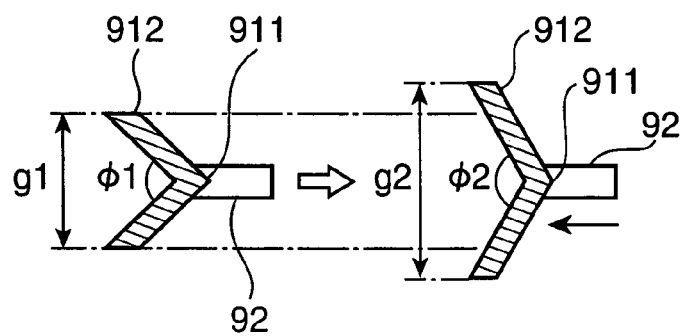

FIGS. 28A through 28C are diagrams showing a positional relation between a driving member 91 and an SMA actuator 30F as the modification 1-9. FIG. 28A is a plan view, FIG. 28B is a partially cutaway side view, and FIG. 28C is a cross-sectional view showing an operation of the driving member 91 and the SMA actuator 30F, respectively. In the modification 1-9, the driving member 91 has an annular shape with a hollow portion H for encasing the lens unit 10 therein. The driving member 91 has a laterally V-shape in cross-section taken along the optical axis direction, and a bent rim 911 of the V-shaped portion is located at a radially outermost position. The bent rim 911 serves as a displacement input portion, and a peripheral portion 912 of the V-shaped portion serves as a displacement output portion.

Four guide pieces 92 are radially outwardly projected equidistantly at an interval of 90 degrees along an outer circumference of the bent rim 911 of the driving member 91. The SMA actuator 30F is wound over lead ends of the four guide pieces 92 in such a manner as to surround the driving member 91. A first electrode 31a and a second electrode 31b connected to both ends of the SMA actuator 30F are fixed to an outer peripheral wall of the driving member 91. The lens unit 10 is mounted in the driving member 91 by encasing the lens unit 10 in the hollow portion H, and engaging the supports 12 with the peripheral portions 912 of the driving member 91.

As shown in FIG. 28C, when the SMA actuator 30F is heated and contracted, moving forces acting toward the center of the annular driving member 91 are applied to the guide pieces 92, respectively. In a state that the SMA actuator 30F is not operated, the driving member 91 has an interior angle φ1 of the V-shape in cross section, and a height g1. In response to application of the moving forces, the driving member 91 is deformed into such a state that the driving member 91 has an interior angle φ2, which is wider than the interior angle φ1, and a height g2, which is larger than the height g1. In other words, the peripheral portion 912 is extended in the optical axis direction. Thereby, the lens unit 10 engaged with the peripheral portion 912 can be moved in the optical axis direction.

The above arrangement eliminates the need of providing a member for fixing the SMA actuator 30F, because the SMA actuator 30F can be directly mounted on the driving member 91. This enables to reduce the number of parts, thereby contributing to further miniaturization of the driving mechanism.

(10) Other Modifications

Modifications other than the aforementioned modifications are applicable, as far as such modifications do not depart from the gist of the first embodiment. In the first embodiment and the foregoing modifications, the arms 23 and 26 of the driving member 20 are linearly tilted. Alternatively, curved arms may be used. Further alternatively, rod-like arms may be used in place of the flat plate-like arms. In the embodiment, the first driving piece 20A and the second driving piece 20B are integrally jointed by the rivets 212. Alternatively, the first and the second driving pieces 20A and 20B may be connected to each other by a hinge mechanism or a like mechanism. Further, the SMA actuator 30 in the embodiment and the aforementioned modifications is in the shape of a wire. Alternatively, a strip-shaped SMA actuator may be used. Also, a member other than the lens unit 10 may be used as the driven member.

Second Embodiment

Figure 29:
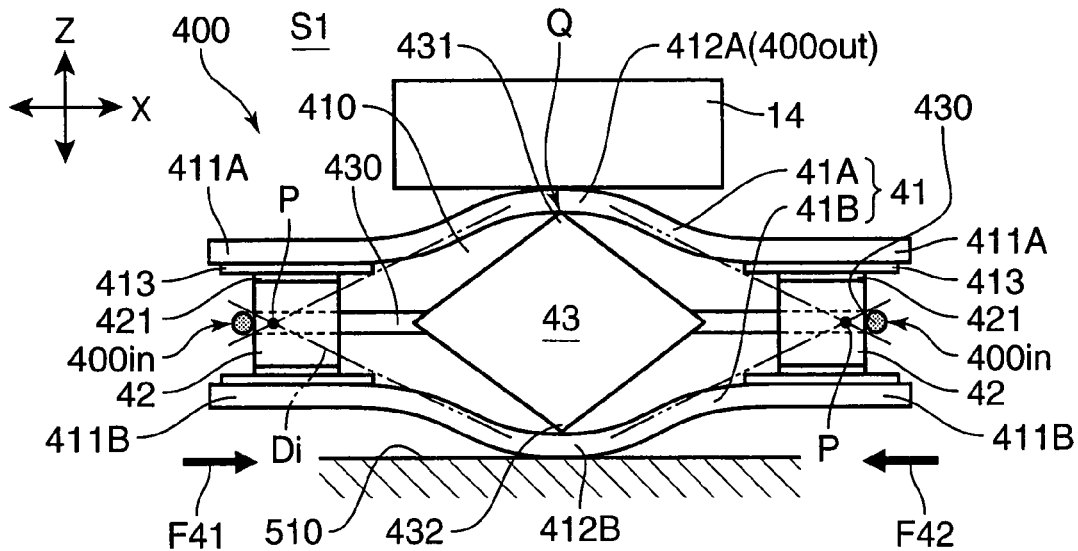
FIG. 29 is a side view showing a lens driving module to which a lens driving mechanism as a second embodiment of the invention is applied.

In this section, a second embodiment using two flat plate members is described. FIG. 29 is a side view showing a driving module S1 to which a driving mechanism of the second embodiment is applied. The driving module S1 includes a driven member 14, and a driving device 400 for driving the driven member 14 in the Z-axis direction as the first axis direction.

The driving device 400 has a driving member and an SMA actuator 430. In the second embodiment, the driving member is constituted of a flat plate unit 41 i.e. a first flat plate member 41A and a second flat plate member 41B, two spacers 42 as a gap holder, and a gap increasing member 43. FIG. 29 shows a state that the SMA actuator 430 is not operated i.e. not contracted.

The two flat plate members 41A and 41B each is made of a metal or a resin having elasticity, and is a thin plate with a rectangular shape in plan view, on which a specific process such as a bending process is not applied. The first flat plate member 41A and the second flat plate member 41B may preferably have shapes identical to each other, but may have shapes different from each other. Although in FIG. 29, the first flat plate member 41A is bent upwardly, and the second flat plate member 41B is bent downwardly, the first flat plate member 41A and the second flat plate member 41B are flat members in the X-axis direction in a state that the gap increasing member 43 is not interposed therebetween (see FIG. 32B to be described later).

The first and the second flat plate members 41A and 41B are jointed substantially in parallel to each other with a predetermined gap by the two spacers 42. The spacers 42 each is made of a metal or a resin, and is a cylindrical column-like member having rigidity. The length of the spacer 42 in the Z-axis direction is selectively set to a predetermined length i.e. a first length depending on a setting value of the gap between the first and the second flat plate members 41A and 41B.

The spacers 42 each is interposed between an end portion 411A of the first flat plate member 41A in the longer side direction thereof, and an end portion 411B of the second flat plate member 41B in the longer side direction thereof. As far as the spacers 42 are disposed between the first and the second flat plate members 41A and 41B to secure a predetermined gap therebetween, the spacers 42 may be disposed at positions other than the positions corresponding to the end portions of the first and the second flat plate members 41A and 41B.

A solder layer 413 is formed on each of the end portions 411A of the first flat plate member 41A at a position opposing the corresponding spacer 42, and a solder layer 421 is formed on each of the spacers 42 at a position opposing the corresponding end portion 411A. Then, the first flat plate member 41A and the spacers 42 are jointed to each other by fusing the solder layers 413 and 421. Likewise, the end portions 411B of the second flat plate member 41B and the spacers 42 are jointed to each other. Thus, the first and the second flat plate members 41A and 41B, and the spacers 42 are integrally assembled into an integral unit having a closed space 410, by the solder jointing. Alternatively, the integral assembling may be performed, using a technique other than the solder jointing, such as adhesion using an adhesive agent or welding.

The gap increasing member 43 is a rigid member having a rhombus shape in X-Y cross section. The gap increasing member 43 is interposed between the first and the second flat plate members 41A and 41B, but is not jointed thereto. The distance i.e. a second length between two apices 431 and 432 of the gap increasing member 43 in the Z-axis direction is set larger than the size of the spacer 42 in the Z-axis direction by a predetermined value. The gap increasing member 43 is disposed between the first and the second flat plate members 41A and 41B, and at an intermediate position between the spacers 42. The upper apex 431 of the gap increasing member 43, and a lower surface of an intermediate portion 412A of the first flat plate member 41A are linearly contacted with each other, as shown by the symbol Q, which indicates a linear contact portion, and the lower apex 432 of the gap increasing member 43, and an upper surface of an intermediate portion 412B of the second flat plate member 41B are linearly contacted with each other.

Thus, by providing the gap increasing member 43 having the size in the Z-axis direction larger than the size of the spacer 42 in the Z-axis direction between the first and the second flat plate members 41A and 41B, the first flat plate member 41A is bent upwardly, and the second flat plate member 41B is bent downwardly, with the apices 431 and 432 being defined as centers of the bending, respectively. In other words, the elastically deformable first and second flat plate members 41A and 41B hold the gap increasing member 43 therebetween by the elastic resilience i.e. the bias spring force thereof. Thereby, the integral unit constituted of the first and the second flat plate members 41A and 41B, and the spacers 42 has a substantially rhombus shape in side view. Alternatively, the gap increasing member 43 may have a shape without an apex. However, forming the apices 431 and 432 is advantageous in precisely bending the first and the second flat plate members 41A and 41B.

A lower surface of the intermediate portion 412B of the second flat plate member 41B is fixed to an unmoved base member 510. Thereby, in this embodiment, the two spacers 42 serve as displacement input portions 400in, and the intermediate portion 412A of the first flat plate member 41A serves as a displacement output portion 400out. Thus, the driven member 14 is engaged with an upper surface of the intermediate portion 412A of the first flat plate member 41A.

The SMA actuator 430 is a linear actuator similar to the SMA actuator 30 shown in the first embodiment, and has a property that it contracts when energized and heated. In the second embodiment, the SMA actuator 430 is wound over outer perimeters of the two spacers 42 as the displacement input portions 400in. Accordingly, when the SMA actuator 430 is energized and heated, moving forces F41 and F42 toward each other in the X-axis direction are applied to the spacers 42, respectively.

In the above arrangement, when the energization amount to the SMA actuator 430 exceeds a predetermined value, and the moving forces F41 and F42 with such a magnitude as to overcome the bias spring force of the first and the second flat plate members 41A and 41B are generated, the spacers 42 are attracted toward each other. As a result, the first and the second flat plate members 41A and 41B are displaced in the Z-axis direction.

Figure 30:
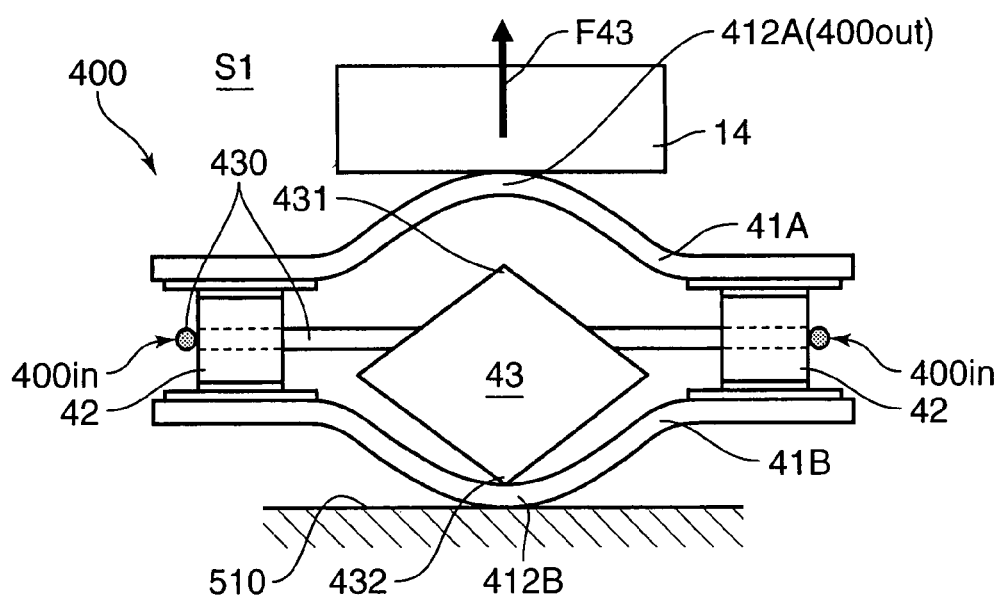
FIG. 30 is a side view showing a state that an SMA actuator shown in FIG. 29 is contracted by energizing and heating.

FIG. 30 is a side view showing a state that the first and the second flat plate members 41A and 41B are displaced. By the displacement, a moving force F43 in a direction orthogonal to the directions of the moving forces F41 and F42 is generated at the intermediate portion 412A as the displacement output portion 400out. The moving force F43 is a force whose displacement amount is increased in the similar manner as the first embodiment. As a result of the displacement increase, the driven member 14 is moved in the Z-axis direction i.e. upwardly, with a magnitude of force larger than the actual contraction amount of the SMA actuator 430.

Thereafter, when the energization to the SMA actuator 430 is suspended, the first and the second flat plate members 41A and 41B are returned to the state shown in FIG. 29 by the bias spring force of the first and the second flat plate members 41A and 41B of returning to the initial shape thereof. Specifically, when the SMA actuator 430 is gradually cooled after the energization is suspended, and the bias spring force of the flat plate unit 41 exceeds the moving forces F41 and F42, the driven member 14 is returned to the initial position without an aid of an external bias spring.

Figure 31:
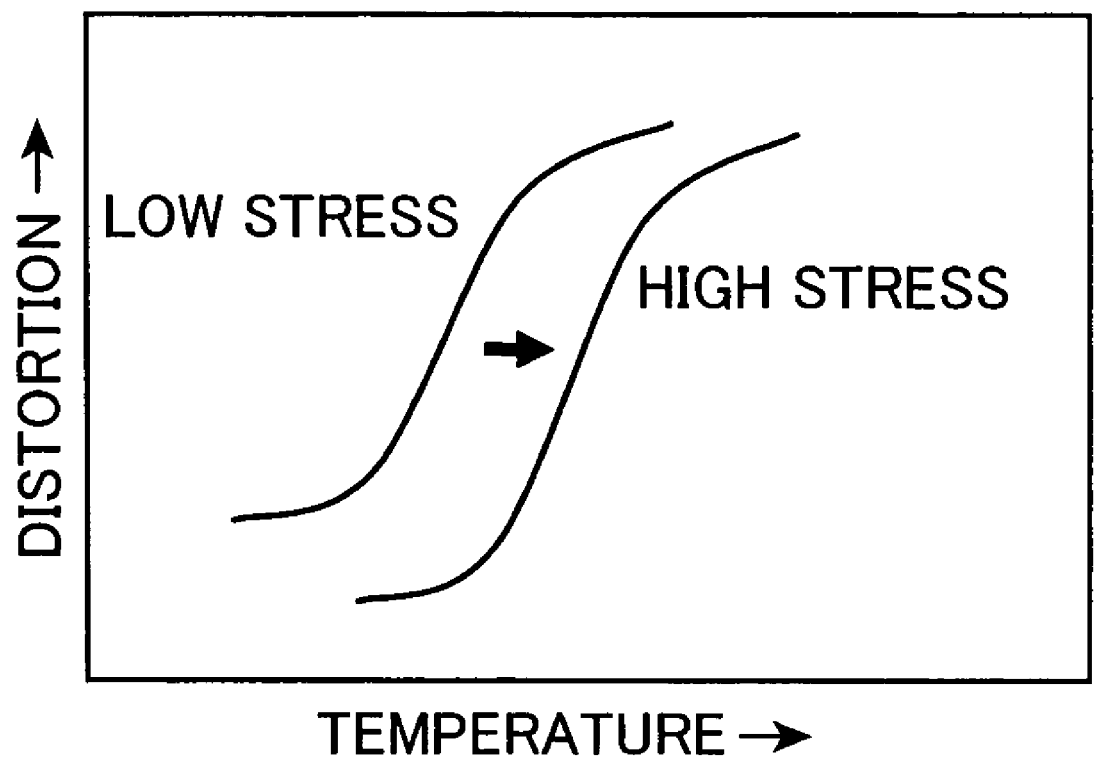
FIG. 31 is a graph for describing a property of a shape memory alloy.

Generally, the reaction temperature of a shape memory alloy is set higher than a temperature range of the ambient environment. Also, in many cases, the temperature of the shape memory alloy is controlled by a Joule heat generated therein by energization. The shape memory alloy has a property, as shown in FIG. 31, as an external stress applied to the shape memory alloy is increased, a displacement amount i.e. a wire length until the memorized shape is recovered is increased, and the reaction temperature is increased. However, even use of a Ti—Ni-based shape memory alloy, which is a well-known shape memory alloy because of its low hysteresis and a relatively high reaction temperature, cannot provide a sufficiently high reaction temperature. In view of the above, it is a general practice to use a bias spring or the like to apply a relatively large external stress to the shape memory alloy, as far as the stress does not exceed an allowable stress, in order to compensate for the drawback that a sufficiently large displacement amount cannot be secured by the reaction temperature.

If, however, the bias spring and the shape memory alloy are used in combination in a compact device, the size of the bias spring for generating a force substantially equivalent to a stress capable of increasing the displacement amount may be unduly increased. In the second embodiment, however, the first and the second flat plate members partially or wholly function as a bias spring. This enables to eliminate use of a bias spring as an additional part, or reduce the size of the bias spring, thereby contributing to miniaturization of the driving mechanism itself.

Also, in this embodiment, the first and the second flat plate members 41A and 41B are jointed to each other via the spacers 42, in place of simply adhering two flat plate members to each other at end portions thereof, and the spacers 42 are used as the displacement input portions 400in. Further, the gap between the first and the second flat plate members 41A and 41B is increased by the gap increasing member 43, and the gap-increased first and the second flat plate members 41A and 41B have a substantially rhombus shape in side view, which is equivalent to a link mechanism (see the rhombus shape Di indicated by the one-dotted-chain line in FIG. 29). As a result of the gap increase, input points of the SMA actuator 430 for generating the moving forces F41 and F42 i.e. contact points of the spacers 42 with the SMA actuator 430 can be maximally approximated to the apices P of the rhombus shape Di in the X-axis direction, which correspond to deformation points of the link mechanism. This enables to suppress unwanted deformation between the input points of the moving forces, and the deformation points of the link mechanism, a loss of force, or a like drawback, thereby enabling to stabilize the movement of the driving member.

Figure 32A:
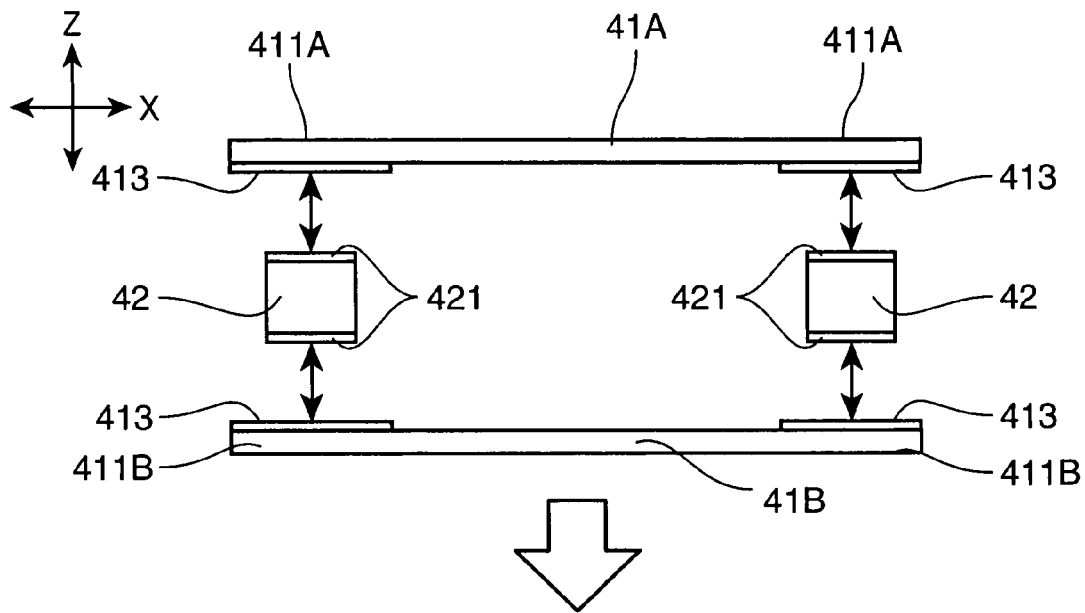
FIGS. 32A through 32C are side views showing an example of a process for producing a driving member in the second embodiment.
Figure 32B:
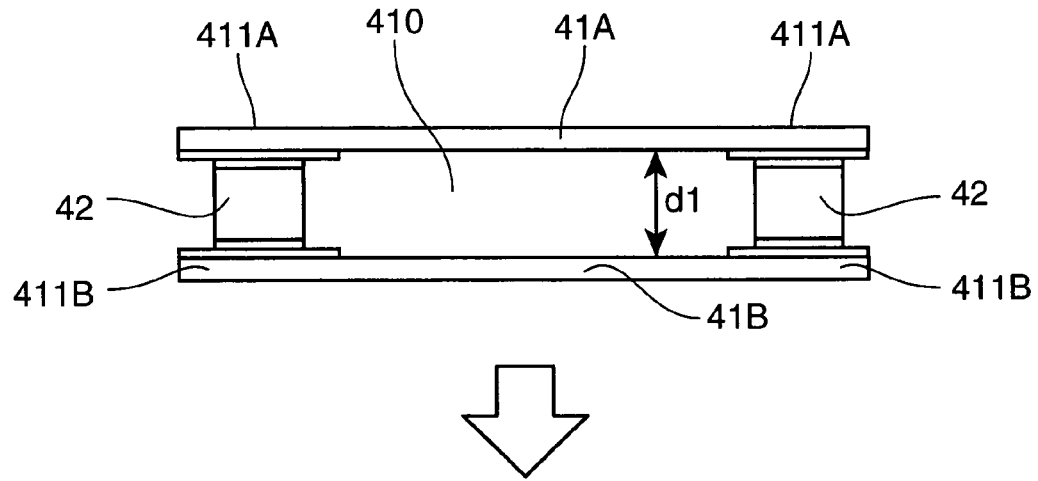
Figure 32C:
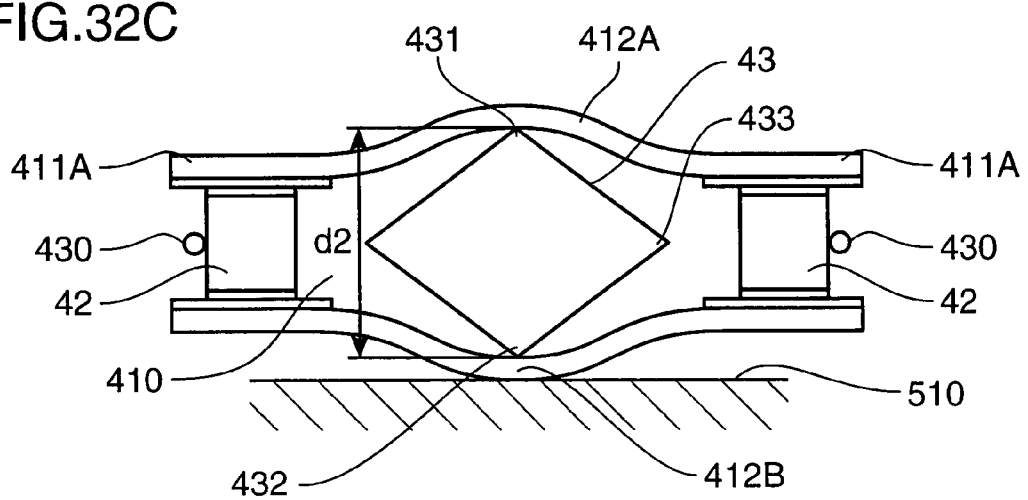

Next, an example of a process for manufacturing the driving member of the second embodiment is described referring to FIGS. 32A through 32C. First, as shown in FIG. 32A, the first flat plate member 41A and the second flat plate member 41B, and the two spacers 42 are prepared. In the case where a metal plate is used as the first and the second flat plate members 41A and 41B, a member having an insulating property may be used as the spacers 42.

In the above example, a metal foundation layer for forming the solder layer 421 is formed on both ends of each of the spacers 42. In the case where a resin plate such as a polyimide plate is used as the first and the second flat plate members 41A and 41B, a metal member may be used as the spacers 42. In the altered arrangement, a metal foundation layer for forming the solder layer 413 may be partially formed on the first and the second flat plate members 41A and 41B. This arrangement enables to eliminate formation of a current path between the spacers 42 in contact with the SMA actuator 430, other than the SMA actuator 430, whereby the SMA actuator can be precisely operated, while suppressing a current loss.

Next, as shown in FIG. 32B, the spacers 42 are disposed on the both ends of the second flat plate member 41B, followed by placing the first flat plate member 41A over the second flat plate member 41B. In this state, a high temperature ambient capable of fusing the solder layers 413 and 421 is generated. Then, the first and the second flat plate members 41A and 41B, and the two spacers 42 are solder-jointed into an integral unit under the temperature control. Thereby, the first and the second flat plate members 41A and 41B are placed parallel to each other, in which the closed space 410 having a gap d1 depending on the height of the spacer 42 is defined.

Thereafter, as shown in FIG. 32C, the gap increasing member 43 with the rhombus shape in cross section, with the distance between the apices 431 and 432 being larger than the height of the spacer 42, is interposed in the closed space 410 defined by the first and the second flat plate members 41A and 41B. By the insertion of the gap increasing member 43, the first and the second flat plate members 41A and 41B are expansively deformed away from each other at the intermediate portions 412A and 412B of the first and the second flat plate members 41A and 41B in the X-axis direction. By the expansive deformation, the distance between the intermediate portions 412A and 412B is set to a distance d2 (>d1), which corresponds to the distance between the apices 431 and 432.

Since the gap increasing member 43 has a rhombus shape, the gap increasing member 43 has apices 433 i.e. pointed apices in the X-axis direction, in addition to the apices 431 and 432 in the Z-axis direction. Thus, the gap increasing member 43 with the height d2 can be easily interposed in the closed space 410 having the height d1, by utilizing the apices 433.

Thereafter, the intermediate portion 412B of the second flat plate member 41B is fixed to the base member 510. Then, the SMA actuator 30 is wound over the perimeters of the two spacers 42. Then, the driven member 14 is engaged with the intermediate portion 412A of the first flat plate member 41A. In this way, the assembling is completed.

The above shows an example of the process for manufacturing the driving member. A preferred process is a process to which a well-known soldering device is applied. In such a process, an example of the flat plate unit 41 is a member obtained by placing a substrate member formed with metallic conductive patterns at the positions corresponding to the joint positions of the spacers 42, on a flexible base member such as a polyimide film. An example of the spacer 42 is a metal member, or a member having a metal layer at a joint portion with the flat plate unit 41. A solder is screen-printed on the substrate member i.e. on the conductive patterns, after the portion of the substrate member other than the conductive patterns is masked. Thereafter, the spacers 42 are mounted on the solder layers, followed by heating in a reflow furnace or a like device. Thereby, the flat plate unit 41 and the spacers 42 are solder-jointed. With the manufacturing process, the driving member can be easily manufactured by using the well-known soldering device.

Figure 33A:
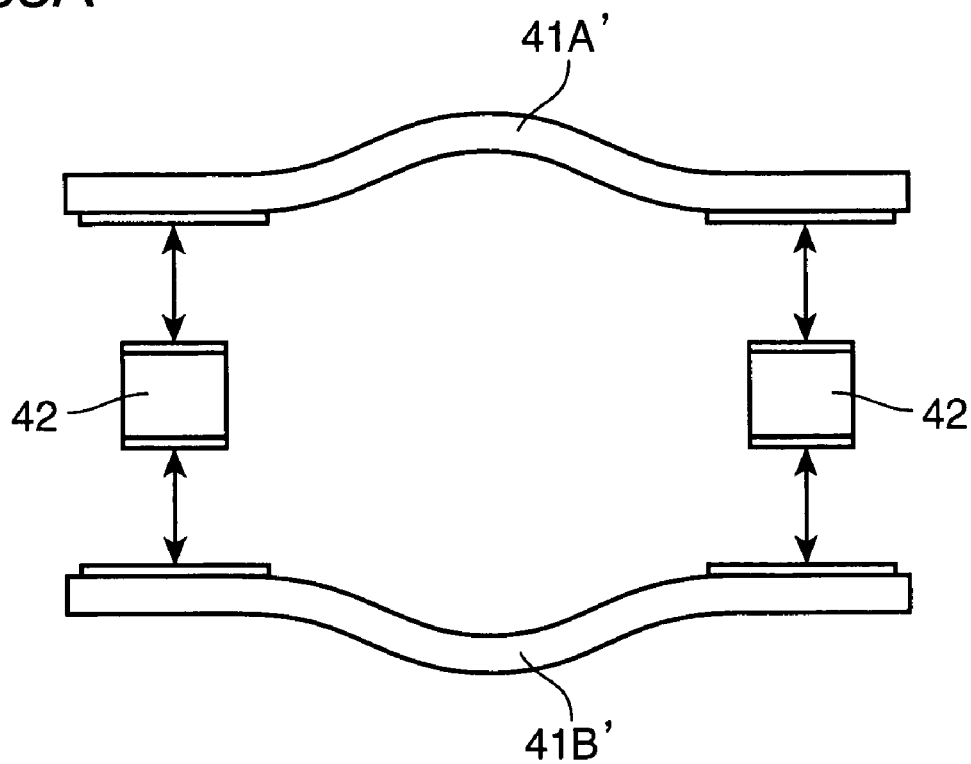
FIGS. 33A and 33B are side views showing another example of the process for producing the driving member in the second embodiment.
Figure 33A:
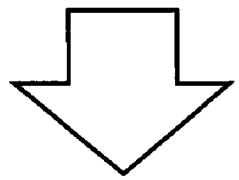
Figure 33B:
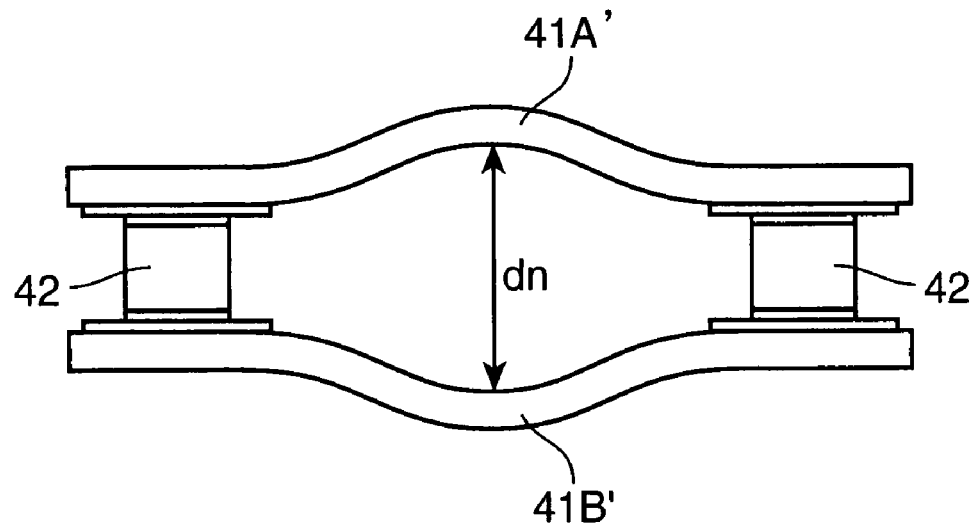

FIG. 33A and 33B are side views showing another example of the process for manufacturing the driving member. In the manufacturing process, first and second flat plate members 41A' and 41B', to each of which a bending process has been applied, are used. Specifically, as shown in FIG. 33A, a bending process is applied in advance to the first and the second flat plate members 41A' and 41B' to keep the first and the second flat plate members 41A' and 41B' away from each other by the gap "dn" at intermediate portions thereof. As shown in FIG. 33B, the first and the second flat plate members 41A' and 41B' are jointed to each other via two spacers 42 to form a link mechanism.

The driving member of the embodiment may be produced by the aforementioned process. However, use of the flat plate members applied with the bending process may obstruct attaining precision in dimensions. In view of this, it is desirable to apply the above manufacturing process to produce a driving member with relatively large dimensions or a driving member with less requirement on precision.

As shown in FIGS. 32A through 32C, precision in dimensions can be stabilized by: using the flat plate unit 41 to which a specific bending process has not been applied: jointing the flat plate unit 41 and the spacers 42 to each other; and deforming the flat plate unit 41 by interposing the gap increasing member 43 having the predefined dimensions to assemble a link mechanism. This is because the linear contact potions between the apices 431 and 432 of the gap increasing member 43, and the first and the second flat plate members 41A and 41B serve as the deformation points of the link mechanism, and the deformation points can be positively defined by the apices 431 and 432 of the gap increasing member 43.

On the other hand, in the case where a bending process is applied to the first and the second flat plate members 41A and 41B in advance, a variation in spring back may be generated resulting from a variation in material, directionality in rolling, or the like, which makes it difficult to produce the same parts i.e. flat plate members identical to each other. Therefore, precision in dimensions may not be stabilized. Also, integrally assembling the three parts i.e. the first and the second flat plates, and the gap increasing member each having a stereoscopic configuration into an integral unit may not only be difficult but also may increase a variation in finished dimensions. In the manufacturing process shown in FIGS. 32A through 32C, since a jointed member constructed by jointing the parallel-disposed flat plate members is used, precision in dimensions is stabilized, and assembling is facilitated. Also, since the finished dimensions are stabilized, the manufacturing process is suitable to manufacture a compact lens driving mechanism or the like.

The driving mechanism of the second embodiment i.e. the driving module S1 has been described as mentioned above. The following modifications 2-1 through 2-5 may be applicable to the second embodiment, for instance.

(1) Modification 2-1: Application to Lens Driving Mechanism

Figure 34A:
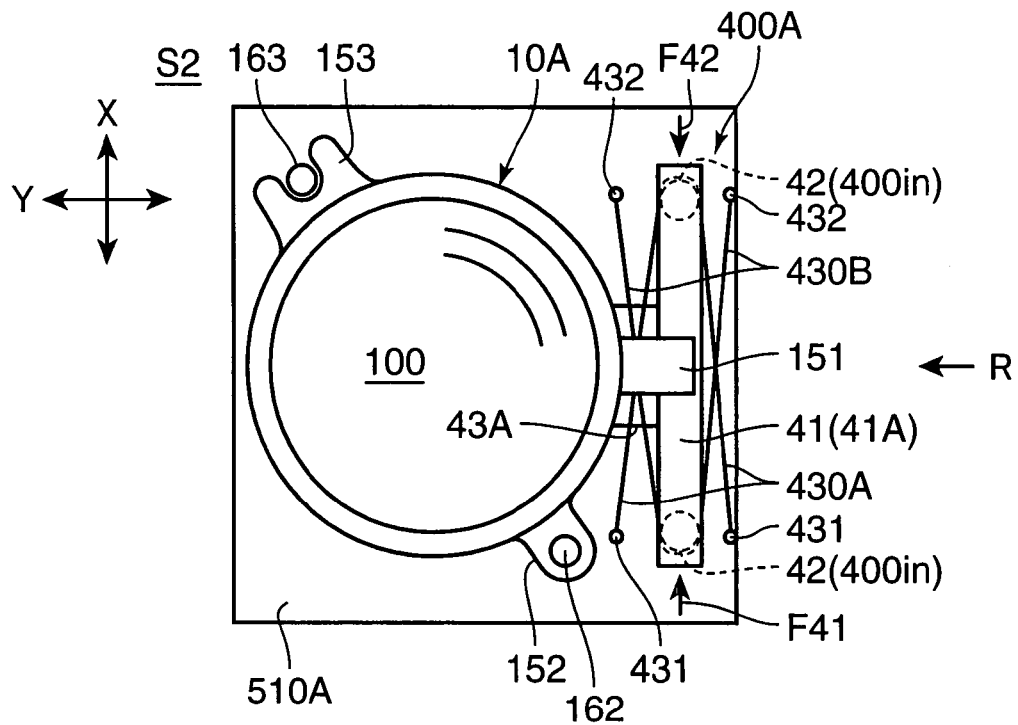
Figure 34B:
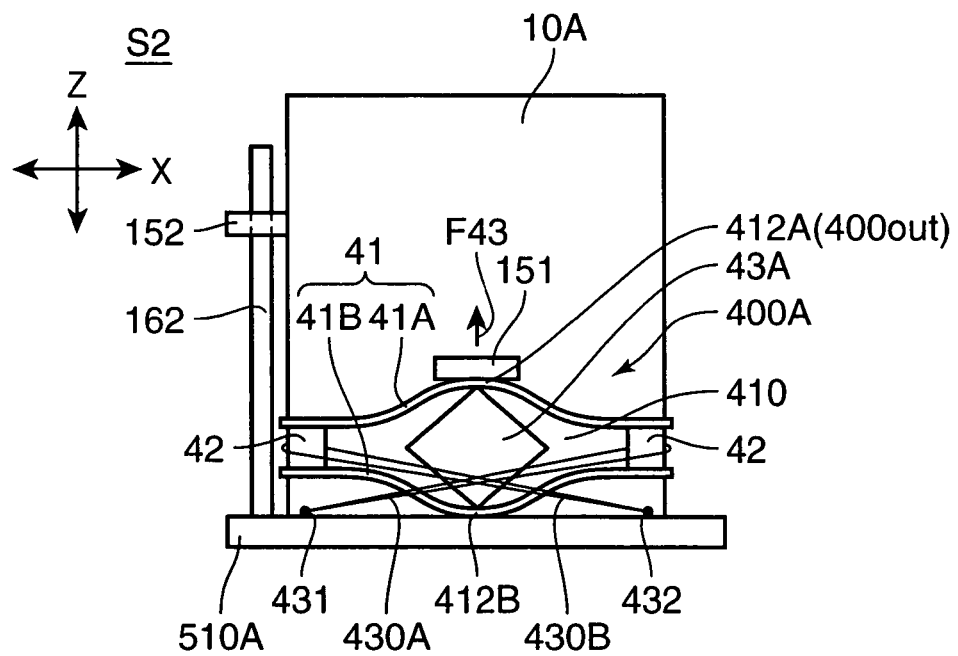

FIG. 34A is a plan view showing a lens driving module S2 to which the driving mechanism of the second embodiment is applied. FIG. 34B is a side view in the direction of the arrow R in FIG. 34A. The lens driving module S2 includes a lens unit 10A, as a driven member, which is disposed on a base member 510A, and a driving device 400A for moving the lens unit 10A in the optical axis direction i.e. the Z-axis direction or the first axis direction.

The driving device 400A includes a flat plate unit 41 i.e. a first flat plate member 41A and a second flat plate member 41B, two spacers 42, and two SMA actuators 430A and 430B. The first driving device 400A has substantially the same arrangement as the driving device 400 described in the second embodiment. Similarly to the first embodiment, the lens unit 10A includes, in addition to a taking lens portion 100, a support 151, a first guide 152, a second guide 153, and a gap increasing member 43A, each of which is projected from a tubular outer wall of the taking lens portion 100.

The support 151 is engaged with an intermediate portion 412A of the first flat plate member 41A, as a displacement output portion 400out. The first guide 152 has a hole through which a first guide rod 162 extends upright in the Z-axis direction from the base member 510A. The second guide 153 has a guide recess for slidably contacting with a second guide rod 163, which extends upright in the Z-axis direction from the base member 510A, similarly to the first guide rod 162.

The gap increasing member 43A corresponds to the gap increasing member 43 in the second embodiment, and constitutes a part of the driving mechanism 400A. In the modification 2-1, the gap increasing member 43A is integrally formed with the lens unit 10A. The gap increasing member 43A has a rhombus shape in cross section, as shown in FIG. 34B, so that the gap increasing member 43A can be easily interposed between the first and the second flat plate members 41A and 41B merely by rotating the lens unit 10A about the optical axis thereof.

The driving device 400A is arranged near one side of the base member 510A in the Y-axis direction. An intermediate portion 412B of the second flat plate member 41B is fixed to the base member 510A. End portions of each of the two SMA actuators 430A and 430B have electrodes 431 and 432. The SMA actuators 430A and 430B are wound over the spacers 42, respectively, with an acute angle with respect to the corresponding spacer 42.

In the above arrangement, when the SMA actuators 430A and 430B are operated i.e. contracted when energized and heated via the electrodes 431 and 432, moving forces F41 and F42 toward each other in the X-axis direction are applied to the spacers 42 as displacement input portions 400in. In response to the application of the moving forces F41 and F42, the first and the second flat plate members 41A and 41B are elastically deformed. As a result, a moving force F43 whose displacement amount is increased in the optical axis direction i.e. the Z-axis direction is generated at the intermediate portion 412A of the first flat plate member 41A.

Then, the moving force F43 is applied to the lens unit 10A via the support 151. Since the lens unit 10A is guided by the first guide rod 162 and the second guide rod 163, the lens unit 10A is moved exclusively in the optical axis direction despite the one-point support at the support 151. On the other hand, if the energization to the SMA actuators 430A and 430B is suspended, the lens unit 10A is returned to the home position by a bias spring force of the first and the second flat plate members 41A and 41B.

(2) Modification 2-2: Other Winding Manner of SMA Actuator

Figure 35:
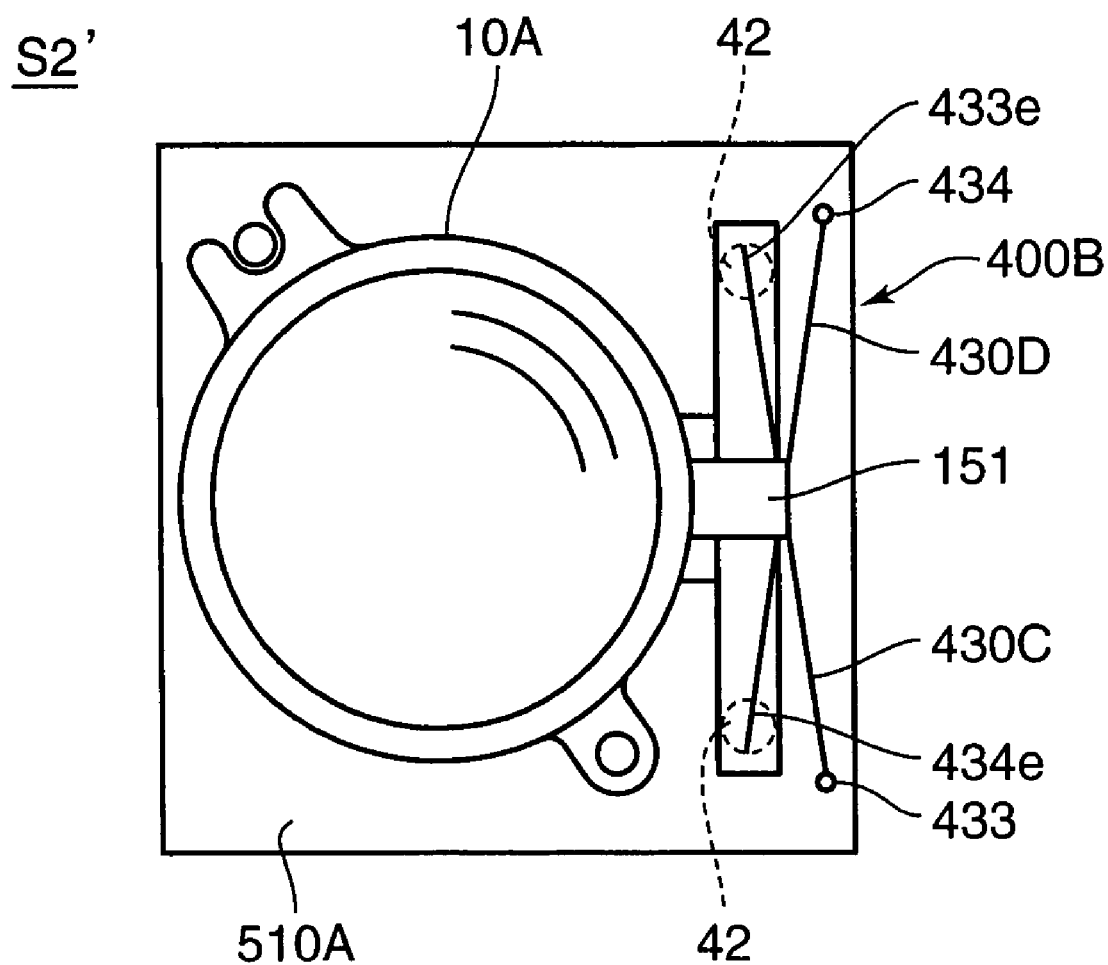
FIG. 35 is a plan view showing a lens driving module as a modification 2-2 of the second embodiment.

FIG. 35 is a plan view showing a lens driving module S2' as the second modification 2-2, which is an alteration of the modification 2-1. The second modification 2-2 is different from the first modification 2-1 in the winding manner of SMA actuator. A driving device 400B is constructed in such a manner that the other end of each of SMA actuator 430C and 430D respectively having electrodes 433 and 434 at one end thereof is engaged with a corresponding one of two spacers 42, in place of an arrangement that the SMA actuators 430C and 430D are wound over the spacers 42, respectively. In the modification 2-2, the spacers 42 may be made of an electrode material, and the SMA actuators 430C and 430D may serve as opposite electrodes to the electrodes 433 and 434, respectively.

(3) Modification 2-3: Annular Flat Plate Member

Figure 36A:
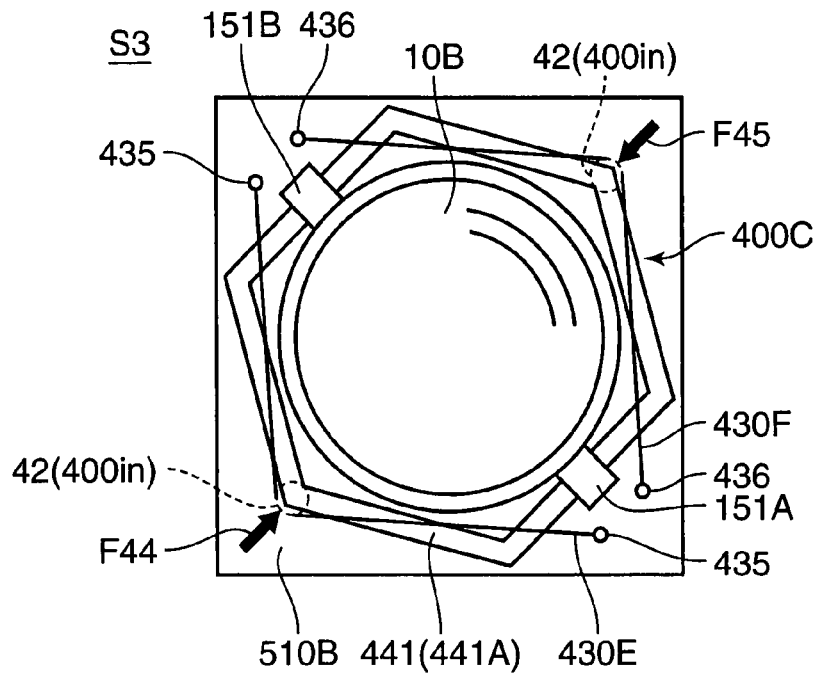
Figure 36B:
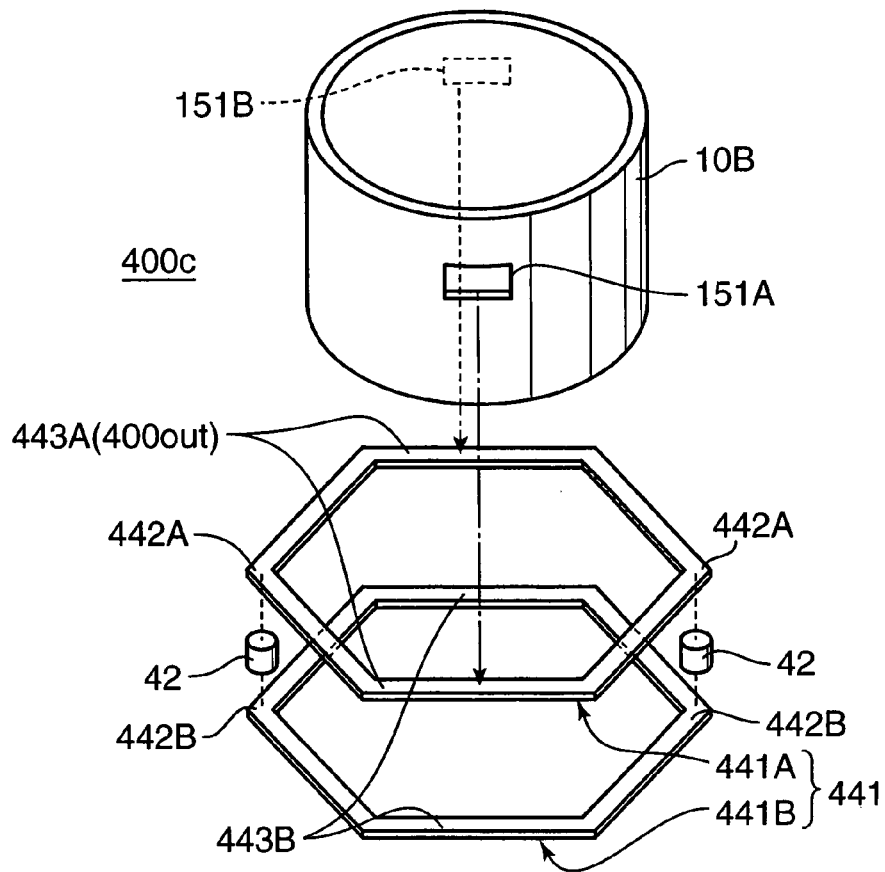

FIG. 36A is a plan view showing a lens driving module S3 as the third modification 2-3. FIG. 36B is an exploded perspective view showing essential parts of FIG. 36A. The lens driving module S3 includes a lens unit 10B, as a driven member, which is disposed on a base member 510B, and a driving device 400C for moving the lens unit 10B in the optical axis direction.

The driving device 400C of the third modification 2-3 includes a flat plate unit 441 i.e. a first flat plate member 441A and a second flat plate member 441B, two spacers 42, and two SMA actuators 430E and 430F. The driving device 400C is constituted of the first and the second flat plate members 441A and 441B each of which has a hexagonal shape in plan view. Alternatively, the shape of the flat plate unit 441 may be a polygonal shape other than the hexagonal shape, an annular shape, an elliptical shape, or the like. Each of the first and the second flat plate members 441A and 441B has a link structure constructed by linking six arms each in the form of a thin plate to define a hexagonal inner space for housing the lens unit 10B. The hexagonal first and second flat plate members 441A and 441B are integrally jointed to each other via the spacers 42 at positions each corresponding to a pair of corner portions 442A and 442B of the first and the second flat plate members 41A and 41B in a first centerline of the hexagonal flat plate unit 441.

The lens unit 10B has two outwardly extending supports 151A and 151B from the outer wall thereof at positions displaced from each other by 180 degrees. The supports 151A and 151B are engaged with two arm pieces 443A of the first flat plate member 441A, which are aligned on a second centerline orthogonal to the first centerline. Arm pieces 443B of the second flat plate member 441B opposing to the arm pieces 443A of the first flat plate member 441A are fixed to the base member 510B. In the driving device 400C, the two spacers 42 serve as displacement input portions 400in, and the two arm pieces 443A engaged with the supports 151A and 151B serve as displacement output portions 400out.

As shown in FIG. 36A, the SMA actuator 430E has an electrode 435 at one end thereof, and is wound over one of the spacers 42 with such an obtuse angle as to define a moderate V-shape with respect to the spacer 42. The SMA actuator 430F has an electrode 436 at one end thereof, and is wound over the other of the spacers 42 with an obtuse angle to define a moderate V-shape as opposed to the V-shape of the SMA actuator 430E.

In the above arrangement, when the SMA actuators 430E and 430F are operated i.e. contracted when energized and heated via the electrodes 435 and 436, moving forces F44 and F45 toward each other are applied to the spacers 42. In response to the application of the moving forces F44 and F45, the first and the second flat plate members 441A and 441B are elastically deformed. Then, a moving force whose displacement amount is increased in the optical axis direction i.e. the Z-axis direction is generated at the two arm pieces 443A of the first flat plate member 41A. Then, the moving force is applied to the lens unit 10B via the supports 151A and 151B, whereby the lens unit 10B is moved in the optical axis direction. On the other hand, when the energization to the SMA actuators 430E and 430F is suspended, the lens unit 10B is returned to the home position by the bias spring force of the first and the second flat plate members 441A and 441B.

(4) Modification 2-4: Other Winding Manner of SMA Actuator

Figure 37:
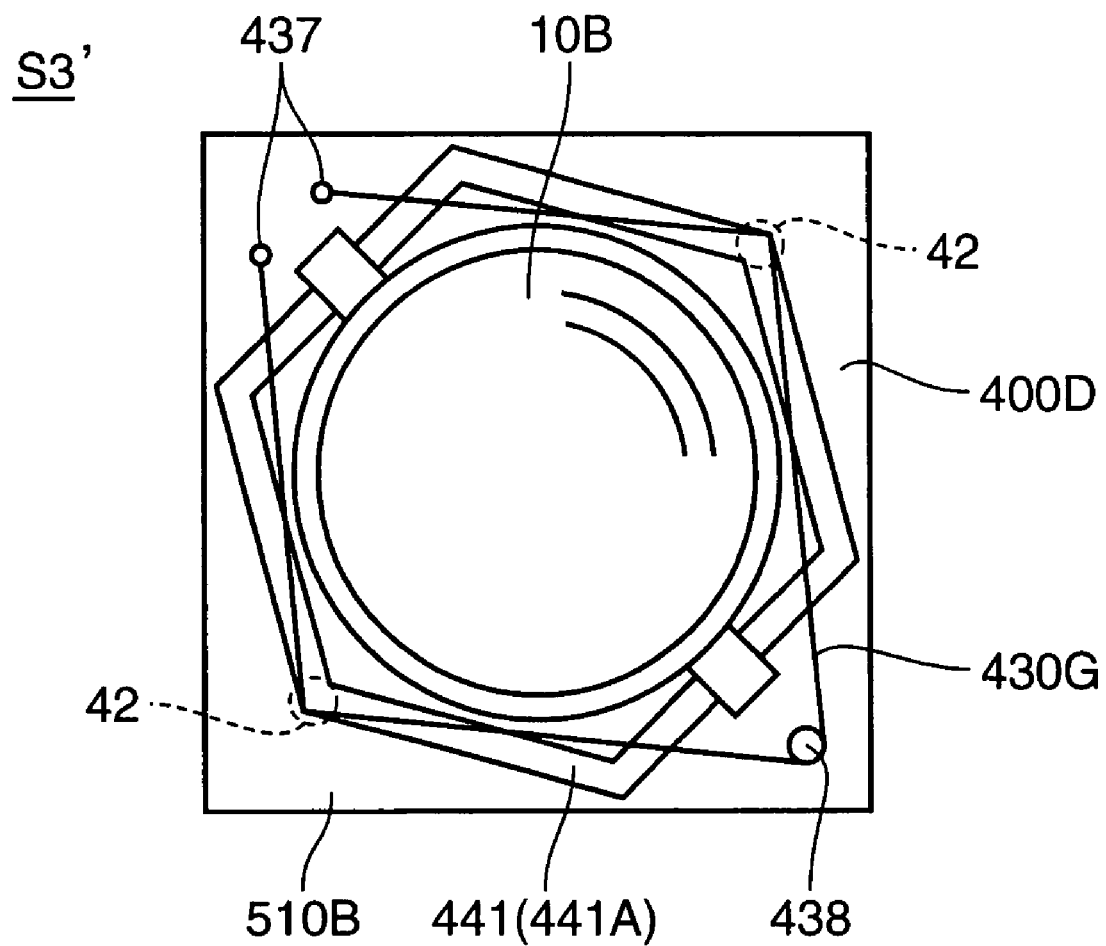
FIG. 37 is a plan view showing a lens driving module as a modification 2-4 of the second embodiment.

FIG. 37 is a plan view showing a lens driving module S3' as the modification 2-4, which is an alteration of the modification 2-3. The modification 2-4 is different from the modification 2-3 in the winding manner of SMA actuator. In a driving device 400D, a single SMA actuator 430G having electrodes 437 at both ends thereof is used.

A tension guide 438 is provided upright on a base member 510B to enable winding by the single SMA actuator 430G. The tension guide 438 is provided near a corner portion of the base member 510B. The SMA actuator 430G is first wound over one of the electrodes 437 which is arranged at a position diagonally opposing the tension guide 438, then one of the spacers 42, the tension guide 438, and the other of the spacers 42 to make one turn.

In the driving device 400D of the modification 2-4, since the single SMA actuator 430G is contacted with the two spacers 42, it is preferable to electrically insulate between the two spacers 42. The driving device 400D is advantageous in miniaturization because the number of the electrodes 437 can be reduced.

(5) Modification 2-5: Improved Deformation of Flat Plate Member

In the foregoing embodiment and modifications, the link mechanism constituted of two flat plate members essentially has a substantially rhombus shape. "Substantially rhombus shape" may include a shape analogous to an oblong circular shape. In the case of the oblong circular shape, however, the arc shape is varied, as the link mechanism is displaced. Accordingly, conversion loss from a moving force inputted in the first axis direction into a force in the second axis direction may be generated. A shape which is gradually deformed while keeping a rhombus shape provides efficient conversion. In view of the above, it is desirable to form an easy-deformable portion with a smaller rigidity at a portion of the flat plate member corresponding to the deformation points of the link mechanism.

Figure 38A:
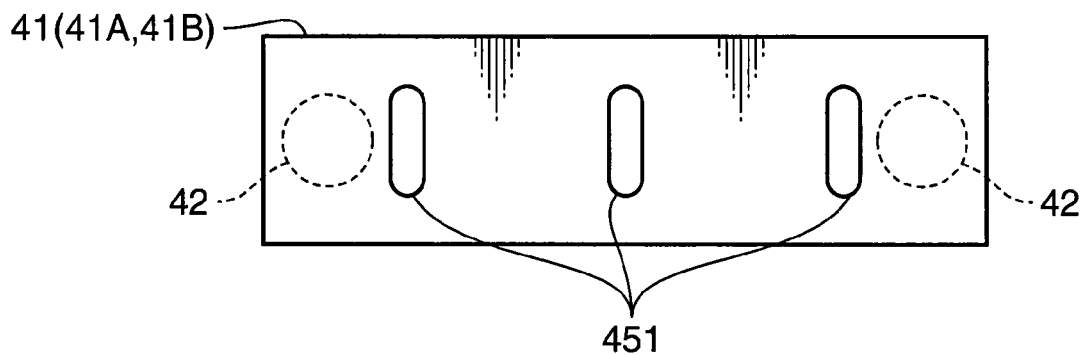
FIGS. 38A through 38C are explanatory diagrams showing an example of easy-deformable portions to be formed on flat plate members.

FIG. 38A is a plan view showing an example of the easy-deformable portion to be formed on a flat plate unit 41. In this example, three slits 451 each having a certain length in the shorter side direction of the flat plate unit 41 are formed in an intermediate position in the longer side direction thereof, and in both ends of the flat plate unit 41 at inner positions relative to the spacers 42. Formation of the slits 451 substantially decreases the width of the flat plate unit 41 in the shorter side direction. Accordingly, the portion of the flat plate unit 41 where the slits 451 are formed has a smaller mechanical strength than the other portion of the flat plate unit 41.

Figure 38B:
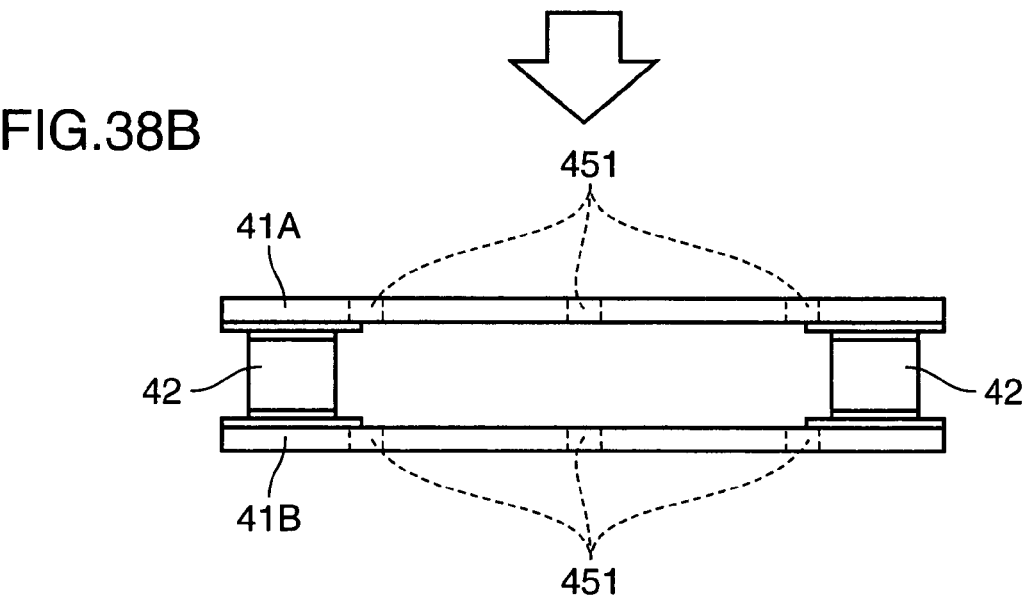
Figure 38C:
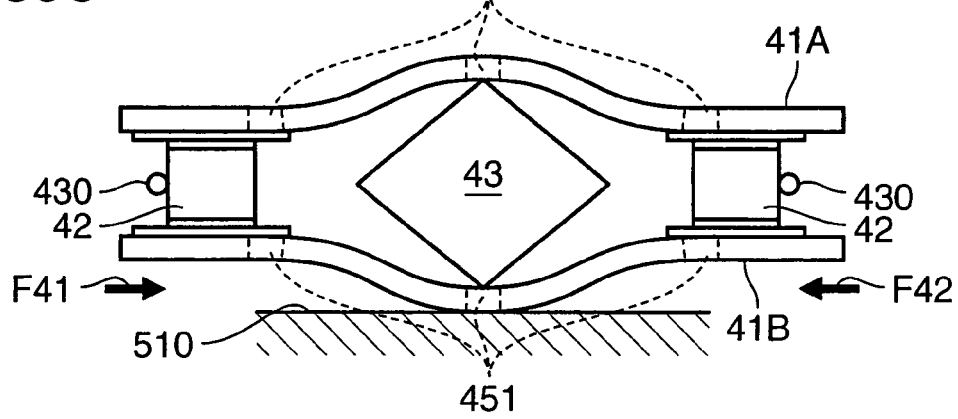

In the above construction, as shown in FIGS. 38B and 38C, in the case where flat plate members 41A and 41B of the flat plate unit 41 each formed with the three slits 451 are jointed to each other via two spacers 42 into an integral unit, and an SMA actuator 430 is operated while being wound over the integral unit, the portions of the flat plate members 41A and 41B where the slits 451 are formed are intensively bent i.e. deformed. Conversely, the other portions of the flat plate members 41A and 41B where the slits 451 are not formed are not largely bent or deformed. Accordingly, it is easy to deform the flat plate members 41A and 41B while keeping its rhombus shape. Thus, an efficient increase of a displacement amount can be accomplished.

Figure 39:
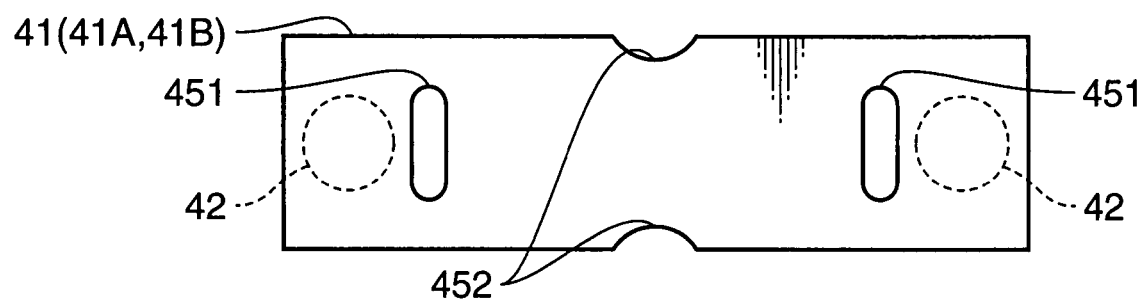
FIGS. 39 and 40 are explanatory diagrams showing another example of the easy-deformable portions.

The easy-deformable portion may be formed by a technique other than the slit formation. For instance, as shown in FIG. 39, lateral ends of a flat plate unit 41 in the longer side direction thereof may be punched to form indents 452 to partially decrease the width of the flat plate unit 41 in the shorter side direction thereof. In FIG. 39, the indents 452 are formed in the intermediate portion of the rectangular flat plate unit 41 in the longer side direction, and slits 451 are formed in both ends of the rectangular flat plate unit 45 in the longer side direction. Alternatively, the formation of the indents 452 and the formation of the slits 451 may be arbitrarily combined.

Figure 40:
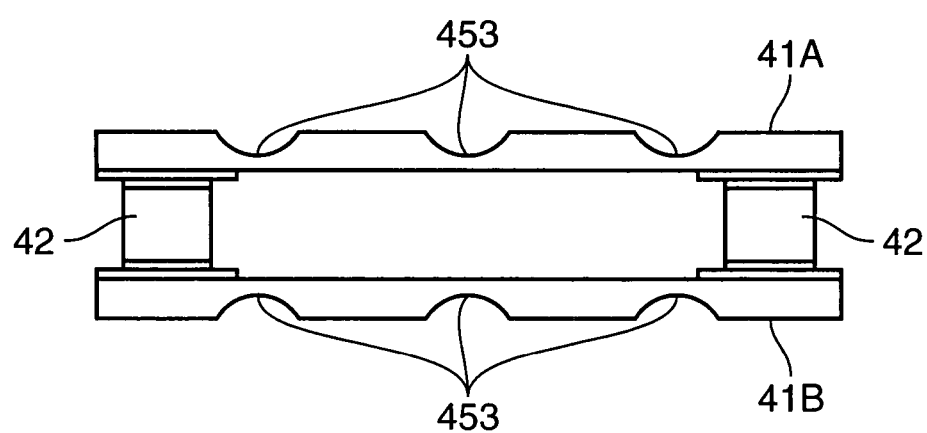

FIG. 40 shows an example, in which smaller thickness portions 453 are formed in each of flat plate members 41A and 41B. The smaller thickness portions 453 may be formed by e.g. performing etching with respect to the flat plate members 41A and 41B.

The foregoing embodiment and/or modifications primarily include the inventions having the following arrangements.

A driving device according to an aspect of the invention is a driving device for driving a driven member. The driving device comprises: a driving member including a displacement output portion which is movable in a first axis direction, and a displacement input portion for moving the displacement output portion in the first axis direction in response to an application of a moving force in a second axis direction orthogonal to the first axis direction, the driving member being engaged with the driven member at the displacement output portion; and a linear shape memory alloy (SMA) actuator, disposed in contact with the driving member at least at the displacement input portion, for applying the moving force to the displacement input portion.

In the above arrangement, a displacement i.e. a first step displacement in the second axis direction orthogonal to the first axis direction in which the moving force is generated by an operation of the SMA actuator is applied to the displacement input portion of the driving member. In response to the application of the first step displacement, the displacement output portion of the driving member performs a displacement i.e. a second step displacement. Then, the driven member is allowed to be moved in the first axis direction by the second step displacement. In other words, the displacement whose displacement direction has been converted via the driving member is applied to the driven member, in place of directly applying the displacement of the SMA actuator itself to the driven member. In this arrangement, the SMA actuator as the driving source can be disposed around the driven member, which enables to reduce the size of the driving device in the first axis direction. Also, the displacement larger than the actual displacement of the SMA actuator can be applied to the driven member by selecting a displacement transmitter of the driving member for outputting the second step displacement in response to the application of the first step displacement, as a displacement increasing mechanism.

Preferably, the SMA actuator and the driving member may satisfy the following formula:

$$C \leq L/2$$

where L represents an entire length of the SMA actuator, and C represents a length of the SMA actuator in contact with the driving member.

In the above arrangement, since the frictional contact portion of the linear SMA actuator with the driving member has a length equal to or smaller than L/2, the driving force of the SMA actuator can be efficiently supplied to the driving member. Also, since heating and cooling of SMA can be efficiently performed, responsiveness of the driving device can be improved.

Preferably, at least two sites may be provided as the displacement input portion, and the SMA actuator may be contacted with the driving member substantially exclusively at the sites of the displacement input portion.

In the above arrangement, since the frictional contact portion of the linear SMA actuator with the driving member is restricted to the displacement input portion, the driving force of the SMA actuator can be more efficiently supplied to the driving member.

Preferably, the driving member may include a mechanism for outputting, from the displacement output portion, a second displacement amount larger than a first displacement amount, if the first displacement amount is applied to the displacement input portion.

In the above arrangement, the driving member exhibits a displacement increasing function capable of applying, to the driven member, a displacement larger than the actual displacement of the SMA actuator. Accordingly, the driven member can be driven with the increased displacement amount, even if the displacement amount of the SMA actuator is small.

Preferably, the driving member may include: the displacement input portion; the displacement output portion disposed at a position distanced from the displacement input portion in the first axis direction; an arm for connecting the displacement input portion to the displacement output portion; and bent portions of the arm which are formed near the displacement input portion and the displacement output portion, respectively.

In the above arrangement, the moving force is transmitted from the displacement input portion to the displacement output portion via the arms, and the bent portions function as joints. Accordingly, when the moving force in the second axis direction is applied to the displacement input portion, the moving force can be outputted from the displacement output portion after being converted into a moving force in the first axis direction. In other words, this arrangement enables to construct the driving member with a less number of parts, and without using a costly part.

Preferably, the driving member may be formed by linking the four arms into a rectangular shape, with a hollow portion being defined to encase the driven member therein, and two opposing apex portions of the rectangle may serve as the displacement input portion, and other two opposing apex portions thereof may serve as the displacement output portion.

In the above arrangement, the moving force in the second axis direction is applied from the SMA actuator to the displacement input portion located at the two opposing apex portions of the rectangle, and the displacement by application of the moving force is transmitted to the displacement output portion located at the other two opposing apex portions via the arms. Then, the driven member engaged with the displacement output portion is moved in the first axis direction. Specifically, the displacement is transmitted without any means such as a sliding part or a gear meshing part. Accordingly, there is no likelihood of positional displacement including backlash, thereby enabling to smoothly drive the driven member with superior responsiveness and superior output efficiency. Also, since the link mechanism has the rectangular shape, a displacement larger than the displacement applied to the displacement input portion can be easily outputted from the displacement output portion. Further, since the driving force is intensively generated along the first axis, the driven member can be driven with a rectilinear force.

Preferably, the driving member may include a first driving piece constructed by linking the four arms into a rectangular shape, with a hollow portion being defined to encase the driven member therein, and a second driving piece constructed by linking the four arms into a rectangular shape, the second driving piece having an identical structure to the first driving piece, two opposing apex portions of the first driving piece may serve as the displacement input portion, and other two opposing apex portions thereof serve as the displacement output portion, two opposing apex portions of the second driving piece may serve as the displacement input portion, and other two opposing apex portions thereof may serve as a fixed portion to be fixed to an unmoved base member, and the displacement input portion of the first driving piece and the displacement input portion of the second driving piece may be jointed to each other, and the displacement output portion of the first driving piece and the fixed portion of the second driving piece may be arranged at positions opposite to each other in the first axis direction.

In the above arrangement, positional displacement including backlash can be suppressed, thereby enabling to drive the driven member with superior output efficiency. Also, the first and the second driving pieces each having the rectangular link structure are jointed to each other at the displacement input portions thereof, and the fixed portion is provided on the second driving piece. This enables to provide the driving member with a substantially pantograph mechanism. Accordingly, the displacement amount of the displacement output portion of the first driving piece can be increased largely, as compared with the actual displacement amount of the SMA actuator. Further, since the pantograph mechanism functions as a cushion member for the driven member, the driving device is provided with superior impact resistance.

Preferably, the driving member may include: a first driving piece constructed by linking the four arms into a rectangular shape, with a hollow portion being defined to encase the driven member therein; a second driving piece constructed by linking the four arms into a rectangular shape, the second driving piece having an identical structure to the first driving piece; and two joint members, disposed between the first driving piece and the second driving piece at opposing two apex portions of each of the first driving piece and the second driving piece to joint the first driving piece and the second driving piece spaced away from each other by a predetermined gap, and the two joint members may serve as the displacement input portion, and other two opposing apex portions of the first driving piece may serve as the displacement output portion.

In the above arrangement, the joint portions of the first and the second linking pieces are less likely to be buckled by application of the tension force of the SMA actuator. Accordingly, the driving force of the SMA actuator can be efficiently converted into the moving force in the first axis direction.

Preferably, the joint members each may be a boss which is formed upright on the apex portion of one of the first driving piece and the second driving piece by a drawing process, and a recess may be formed in a counterpart apex portion of the other of the first driving piece and the second driving piece by a drawing process for receiving an end of the boss therein.

The above arrangement provides easy positioning and superior assembling performance, and eliminates the need of using an additional part as the joint member, which enables to reduce the production cost.

Preferably, the joint members each may be a pin which is formed upright on the apex portion of one of the first driving piece and the second driving piece, and a recess may be formed in a counterpart apex portion of the other of the first driving piece and the second driving piece by a drawing process for receiving an end of the pin therein.

The above arrangement enables to assemble the first and the second driving pieces in one direction, which provides superior assembling performance.

Preferably, each of the first driving piece and the second driving piece may have linking pieces at two apex portions thereof where the joint members are interposed, respectively, the linking piece of the first driving piece and the linking piece of the second driving piece may be disposed parallel to each other, and the joint members each may be disposed between the linking piece of the first driving piece and the linking piece of the second driving piece at an inner position relative to an outer peripheral end of the linking piece of the first driving piece and an outer peripheral end of the linking piece of the second driving piece.

The above arrangement enables to further suppress the buckling, and to facilitate winding of the SMA actuator.

Preferably, the driving member may include a first driving piece constructed by linking the four arms into a rhombus shape having a longer size and a shorter size, with a hollow portion being defined to encase the driven member therein, and a second driving piece constructed by linking the four arms into a rhombus shape, the second driving piece having an identical structure to the first driving piece, the first driving piece and the second driving piece may be jointed to each other at two apex portions of each of the first driving piece and the second driving piece in a direction of the longer size of the rhombus, and the two apex portions of each of the first driving piece and the second driving piece in the longer size direction of the rhombus may serve as the displacement input portion, and other two apex portions of the first driving piece in a direction of the shorter size of the rhombus may serve as the displacement output portion.

The above arrangement enables to increase the moving force in the first axis direction, and to facilitate securing a space for assembling the driving member in the shorter size direction thereof.

Preferably, the arms constituting the first driving piece and the second driving piece each may be a plate member, and the arm may have a smaller width on the two apex portions of each of the first driving piece and the second driving piece in the shorter size direction of the rhombus than a width on a portion of the arm other than the two apex portions.

The above arrangement secures superior deformability of the first and the second driving pieces.

Preferably, the portion of the arm having the smaller width may be produced by forming a cutaway in the shorter size direction of the rhombus, and the cutaway may have such a shape as to receive a projection formed on the driven member in contact with the first driving piece at the displacement output portion and/or a projection formed on a member in contact with two apex portions of the second driving piece in the shorter size direction of the rhombus.

The above arrangement is advantageous in suppressing positional displacement of the driven member or the driving member.

Preferably, the driving device may further comprise: a winding portion each provided on the displacement input portion for guiding the SMA actuator, wherein the SMA actuator is a wire member having electrodes at both ends thereof for energizing and heating the SMA actuator, the SMA actuator being wound over the winding portion of the displacement input portion.

In the above arrangement, the deformation force resulting from energizing and heating the SMA actuator as the single wire member is applied to the winding portion, which in turn, applies the deformation force to the displacement input portion. Accordingly, a relatively large displacement generated on the SMA actuator as the single wire member can be inputted to the displacement input portion substantially without a loss.

Preferably, the driving device may further comprise: a tension guide, arranged at one side of the displacement output portion, for winding the SMA actuator along the rectangular shape of the driving member, wherein the SMA actuator is wound along a route including the other side of the displacement output portion as a start point, the winding portion of the displacement input portion, the tension guide, and the other side of the displacement output portion again.

In the above arrangement, the SMA actuator is wound into the rectangular shape, using the two winding portions and the tension guide. Since the SMA actuator wound along the predetermined route expands and contracts with the same displacement amount, there is no likelihood that a friction or a like drawback may be generated at the tension guide. Similarly, there is no likelihood that a friction or a like drawback may be generated at the winding portions. This arrangement enables to minimize loss of a magnitude of force resulting from friction, and to prevent damage of the SMA actuator due to friction.

Preferably, the SMA actuator may be multiply wound over the winding portion of the displacement input portion and the tension guide by winding back or winding by multiple turns.

The above arrangement provides the driving member with a large magnitude of force by multiple winding of the SMA actuator.

Preferably, the driving device may further comprise: a winding portion each provided on the displacement input portion for guiding the SMA actuator, wherein the SMA actuator is two wire members each having electrodes at both ends thereof for energizing and heating the corresponding SMA actuator, and each of the SMA actuators is wound in contact with the corresponding winding portion of the displacement input portion.

In the above arrangement, the SMA actuator is constituted of the relatively short two wire members, in place of being constituted of a single wire member. This enables to increase the current value when the same voltage is applied as in the arrangement that the SMA actuator is constituted of the single wire member, thereby increasing displacement responsiveness.

Preferably, the driving member constituted of the first driving piece and the second driving piece may be placed in multiple sets in the first axis direction.

The above arrangement enables to increase the displacement amount of the driven member since the multiple sets of driving members are provided.

Preferably, the driving member may have an annular shape for encasing the driven member therein, with a cross section in an axis direction of the driving member formed into a lateral V-shape, a bent portion of the V-shape being located at a radially outermost position, and the bent portion of the V-shape may serve as the displacement input portion, and a peripheral portion of the V-shape may serve as the displacement output portion.

In the above arrangement, when the moving force is applied to the bent portion of the annular driving member corresponding to a segment of a bellows-like member, the driving member is deformed in such a direction as to increase the V-shape in cross section in the first axis direction. Thereby, the peripheral portion of the V-shape is moved in the first axis direction, thereby enabling to move the driven member in the first axis direction. This arrangement enables to mount the SMA actuator on the driving member, which is advantageous in miniaturizing the driving device.

Preferably, the driving member may include: two flat plate members each made of an elastic material; two gap holders each having a first length in the first axis direction, the two gap holders being arranged between the two flat plate members and away from each other by a predetermined distance, for jointing the two flat plate members substantially parallel to each other with a gap corresponding to the first length in the first axis direction; and a gap increasing member having a second length larger than the first length in the first axis direction, the gap increasing member being disposed between the two flat plate members and at a position between the two gap holders for increasing the gap between the two flat plate members defined by the gap holders to the second length, the two gap holders serving as the displacement input portion, and at least one portion of the flat plate members whose gap is increased by the gap increasing member serving as the displacement output portion.

In the above arrangement, the gap of the two flat plate members which are jointed substantially in parallel to each other by the gap holders is increased by the gap increasing member. Specifically, a mechanism equivalent to the link mechanism is obtained by deforming the flat plate members by interposing the gap increasing member, without applying a specific bending process or a like process to the flat plate members. In the case where a bending process is applied, a variation in spring back may be generated resulting from a variation in material, directionality in rolling, or the like, which makes it difficult to produce identical parts. The above arrangement, however, enables to stabilize precision in dimensions, and to facilitate assembling, because the jointed unit obtained by jointing the flat plate members is used.

Preferably, the two flat plate members may have rectangular flat surface configurations identical to each other, and the two gap holders may be disposed at both ends of the flat plate members in a direction of a longer side thereof.

The above arrangement enables to produce the driving device having a large displacement amount and stabilized performance, with use of the rectangular flat plate members having the simple construction. The arrangement is also advantageous in miniaturizing the driving device.

Preferably, the two flat plate members may have flat surface configurations identical to each other, with a hollow portion being defined in a middle portion of each of the flat plate members to encase the driven member therein, and the two flat plate members may be jointed to each other by two gap holders disposed opposite to each other with respect to the hollow portions.

The above arrangement enables to produce the driving device, with the driven member being encased therein, in a simplified manner.

Preferably, the flat plate members each may have an easy-deformable portion.

In the above arrangement, when the moving force is applied to the SMA actuator, the flat plate members are easily bent at the easy-deformable portions. This enables to positively flex the flat plate members so that a large displacement can be secured e.g. a rhombus shape in side view can be secured, thereby enabling to obtain a large displacement amount.

Particularly preferably, the flat plate members each may have an easy-deformable portion at an intermediate position of the flat plate member in the longer side direction thereof, and at both end positions of the flat plate member in the longer side direction thereof at inner positions relative to the gap holders by substantially decreasing a width of the flat plate member in a direction of a shorter side thereof or by decreasing a thickness thereof.

In the above arrangement, the easy-deformable portion can be easily formed by punching or forming a hole in an end portion of the rectangular flat plate members, etching, or the like.

Preferably, the gap increasing member may have two apices away from each other by the second length in the first axis direction.

The above arrangement enables to precisely flex the flat plate members at the apices of the gap increasing member.

Preferably, the flat plate members each may be a substrate member obtained by forming a metal conductive pattern on a flexible base member, the gap holders each may have a metal layer at least on a joint portion with each of the flat plate members, and the conductive patterns of the flat plate members and the metal layers of the gap holders may be solder-jointed.

The above arrangement enables to facilitate production of the driving member, using a well-known soldering device.

Preferably, the driving device may further comprise: a bias member for biasing the driven member in a first direction of the first axis direction with a force smaller than the moving force of the displacement output portion when the driving member moves the driven member in a second direction of the first axis direction opposite to the first direction.

In the above arrangement, since the bias force is applied to the driving member by the bias member via the driven member, the driven member can be returned to the home position merely by suspending the operation of the SMA actuator, which is advantageous in facilitating the driving control.

Preferably, the driving device may further comprise: a restrainer for restraining a displacement of the driven member in a direction along the first axis direction.

The above arrangement enables to suppress tilt of the driven member resulting from balance failure or the like, which may occur in assembling, thereby enabling to move the driven member precisely in the first axis direction.

Preferably, the at least two contact sites of the SMA actuator with the driving member may be electrically insulated.

The above arrangement enables to operate the SMA actuator precisely, while preventing a current loss.

A driving mechanism according to another aspect of the invention comprises: a driven member; and a driving device for moving the driven member in a first axis direction, wherein the driving device has the aforementioned arrangement.

In the above arrangement, preferably, the driven member may be a lens unit, and the driving device may move the lens unit in a direction of an optical axis of the lens unit.

In the above arrangement, the lens unit can be freely moved in the optical axis direction by the driving device. Thus, the arrangement provides a driving mechanism suitable for a high-performance imaging optical system which is superior in assembling into a compact image sensing apparatus such as a camera phone, and is compatible with auto-focus control or optical zoom control.

Preferably, the lens unit may have a tubular shape, with a support extending from an outer wall thereof, and the displacement output portion may be engaged with the support.

The above arrangement enables to efficiently transmit the moving force to the lens unit via the support.

Preferably, the arrangement provided with the gap increasing member may comprise a lens unit; and the aforementioned driving device for moving the lens unit in a direction of an optical axis of the lens unit, wherein the gap increasing member is integrally formed with the lens unit.

The above arrangement enables to reduce the number of parts, because the gap increasing member is integrally formed with the lens unit.

Preferably, the gap increasing member may have a sharp apex in a circumferential direction of the lens unit.

The above arrangement enables to easily insert the gap increasing member between the flat plate members. The gap increasing member between the flat plate members can be inserted by e.g. merely rotating the lens unit about the optical axis thereof.

An image sensing apparatus according to yet another aspect of the invention comprises a lens unit, a driving device for moving the lens unit in a direction of an optical axis thereof, an image sensor arranged on an imaging side of the lens unit, and a controller for controlling an operation of the driving device, wherein the driving device has the aforementioned arrangement.

The above arrangement enables to provide a compact and impact resistant image sensing apparatus such as a camera phone by loading the driving mechanism having the above advantages.

According to the invention as described above, provided is a compact and lightweight driving device, incorporated with an SMA actuator, which is capable of obtaining a large displacement amount. For instance, in the case where the driving device is used for driving a lens unit, provided is a driving mechanism suitable for a high-performance imaging optical system which is superior in assembling into a compact image sensing apparatus such as a camera phone, and is compatible with auto-focus control or optical zoom control.

Although the invention has been appropriately and fully described by way of examples with reference to the accompanying drawings, it is to be understood that various changes and/or modifications will be apparent to those skilled in the art. Therefore, unless otherwise such changes and/or modifications depart from the scope of the present invention hereinafter defined, they should be construed as being included therein.

What is claimed is:

1. A driving device for driving a driven member, comprising:
    a driving member comprising:
        first and second sheet-like driving pieces, each having at least four driving arms arranged so as to form a four-sided aperture within which to slidably mount the driven member;
        a first displacement output portion attached to at least one of the driving arms of the first sheet-like driving piece, the first displacement output portion being movable in a first axis direction;
        a second displacement output portion attached to at least one of the driving arms of the second sheet-like driving piece, the second displacement output portion being movable in the first axis direction;
        first and second displacement input portions for moving the first and second displacement output portions in the first axis direction in response to an application of a moving force in a second axis direction orthogonal to the first axis direction, one or both of the first and second displacement output portions being suitable for mounting the driven member thereto; and
    a linear shape memory alloy (SMA) actuator contacting at least one of the displacement input portions for applying the moving force to at least one of the displacement input portions, the SMA actuator comprising a wire member having electrodes to energize and heat the SMA actuator, the SMA actuator being wound around an outer periphery of the driving member and positioned such that energizing and de-energizing of the SMA actuator causes the at least one of the displacement input portions to move in the second axis direction,
    wherein a distance between the first displacement output portion and the second displacement output portion increases in the first axis direction when a distance between the first displacement input portion and the second displacement input portion decreases in the second axis direction.

2. The driving device according to claim 1, wherein the SMA actuator and the driving member satisfy the following formula:

$$C \leq L/2$$

where L represents an entire length of the SMA actuator, and C represents a length of the SMA actuator in contact with the driving member.

3. The driving device according to claim 1, wherein both displacement input portions are suitable for mounting the driven member thereto.

4. The driving device according to claim 3, further comprising electrical insulation disposed between the SMA actuator and the driving member.

5. The driving device according to claim 1, wherein
    the first and second displacement output portions are disposed at a position distanced in the first axis direction from the first and second displacement input portions;
    the driving arms connect the first and second displacement input portions to the first and second displacement output portions; and
    the driving arms have bent portions near the first and second displacement input portions and the first and second displacement output portions.

6. The driving device according to claim 5, wherein
    the at least four driving arms are arranged into a rectangular shape, and
    two opposing apex portions of the rectangle serve as the first and second displacement input portions, and other two opposing apex portions thereof serve as the first and second displacement output portions.

7. The driving device according to claim 6, further comprising:
    a winding portion disposed on the displacement input portion for guiding the SMA actuator, wherein
    the SMA actuator is a wire member having electrodes at both ends thereof for energizing and heating the SMA actuator, the SMA actuator being wound over the winding portion of the displacement input portion.

8. The driving device according to claim 7, further comprising:
    a tension guide, arranged at one side of the displacement output portion, for winding the SMA actuator along the rectangular shape of the driving member, wherein
    the SMA actuator is wound along a route including the other side of the displacement output portion as a start point, the winding portion of the displacement input portion, the tension guide, and the other side of the displacement output portion again.

9. The driving device according to claim 8, wherein the SMA actuator is wound over the winding portion of the displacement input portion and the tension guide a plurality of times by winding back or winding by multiple turns.

10. The driving device according to claim 6, further comprising:
a winding portion disposed on the displacement input portion for guiding the SMA actuator, wherein
the SMA actuator is two wire members each having electrodes at both ends thereof for energizing and heating the corresponding SMA actuator, and
each of the SMA actuators is wound in contact with the corresponding winding portion of the displacement input portion.

11. The driving device according to claim 5, wherein
the displacement input portion of the first driving piece and the displacement input portion of the second driving piece are jointed to each other, and the displacement output portion of the first driving piece and the fixed portion of the second driving piece are arranged at positions opposite to each other in the first axis direction.

12. The driving device according to claim 11, wherein
the driving member constituted of the first driving piece and the second driving piece is placed in multiple sets in the first axis direction.

13. The driving device according to claim 5, wherein
the second driving piece has an identical structure to the first driving piece; and
the driving member comprises:
two joint members, disposed between the first driving piece and the second driving piece at opposing two apex portions of each of the first driving piece and the second driving piece to joint the first driving piece and the second driving piece spaced away from each other by a predetermined gap,
the two joint members serving as the displacement input portion, and other two opposing apex portions of the first driving piece serving as the displacement output portion.

14. The driving device according to claim 13, wherein
the joint members each is a boss which is formed upright on the apex portion of one of the first driving piece and the second driving piece by a drawing process, and
a recess is formed in a counterpart apex portion of the other of the first driving piece and the second driving piece by a drawing process for receiving an end of the boss therein.

15. The driving device according to claim 13, wherein
the joint members each is a pin which is formed upright on the apex portion of one of the first driving piece and the second driving piece, and
a recess is formed in a counterpart apex portion of the other of the first driving piece and the second driving piece by a drawing process for receiving an end of the pin therein.

16. The driving device according to claim 13, wherein
each of the first driving piece and the second driving piece has linking pieces at two apex portions thereof where the joint members are interposed, respectively,
the linking piece of the first driving piece and the linking piece of the second driving piece are disposed parallel to each other, and
the joint members each is disposed between the linking piece of the first driving piece and the linking piece of the second driving piece at an inner position relative to an outer peripheral end of the linking piece of the first driving piece and an outer peripheral end of the linking piece of the second driving piece.

17. The driving device according to claim 5, wherein
the driving member includes a first driving piece constructed by linking the four arms into a rhombus shape having a longer size and a shorter size, with a hollow portion being defined to encase the driven member therein, and a second driving piece constructed by linking the four arms into a rhombus shape, the second driving piece having an identical structure to the first driving piece,
the first driving piece and the second driving piece are jointed to each other at two apex portions of each of the first driving piece and the second driving piece in a direction of the longer size of the rhombus, and
the two apex portions of each of the first driving piece and the second driving piece in the longer size direction of the rhombus serve as the displacement input portion, and other two apex portions of the first driving piece in a direction of the shorter size of the rhombus serve as the displacement output portion.

18. The driving device according to claim 17, wherein
the arms constituting the first driving piece and the second driving piece each is a plate member, and
the arm has a smaller width on the two apex portions of each of the first driving piece and the second driving piece in the shorter size direction of the rhombus than a width on a portion of the arm other than the two apex portions.

19. The driving device according to claim 18, wherein
the portion of the arm having the smaller width is produced by forming a cutaway in the shorter size direction of the rhombus, and
the cutaway has such a shape as to receive a projection formed on the driven member in contact with the first driving piece at the displacement output portion and/or a projection formed on a member in contact with two apex portions of the second driving piece in the shorter size direction of the rhombus.

20. The driving device according to claim 1, wherein
the driving member has an annular shape for encasing the driven member therein, with a cross section in an axis direction of the driving member formed into a lateral V-shape, a bent portion of the V-shape being located at a radially outermost position, and
the bent portion of the V-shape serves as the displacement input portion, and a peripheral portion of the V-shape serves as the displacement output portion.

21. The driving device according to claim 1, wherein
the driving member comprises:
two flat plate members each made of an elastic material;
two gap holders each having a first length in the first axis direction, the two gap holders being arranged between the two flat plate members and away from each other by a predetermined distance, for jointing the two flat plate members substantially parallel to each other with a gap corresponding to the first length in the first axis direction; and
a gap increasing member having a second length larger than the first length in the first axis direction, the gap increasing member being disposed between the two flat plate members and at a position between the two gap holders for increasing the gap between the two flat plate members defined by the gap holders to the second length,
the two gap holders serving as the displacement input portion, and at least one portion of the flat plate members whose gap is increased by the gap increasing member serving as the displacement output portion.

22. The driving device according to claim 21, wherein
the two flat plate members have rectangular flat surface configurations identical to each other, and the two gap holders are disposed at both ends of the flat plate members in a direction of a longer side thereof.

23. The driving device according to claim 22, wherein
the flat plate members each has an easy-deformable portion at an intermediate position of the flat plate member in the longer side direction thereof, and at both end positions of the flat plate member in the longer side direction thereof at inner positions relative to the gap holders by substantially decreasing a width of the flat plate member in a direction of a shorter side thereof or by decreasing a thickness thereof.

24. The driving device according to claim 21, wherein
the two flat plate members have flat surface configurations identical to each other, with a hollow portion being defined in a middle portion of each of the flat plate members to encase the driven member therein, and
the two flat plate members are jointed to each other by two gap holders disposed opposite to each other with respect to the hollow portions.

25. The driving device according to claim 21, wherein
the flat plate members each has an easy-deformable portion.

26. The driving device according to claim 21, wherein
the gap increasing member has two apices away from each other by the second length in the first axis direction.

27. The driving device according to claim 21, wherein
the flat plate members each is a substrate member obtained by forming a metal conductive pattern on a flexible base member,
the gap holders each has a metal layer at least on a joint portion with each of the flat plate members, and
the conductive patterns of the flat plate members and the metal layers of the gap holders are solder-jointed.

28. The driving device according to claim 1, further comprising:
a bias member for biasing the driven member in a first direction of the first axis direction with a force smaller than the moving force of the first and second displacement output portions when the driving member moves the driven member in a second direction of the first axis direction opposite to the first direction.

29. The driving device according to claim 1, further comprising:
a restrainer for restraining a displacement of the driven member in a direction along the first axis direction.

30. A driving mechanism, comprising:
a driven member; and
a driving device for moving the driven member in a first axis direction, the driving device comprising:
first and second sheet-like driving pieces, each having at least four driving arms arranged so as to form a four-sided aperture within which the driven member is slidably mounted;
a first displacement output portion attached to at least one of the driving arms of the first sheet-like driving piece, the first displacement output portion being movable in a first axis direction;
a second displacement output portion attached to at least one of the driving arms of the second sheet-like driving piece, the second displacement output portion being movable in the first axis direction; and
first and second displacement input portions for moving the first and second displacement output portions in the first axis direction in response to an application of a moving force in a second axis direction orthogonal to the first axis direction, one or both of the first and second displacement output portions being mounted to the driven member; and
a linear shape memory alloy (SMA) actuator contacting at least one of the displacement input portions for applying the moving force to at least one of the displacement input portions, the SMA actuator comprising a wire member having electrodes to energize and heat the SMA actuator, the SMA actuator being wound around an outer periphery of the driving device and positioned such that energizing and de-energizing of the SMA actuator causes the at least one of the displacement input portions to move in the second axis direction,
wherein a distance between the first displacement output portion and the second displacement output portion increases in the first axis direction when a distance between the first displacement input portion and the second displacement input portion decreases in the second axis direction.

31. The driving mechanism according to claim 30, wherein
the driven member is a lens unit, and
the driving device moves the lens unit in a direction of an optical axis of the lens unit.

32. The driving mechanism according to claim 31, wherein
the lens unit has a tubular shape, with a support extending from an outer wall thereof, and
the displacement output portion is engaged with the support.

33. An image sensing apparatus, comprising:
a lens unit;
a driving device for moving the lens unit in a direction of an optical axis thereof;
an image sensor arranged on an imaging side of the lens unit; and
a controller for controlling an operation of the driving device,
wherein the driving device comprises:
first and second sheet-like driving pieces, each having at least four driving arms arranged so as to form a four-sided aperture within which the lens unit is slidably mounted;
a first displacement output portion attached to at least one of the driving arms of the first sheet-like driving piece, the first displacement output portion being movable in the optical axis direction;
a second displacement output portion attached to at least one of the driving arms of the second sheet-like driving piece, the second displacement output portion being movable in the the optical direction; and
first and second displacement input portions for moving the first and second displacement output portions in the optical axis direction in response to an application of a moving force in a direction orthogonal to the optical axis direction, one or both of the first and second displacement output portions being mounted to the lens unit; and
a linear shape memory alloy (SMA) actuator contacting at least one of the displacement input portions for applying the moving force to at least one of the displacement input portions, the SMA actuator comprising a wire member having electrodes to energize and heat the SMA actuator, the SMA actuator being wound around an outer periphery of the driving device and positioned such that energizing and de-energizing of the SMA actuator causes the at least one of the displacement input portions to move in the direction orthogonal to the optical axis direction, wherein a distance between the first displacement output portion and the second displacement output portion increases in the optical axis direction when a distance between the first displacement input portion and the second displacement input portion decreases in the direction orthogonal to the optical axis direction.

34. A driving device for driving a driven member, comprising:
- a driving member comprising:
  - first and second sheet-like driving pieces, each having at least four driving arms arranged so as to form a four-sided aperture within which to slidably mount the driven member;
  - a first displacement output portion attached to at least one of the driving arms, the first displacement output portion being movable in a first axis direction;
  - a second displacement output portion attached to at least one of the driving arms, the second displacement output portion being movable in the first axis direction; and
  - first and second displacement input portions for moving the first and second displacement output portions in the first axis direction in response to an application of a moving force in a second axis direction orthogonal to the first axis direction; and
- a shape memory alloy (SMA) wire, said SMA wire being wound in a plane around an outer periphery of the driving member and configured to contract and thereby apply the moving force in the second axis direction to the first and second displacement input portions,
- wherein the driven member is moved in the first axis direction by a change in a distance between the first displacement output portion and the second displacement output portion in the first axis direction, said change being in response to the application of the moving force in the second axis direction to the first and second displacement input portions.

35. A driving device for driving a driven member, comprising:
- a driving member comprising:
  - first and second driving pieces, each having at least four driving arms arranged so as to form a four-sided aperture within which to slidably mount the driven member;
  - a first displacement output portion attached to at least one of the driving arms of the first driving piece, the first displacement output portion being movable in a first axis direction;
  - a second displacement output portion attached to at least one of the driving arms of the second driving piece, the first displacement output portion being movable in the first axis direction; and
  - first and second displacement input portions for moving the first and second displacement output portions in the first axis direction in response to an application of a moving force in a second axis direction orthogonal to the first axis direction, one or both of the first and second displacement output portions being suitable for mounting the driven member thereto; and
- a linear shape memory alloy (SMA) actuator contacting at least one of the displacement input portions, for applying the moving force to at least one of the displacement input portions, the SMA actuator being wound around an outer periphery of the driving member and positioned such that energizing and de-energizing of the SMA actuator causes the at least one of the displacement input portions to move in the second axis direction,
- wherein a distance between the first displacement output portion and the second displacement output portion increases in the first axis direction when a distance between the first displacement input portion and the second displacement input portion decreases in the second axis direction.

* * * * *